United States Patent
Suzuki et al.

(10) Patent No.: US 11,320,652 B2
(45) Date of Patent: May 3, 2022

(54) DISPLAY DEVICE, OBJECT APPARATUS AND DISPLAY METHOD

(71) Applicant: Ricoh Company, Ltd., Tokyo (JP)

(72) Inventors: Yuuki Suzuki, Kanagawa (JP); Masato Kusanagi, Kanagawa (JP); Kenichiroh Saisho, Tokyo (JP); Keita Katagiri, Kanagawa (JP); Hiroshi Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 284 days.

(21) Appl. No.: 16/472,597

(22) PCT Filed: Dec. 26, 2017

(86) PCT No.: PCT/JP2017/046719
§ 371 (c)(1),
(2) Date: Jun. 21, 2019

(87) PCT Pub. No.: WO2018/124100
PCT Pub. Date: Jul. 5, 2018

(65) Prior Publication Data
US 2020/0142190 A1 May 7, 2020

(30) Foreign Application Priority Data
Dec. 28, 2016 (JP) .............................. JP2016-256015

(51) Int. Cl.
G02B 27/01 (2006.01)
B60K 35/00 (2006.01)
B60R 1/00 (2022.01)

(52) U.S. Cl.
CPC .......... *G02B 27/0101* (2013.01); *B60K 35/00* (2013.01); *B60R 1/00* (2013.01);
(Continued)

(58) Field of Classification Search
CPC ................ G02B 27/01; G02B 27/0101; B60K 2370/1529; B60K 35/00
See application file for complete search history.

(56) References Cited

U.S. PATENT DOCUMENTS

| 8,970,453 B2 | 3/2015 | Sasaki et al. |
| 9,158,124 B2 | 10/2015 | Saisho et al. |

(Continued)

FOREIGN PATENT DOCUMENTS

| JP | 2006-017626 | 1/2006 |
| JP | 2007-221200 | 8/2007 |

(Continued)

OTHER PUBLICATIONS

Japanese Office Action dated Jan. 5, 2021 in Japanese Patent Application No. 2016-256015 (with English translation), 9 pages.
(Continued)

*Primary Examiner* — Ryan D Howard
(74) *Attorney, Agent, or Firm* — Xsensus LLP

(57) ABSTRACT

(Object) It is possible to make a display area less perceivable to a user. (Means of Achieving the Object) An HUD device (i.e., the HUD device of the practical example 1) is a display device for displaying in a display area a virtual image of at least a part of a sign that moves. The display device includes a displaying system configured to form an image of the sign that moves with light in a region including an image region (i.e., a predetermined region), and to irradiate a front windshield (i.e., transparent/reflective member) with light that forms at least a part of the image, the part of which is in the image region, such that the virtual image of the at least a part of the image is displayed in the display area. The displaying system includes an FPGA 600 (i.e., control device) that is capable of controlling a characteristic of the image in accordance with position of the virtual image relative to the display area. The image sign to be displayed is an indicator (Continued)

mark indicating the presence and location of an object not being viewable through the front display windshield.

14 Claims, 36 Drawing Sheets

(52) U.S. Cl.
CPC .... *B60K 2370/1529* (2019.05); *B60K 2370/186* (2019.05); *B60K 2370/334* (2019.05); *B60R 2300/205* (2013.01); *G02B 2027/014* (2013.01); *G02B 2027/0141* (2013.01)

(56) References Cited

U.S. PATENT DOCUMENTS

| | | | |
|---|---|---|---|
| 9,746,669 | B2 | 8/2017 | Saisho et al. |
| 9,798,140 | B2 | 10/2017 | Inamoto et al. |
| 10,031,343 | B2 | 7/2018 | Saisho et al. |
| 10,152,120 | B2 | 12/2018 | Saisho |
| 10,156,728 | B2 | 12/2018 | Saisho et al. |
| 10,269,161 | B2 | 4/2019 | Kosaka et al. |
| 10,800,328 | B2 | 10/2020 | Takazawa et al. |
| 2008/0091338 | A1 | 4/2008 | Uehira |
| 2016/0159280 | A1* | 6/2016 | Takazawa ............... B60R 11/02 345/8 |
| 2017/0069212 | A1 | 3/2017 | Miyazawa et al. |
| 2017/0155867 | A1 | 6/2017 | Yokota et al. |
| 2017/0315353 | A1 | 11/2017 | Saisho et al. |
| 2017/0336222 | A1 | 11/2017 | Yamaguchi et al. |
| 2017/0336629 | A1 | 11/2017 | Suzuki et al. |
| 2018/0350236 | A1 | 12/2018 | Yamaguchi et al. |

FOREIGN PATENT DOCUMENTS

| | | |
|---|---|---|
| JP | 2011-121401 | 6/2011 |
| JP | 2012-035745 | 2/2012 |
| JP | 2015-11666 A | 1/2015 |
| WO | 2015/178303 A1 | 11/2015 |
| WO | WO 2017/056157 A1 | 4/2017 |
| WO | 2017/138527 A1 | 8/2017 |

OTHER PUBLICATIONS

International Search Report and Written Opinion dated Jun. 22, 2018 in PCT/JP2017/046719 filed on Dec. 26, 2017.

\* cited by examiner

[Fig. 1]
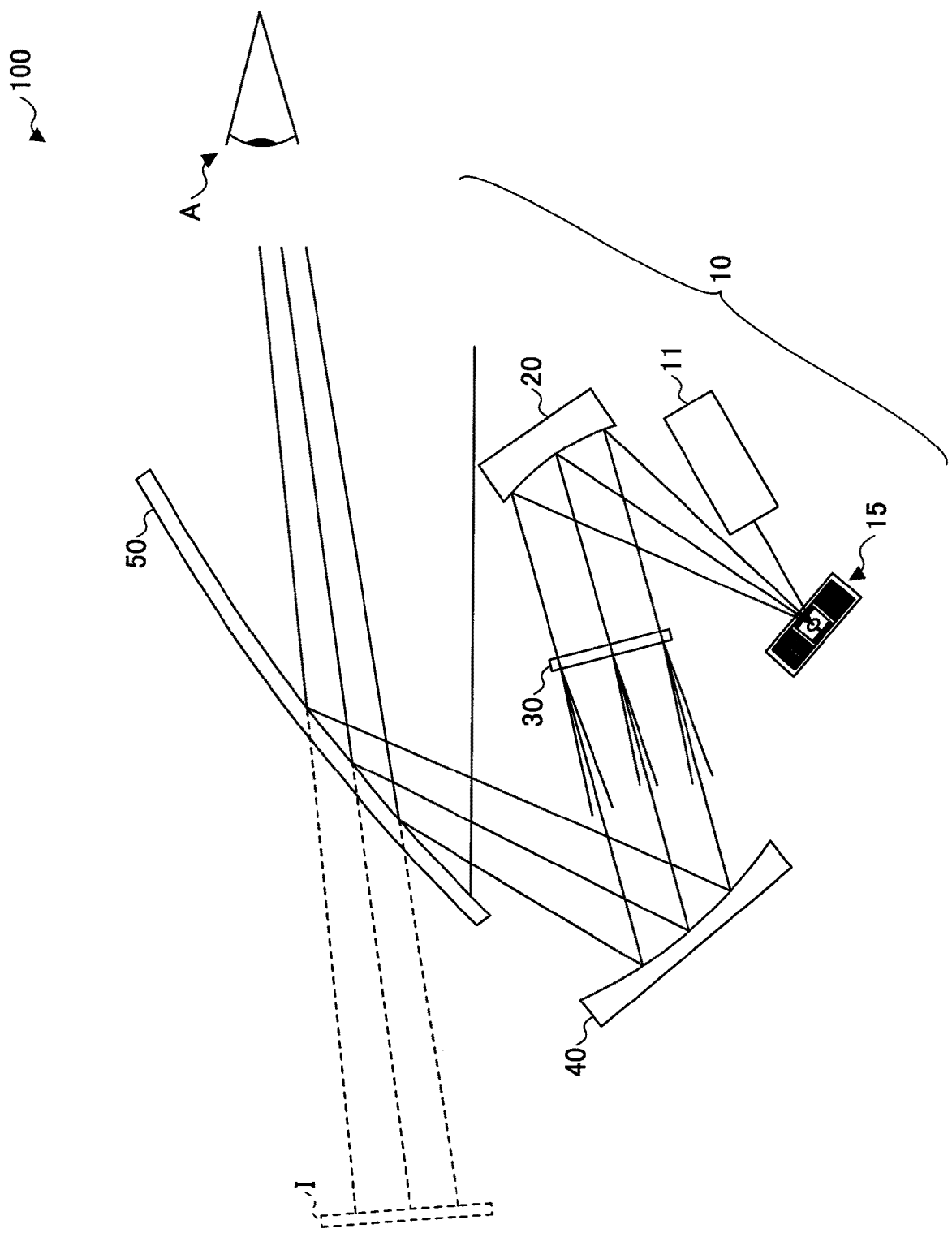

[Fig. 2]
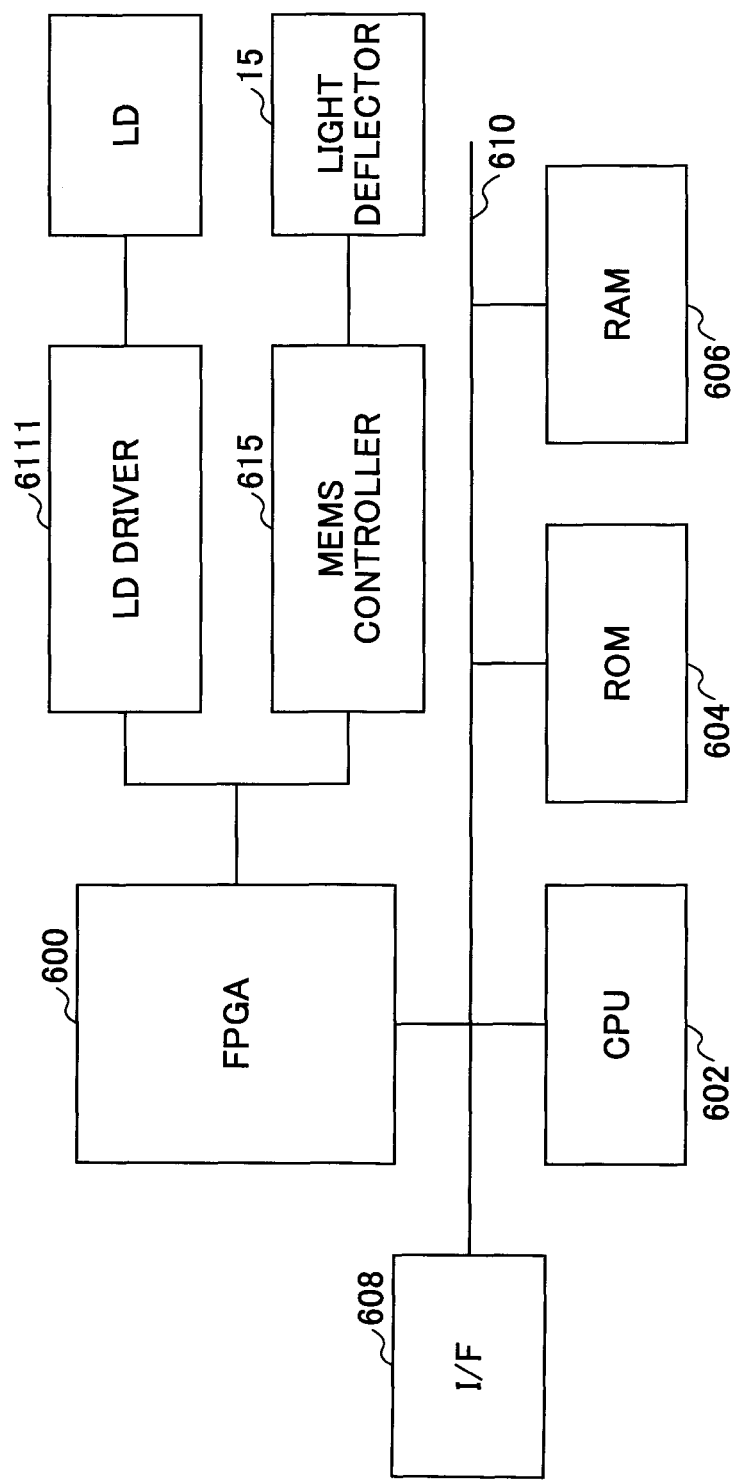

[Fig. 3]
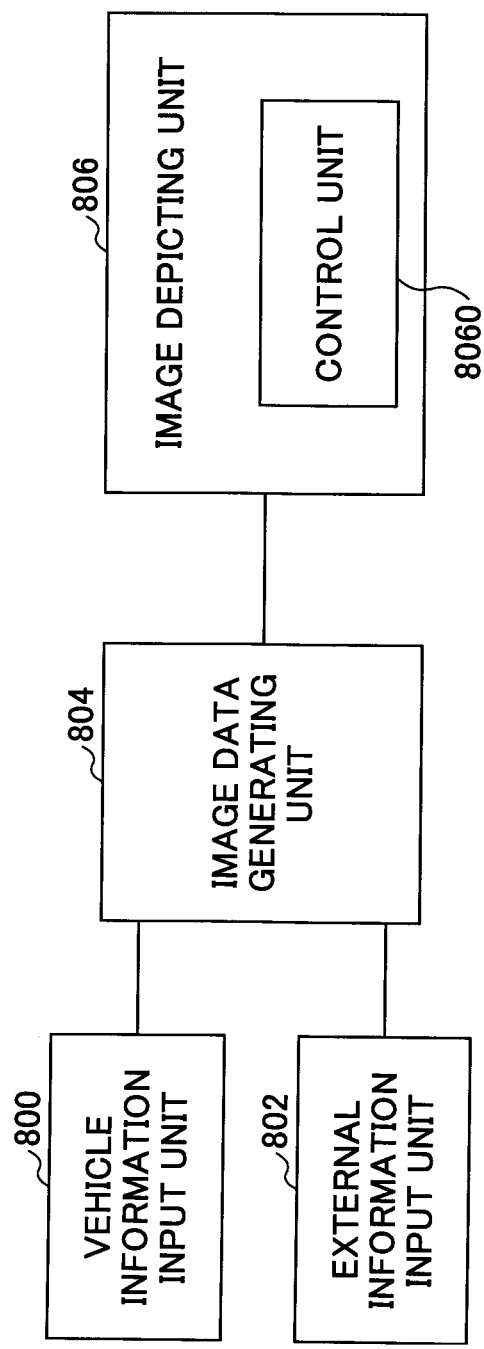

[Fig. 4]
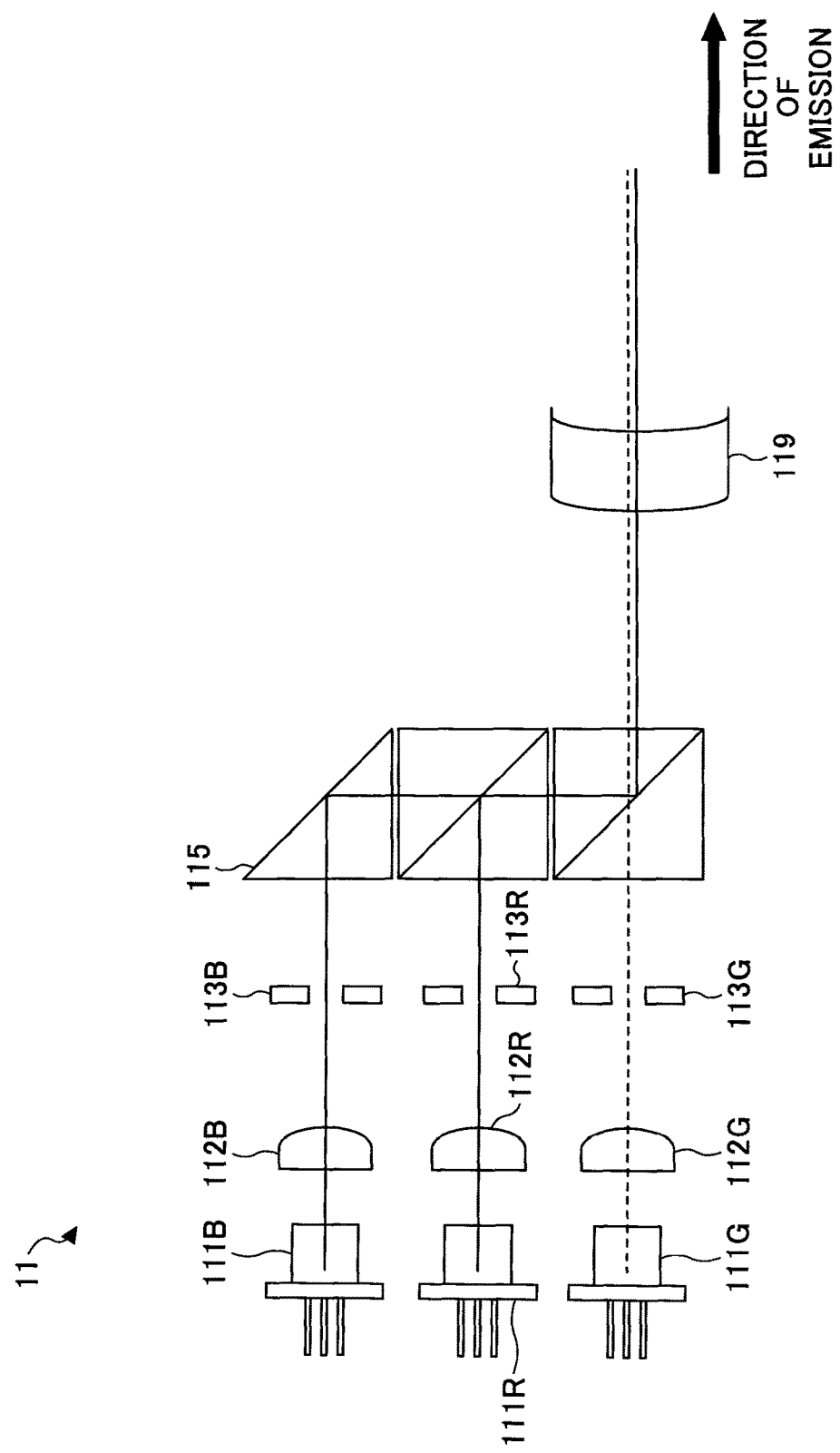

[Fig. 5]
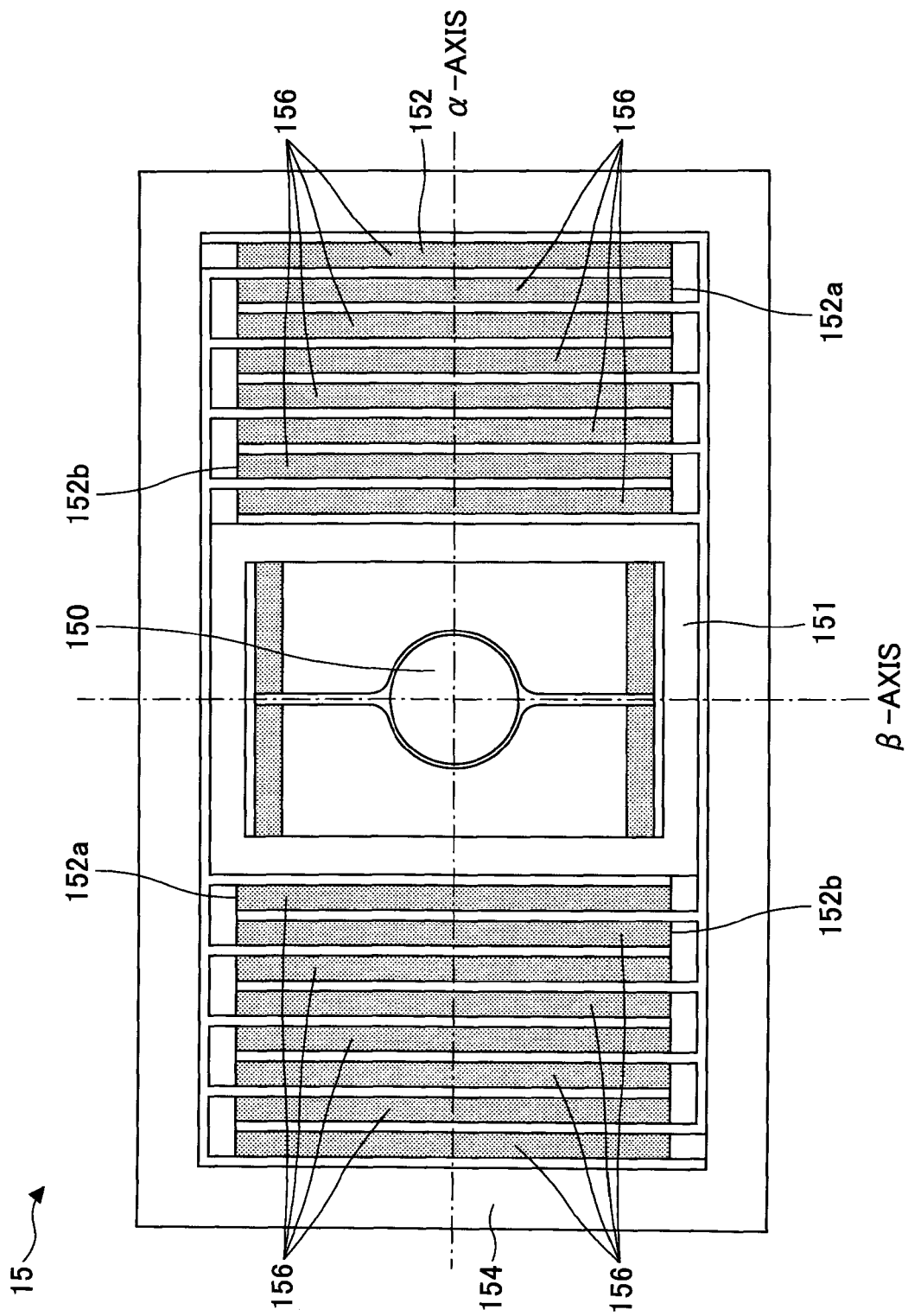

[Fig. 6]
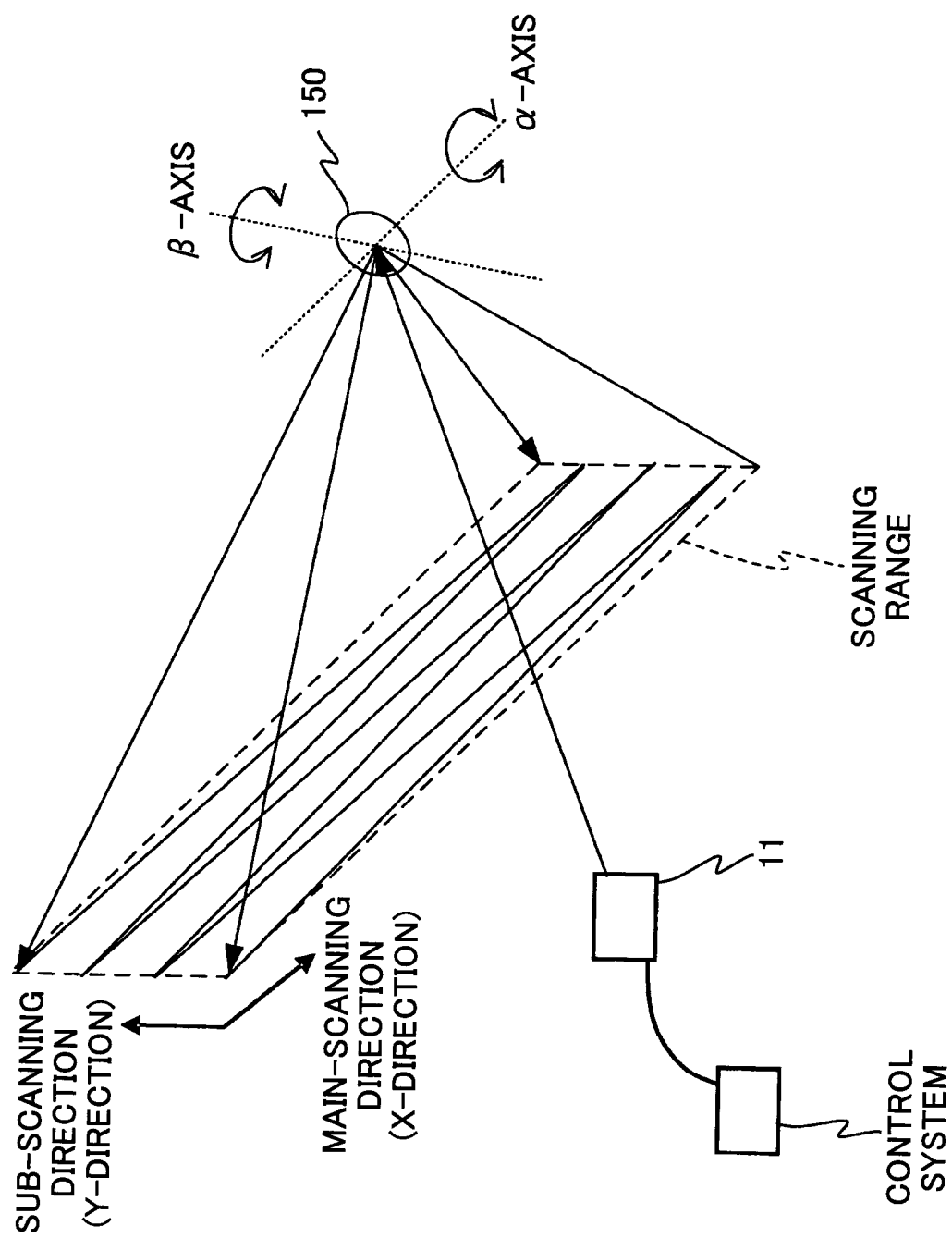

[Fig. 7]
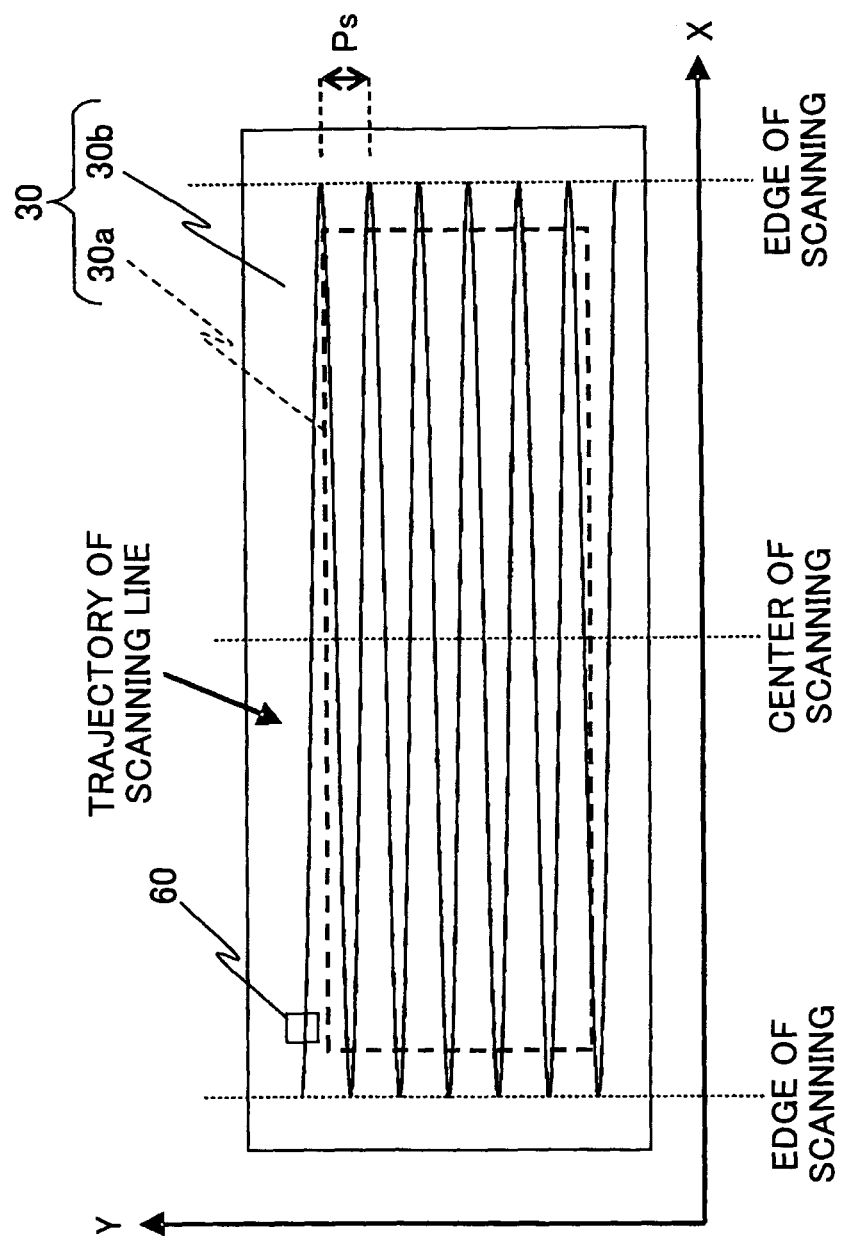

[Fig. 8A]
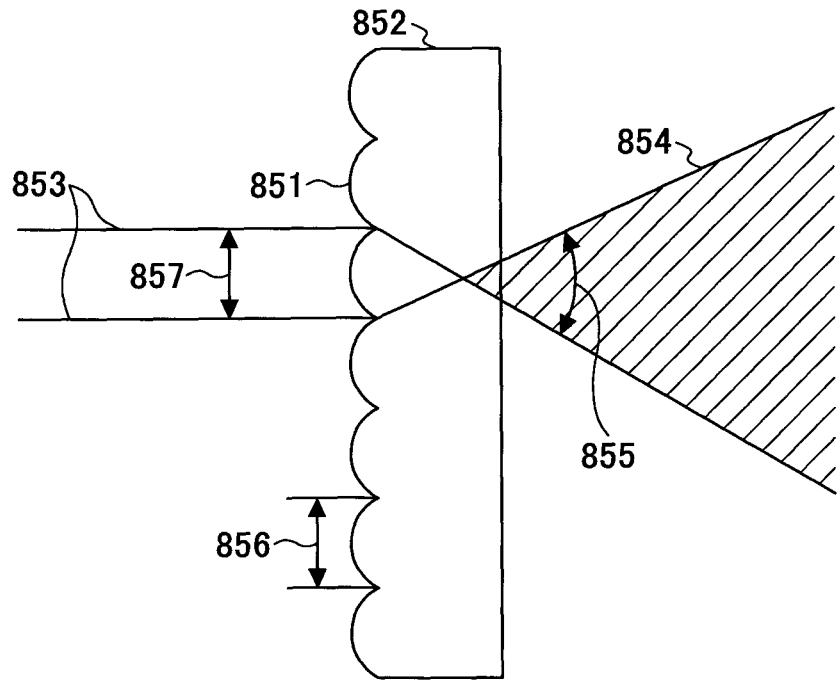
[Fig. 8B]
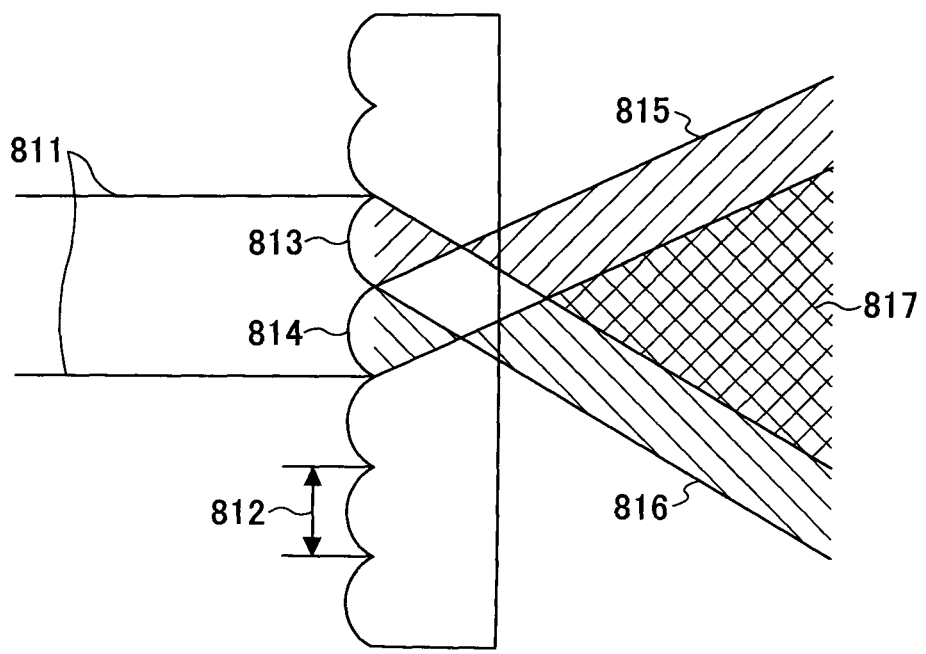

[Fig. 9]
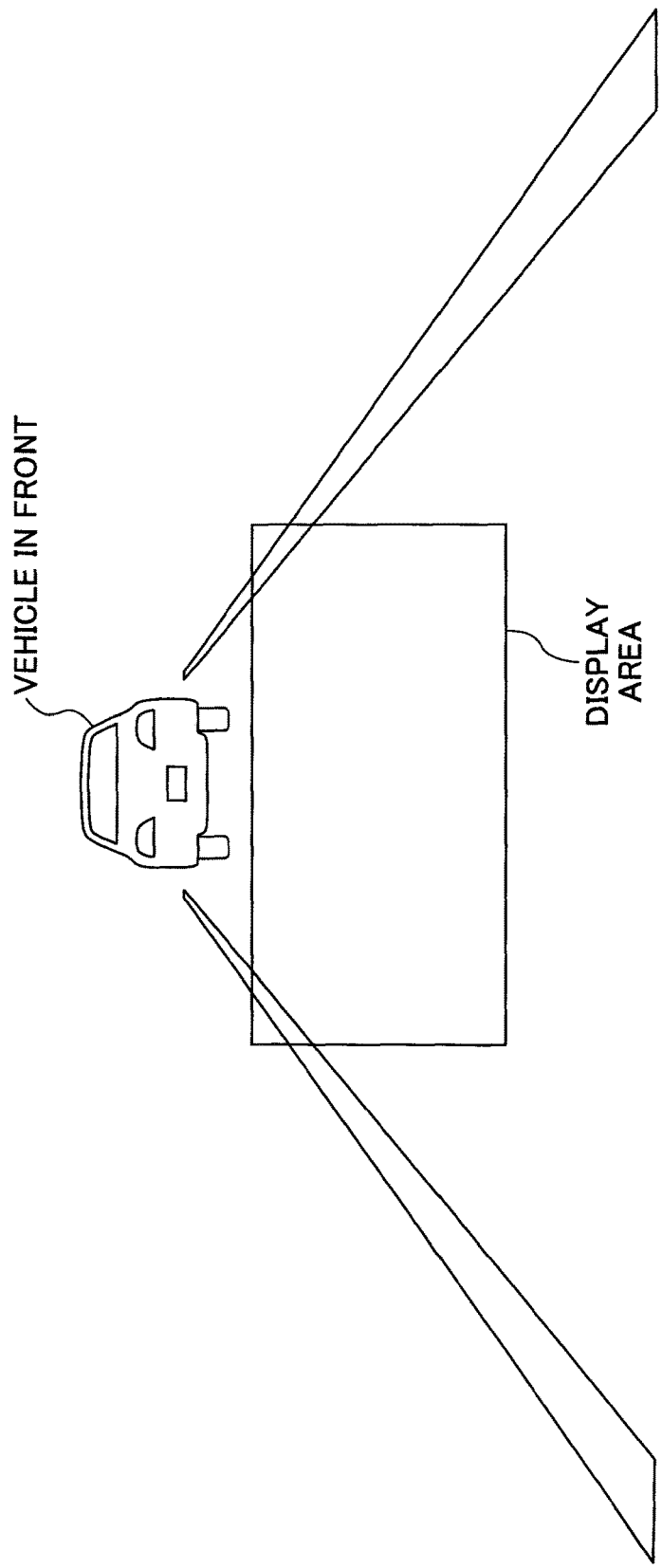

[Fig. 10A]
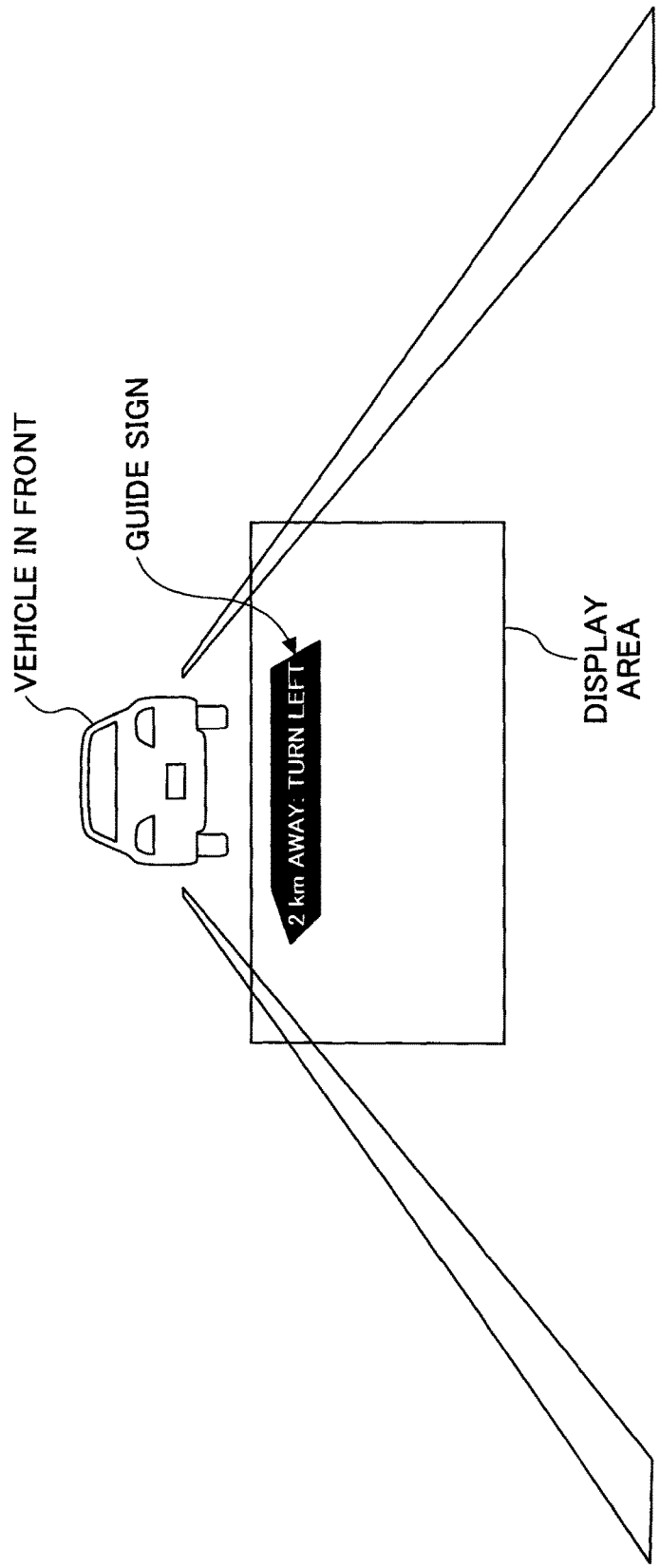

[Fig. 10B]
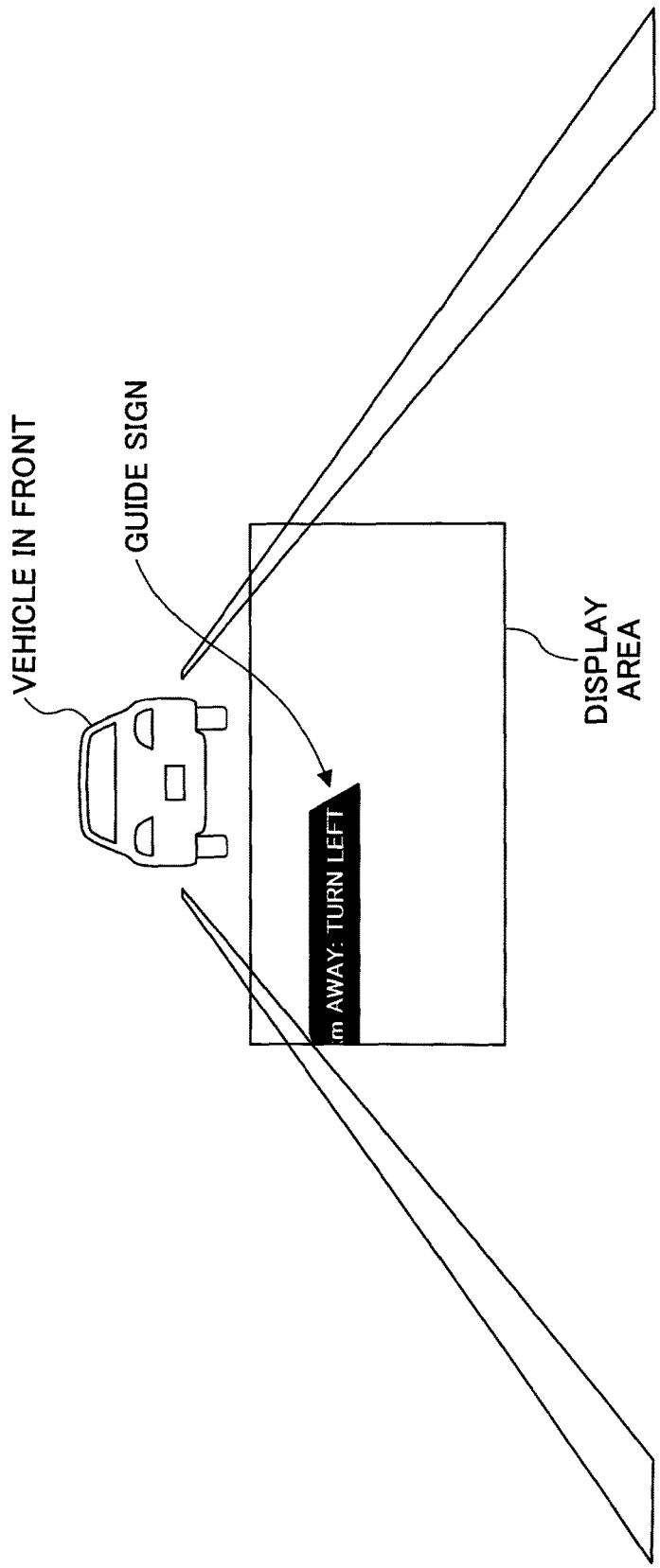

[Fig. 11A]
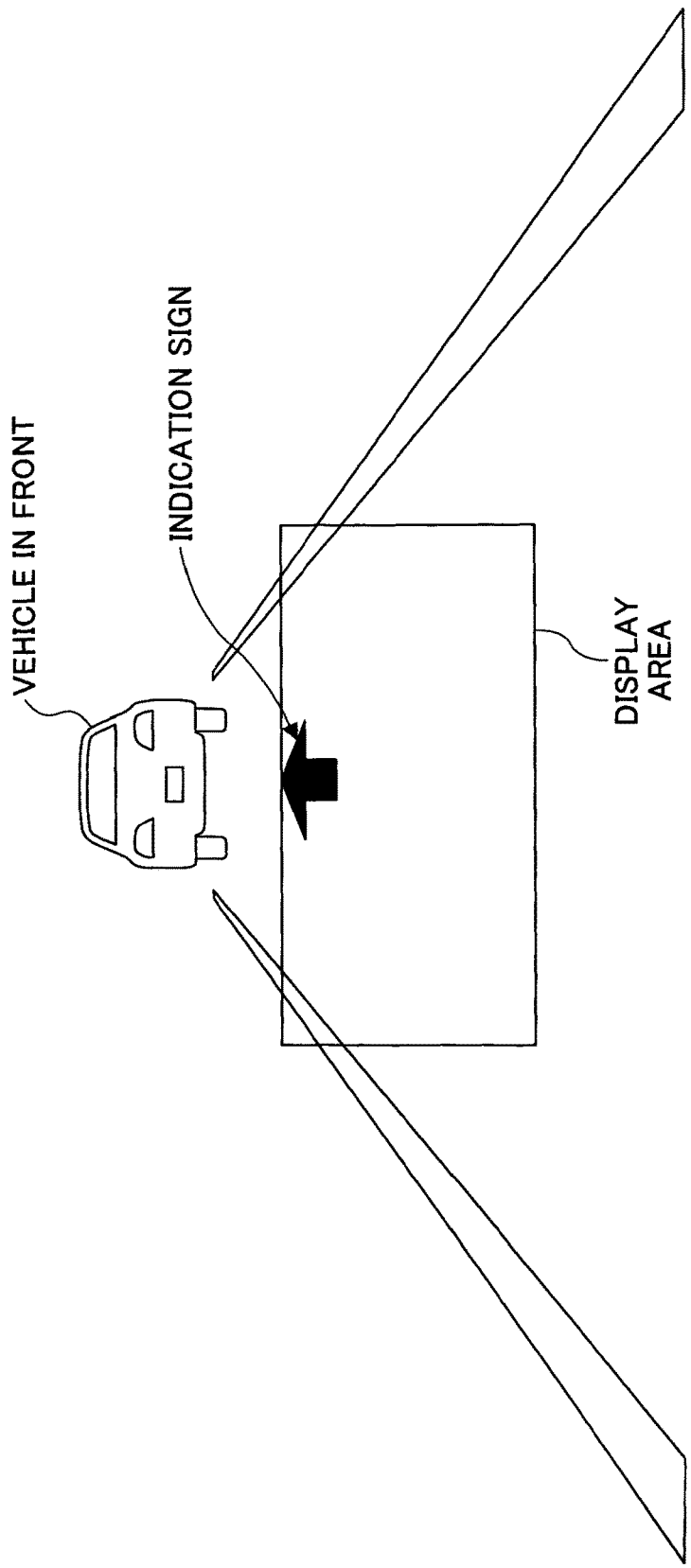

[Fig. 11B]
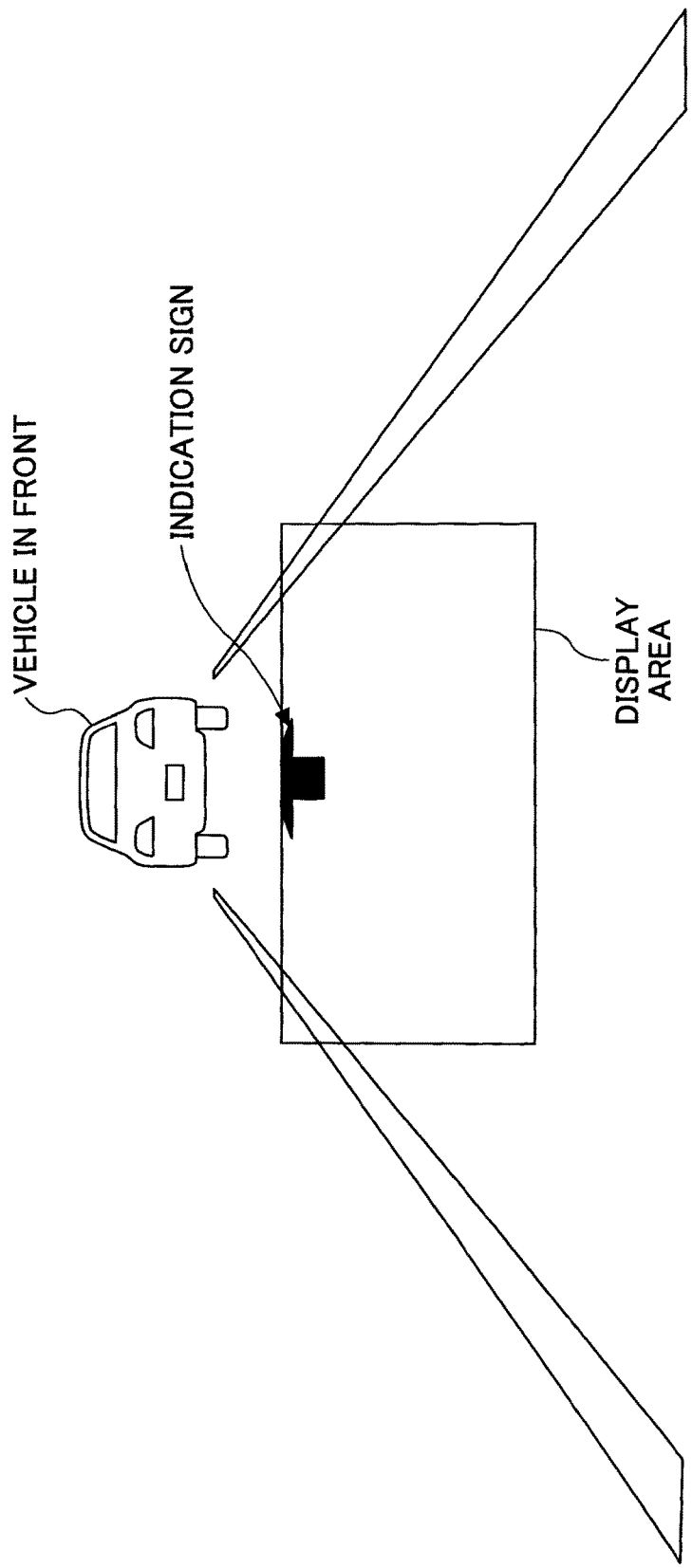

[Fig. 12]
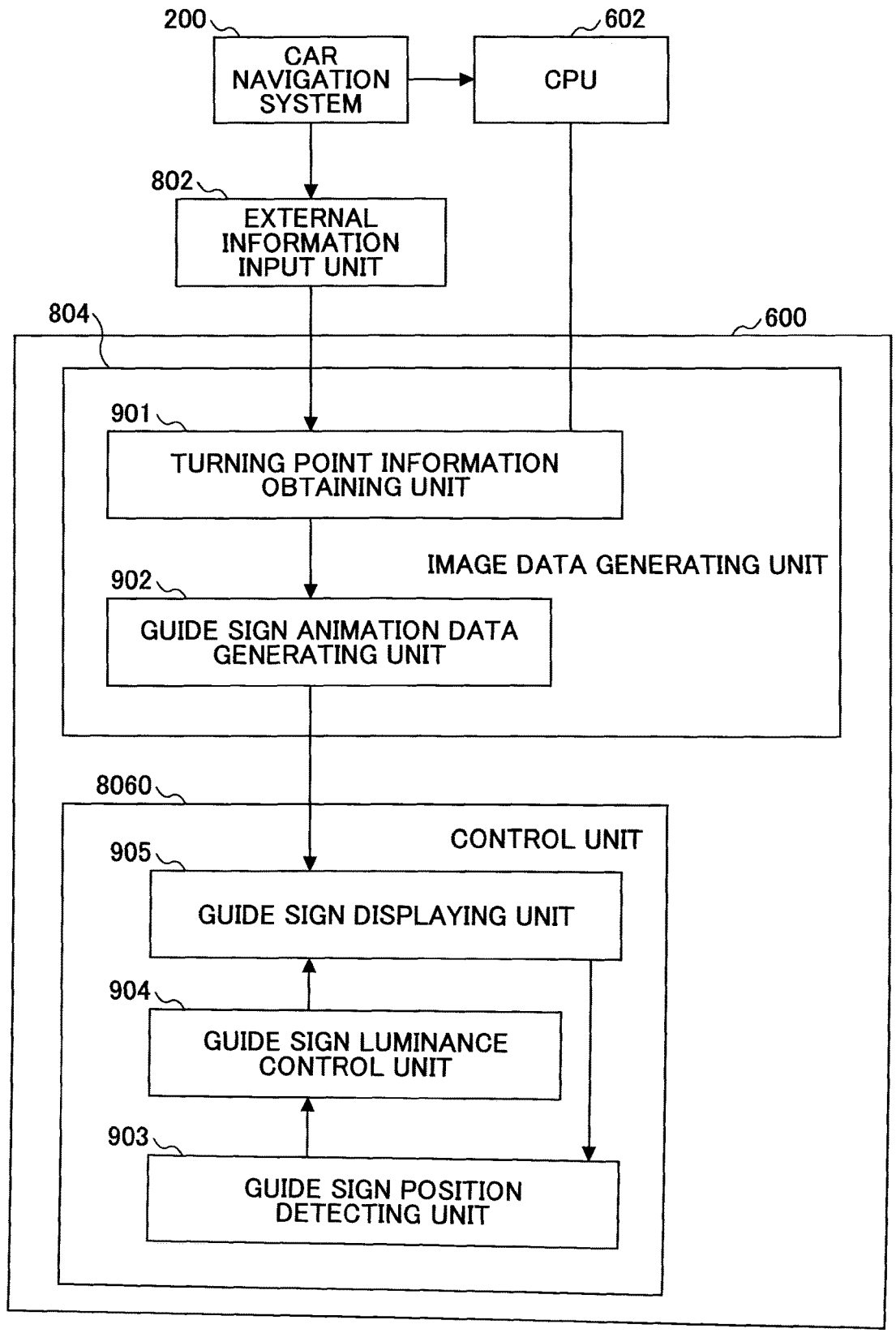

[Fig. 13A]
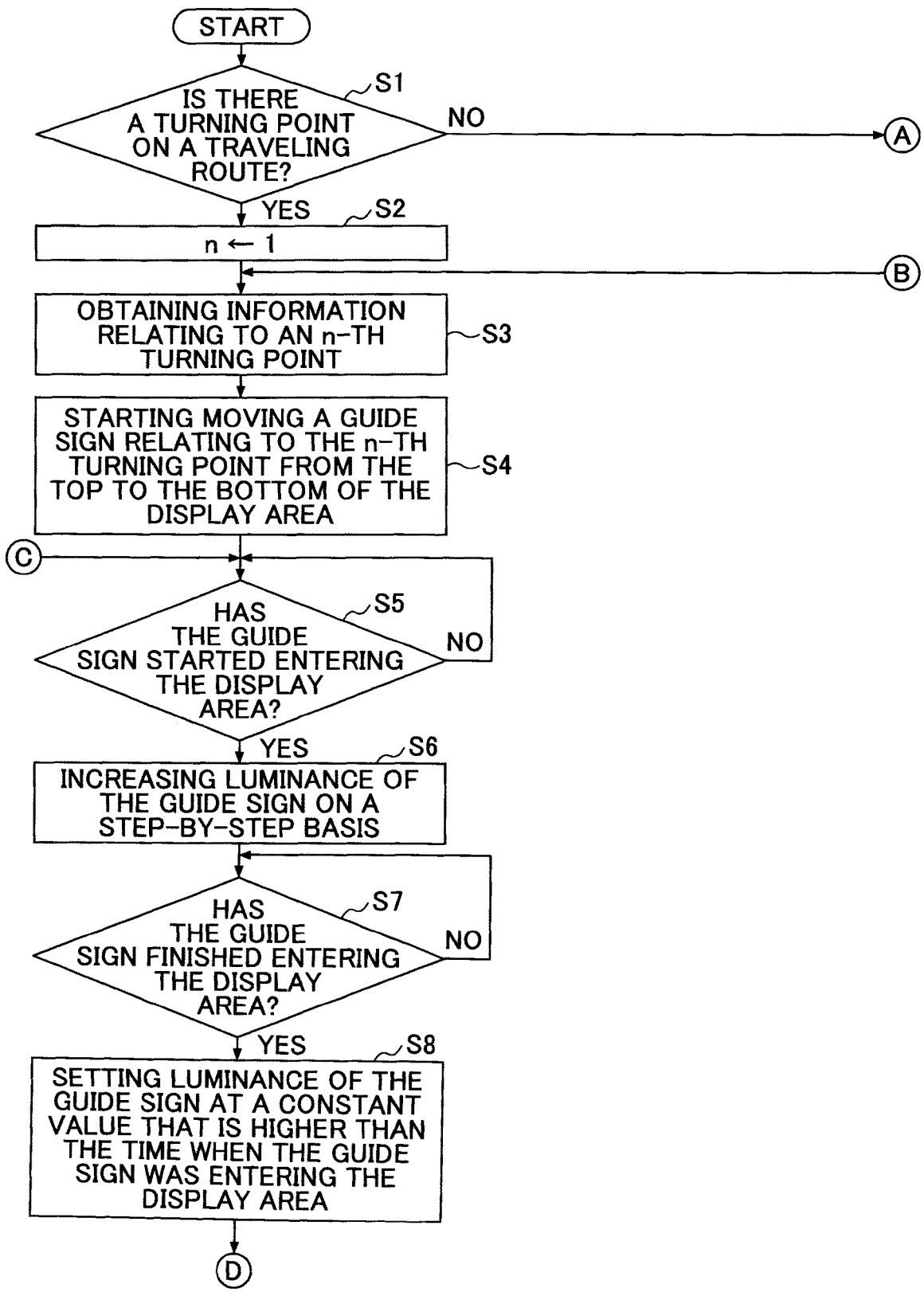

[Fig. 13B]
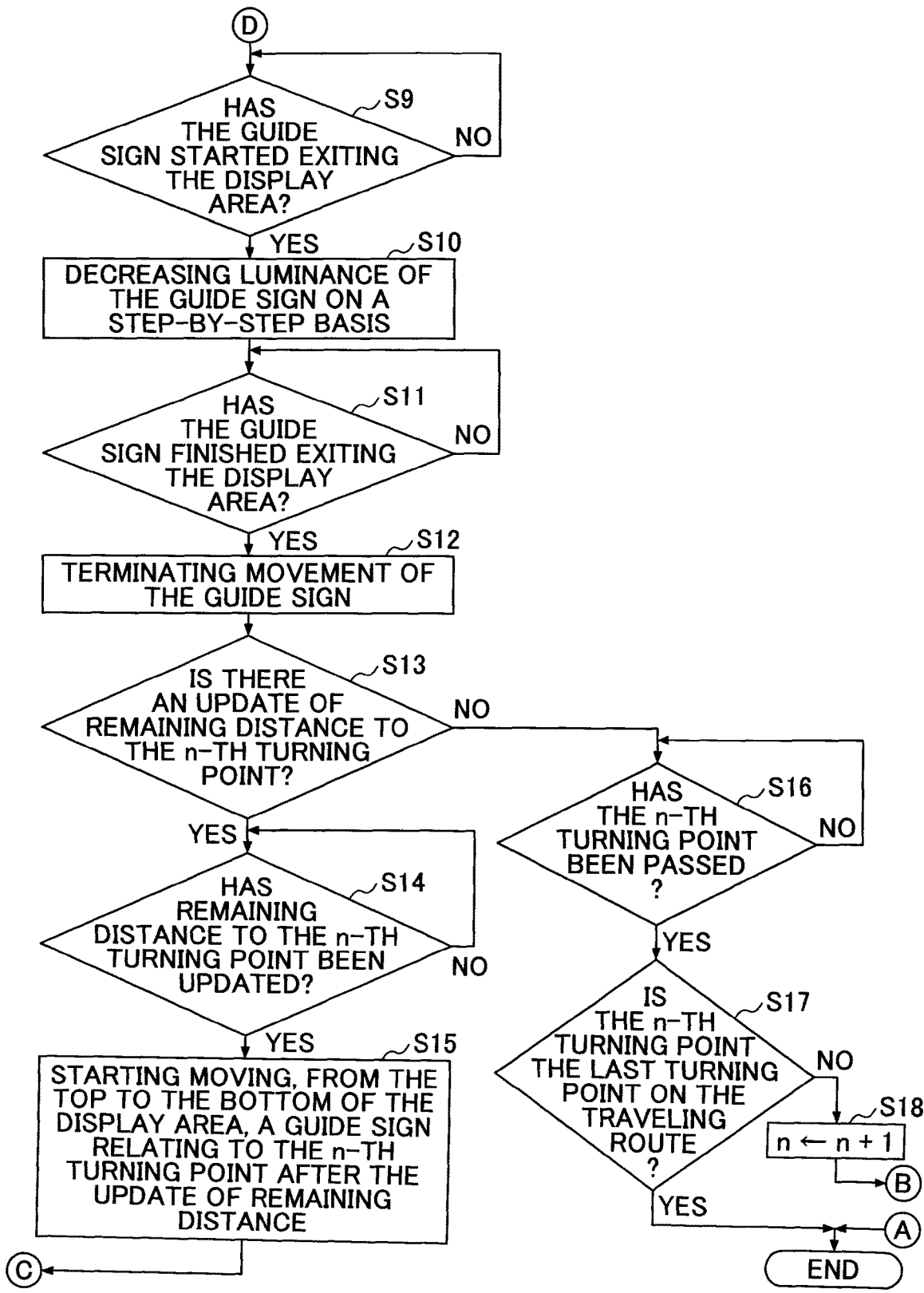

[Fig. 14A]
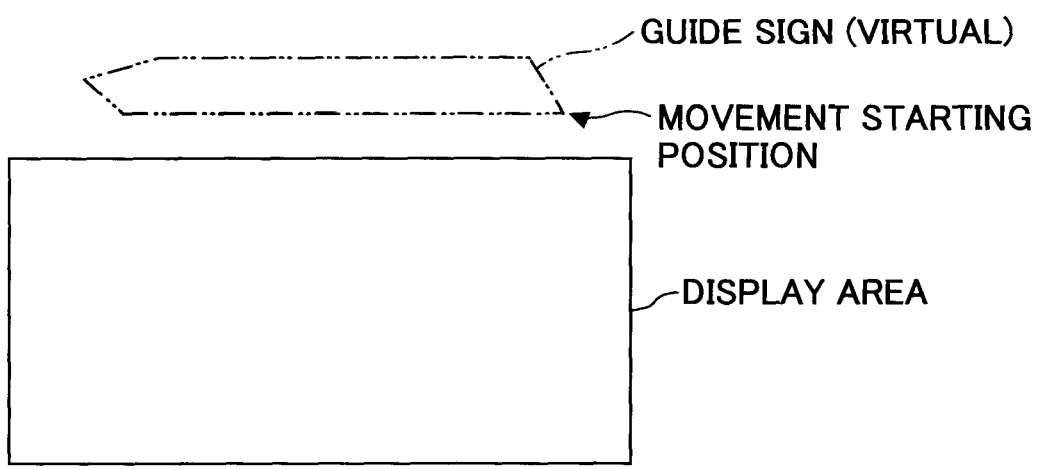
[Fig. 14B]
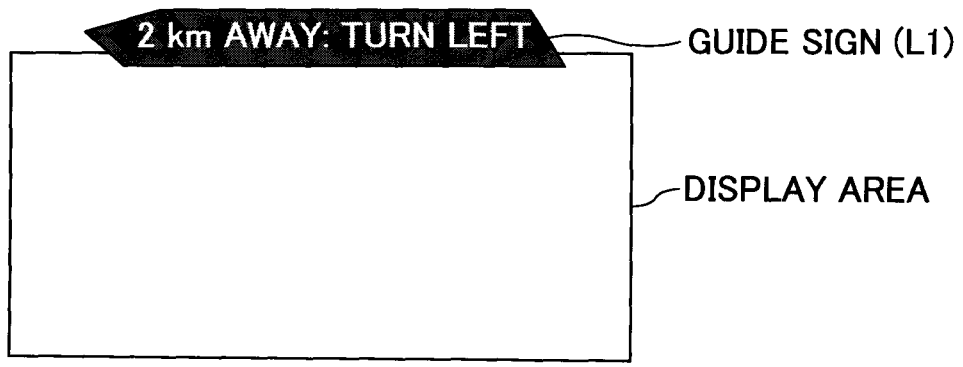

[Fig. 14C]
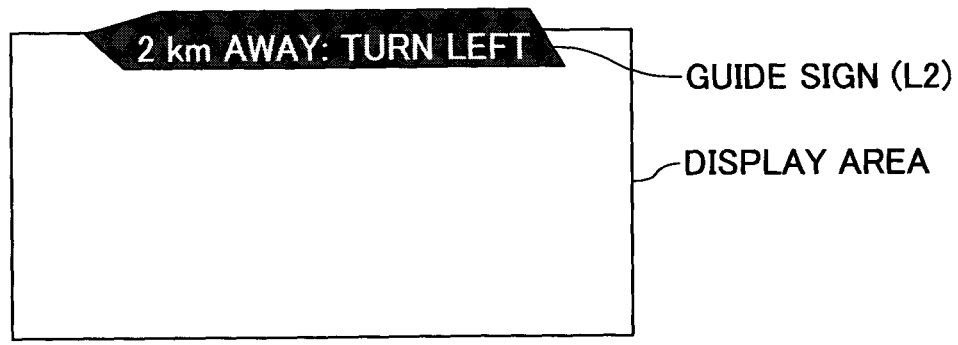
[Fig. 14D]
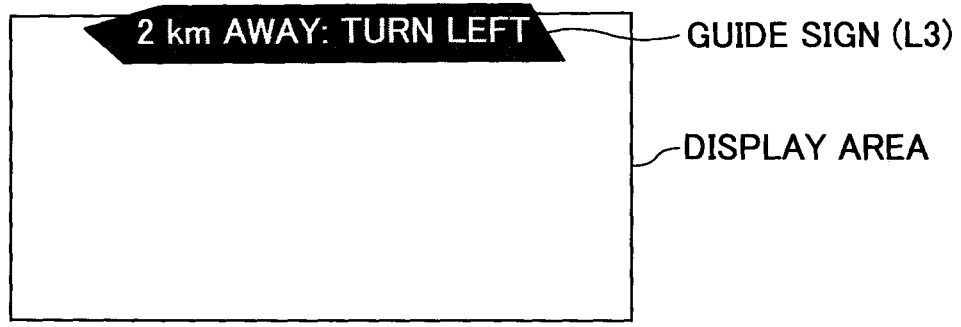

[Fig. 14E]
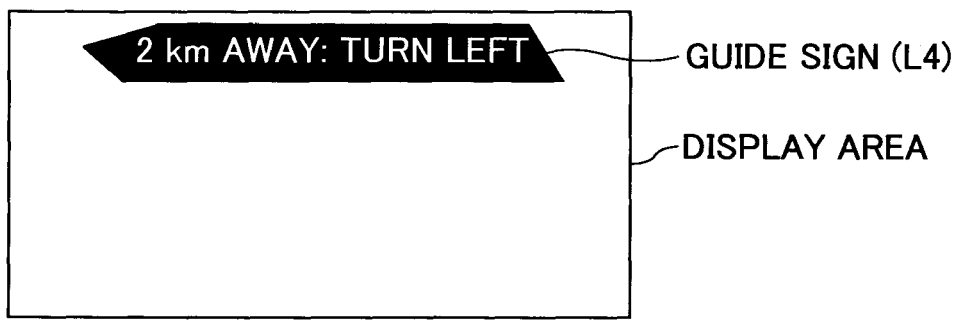
[Fig. 14F]
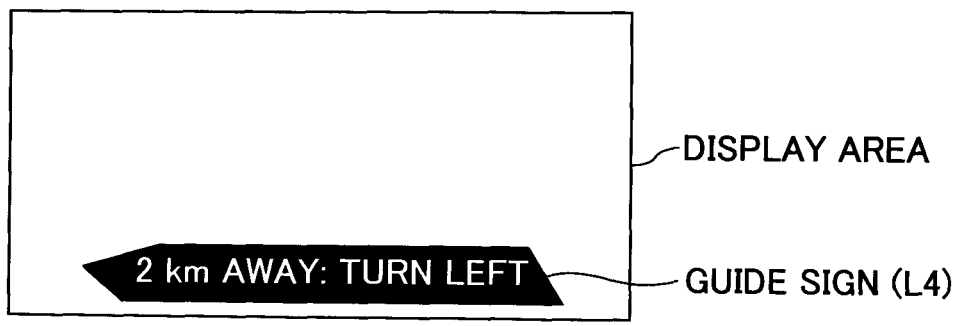

[Fig. 14G]
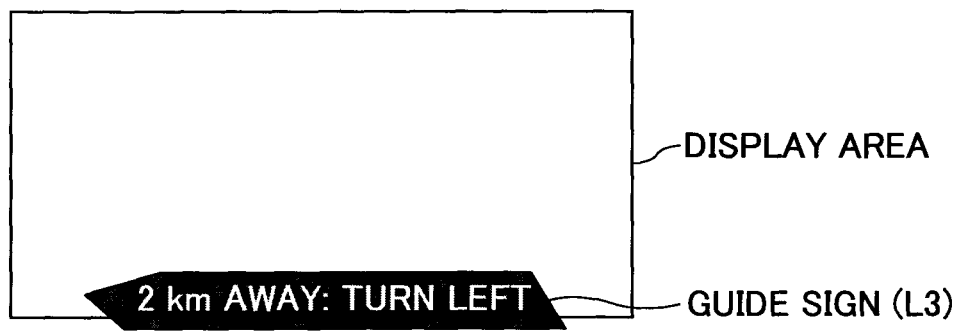
[Fig. 14H]
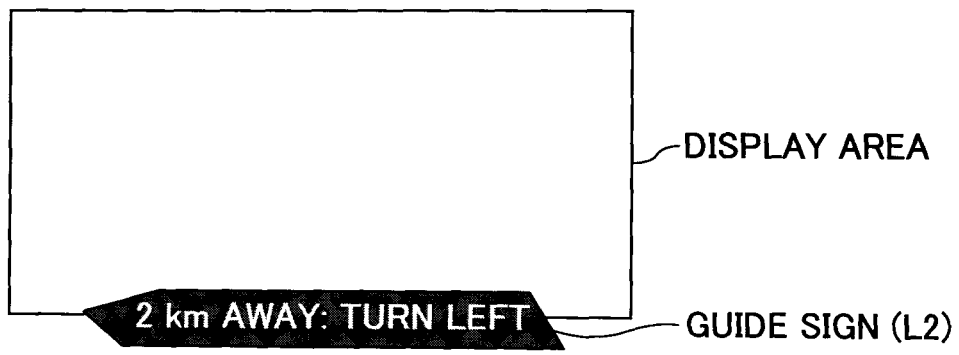

[Fig. 14I]
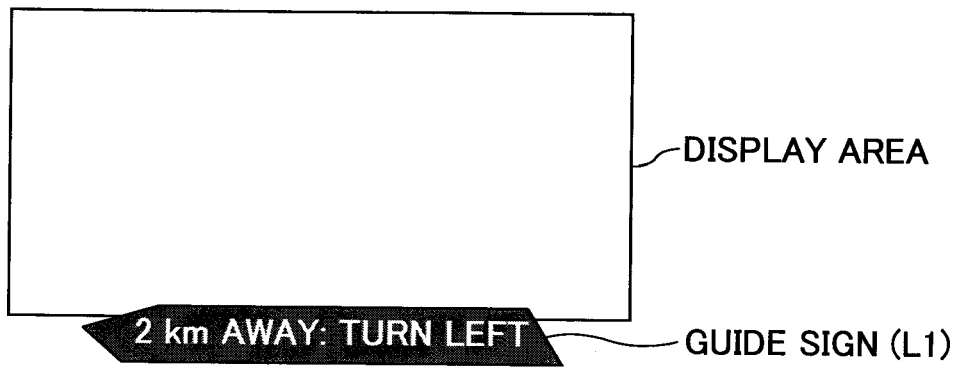
[Fig. 14J]
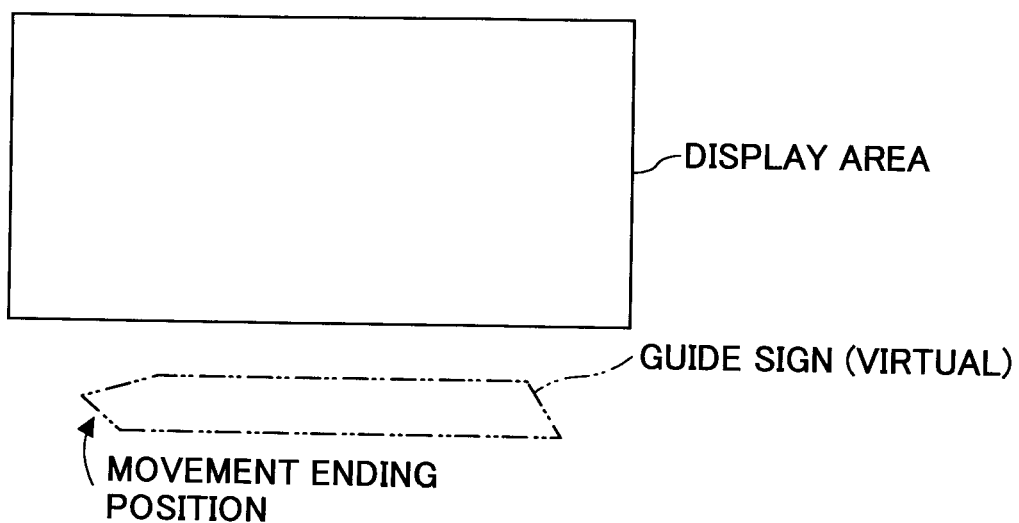

[Fig. 15]
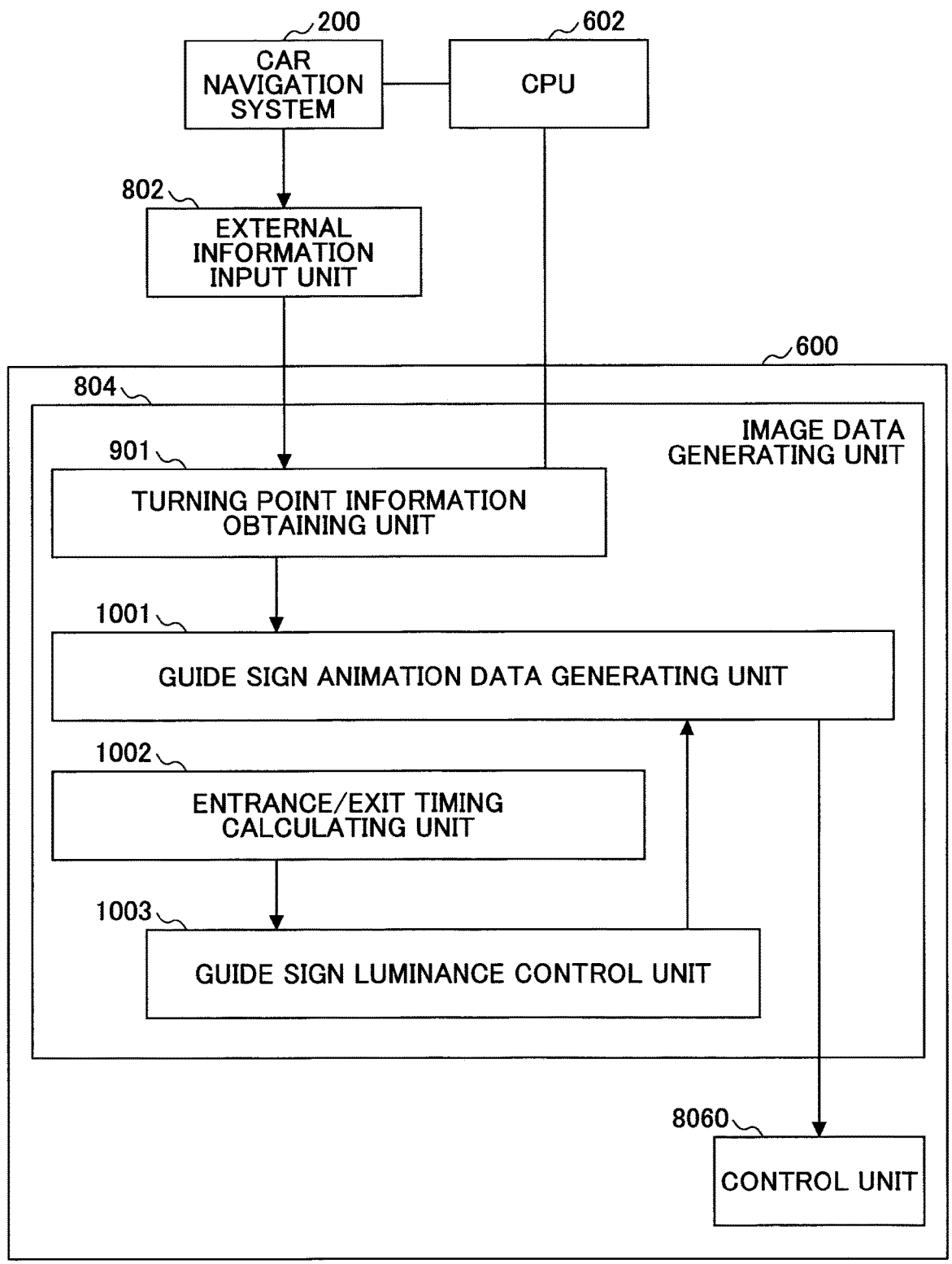

[Fig. 16A]
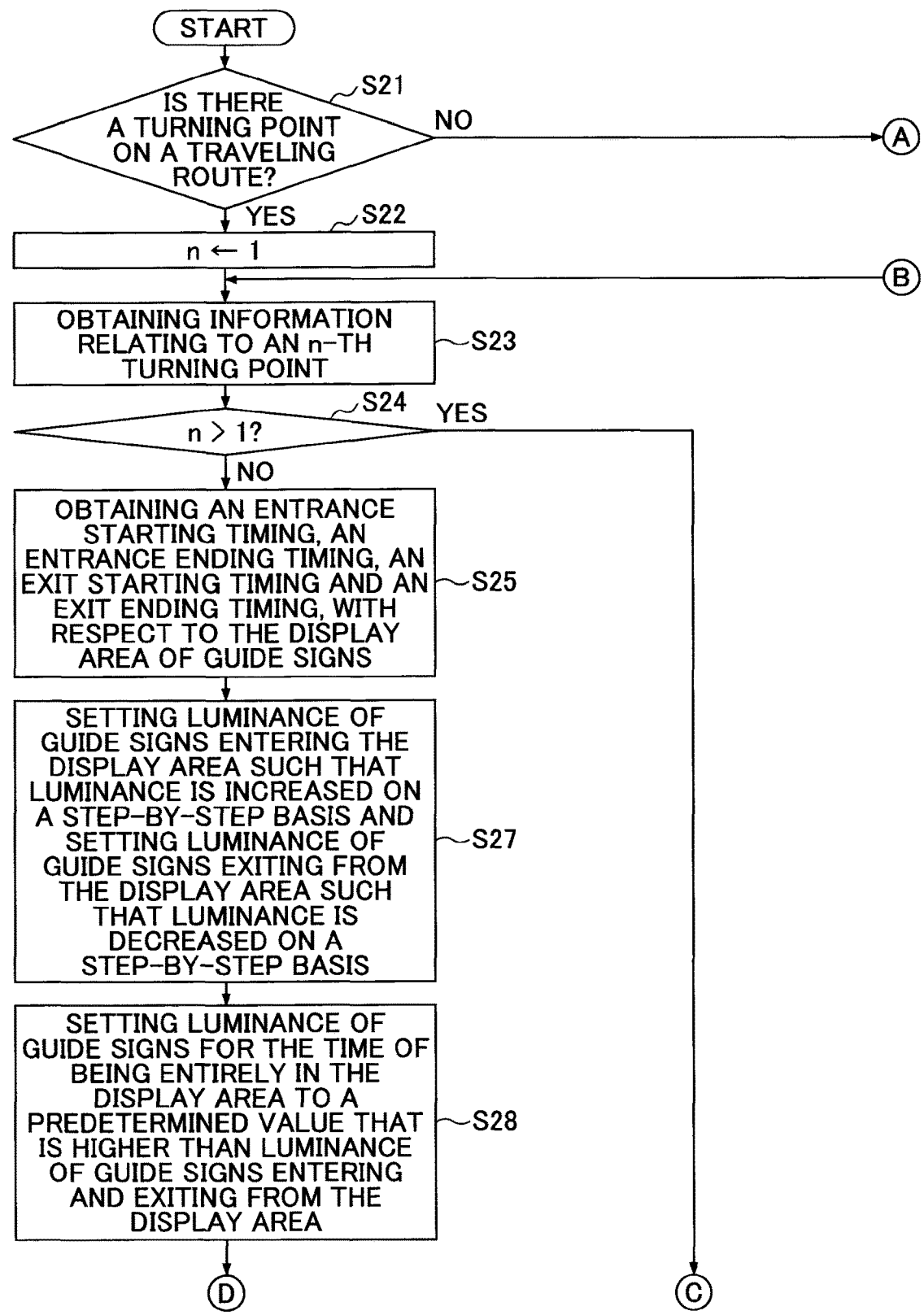

[Fig. 16B]
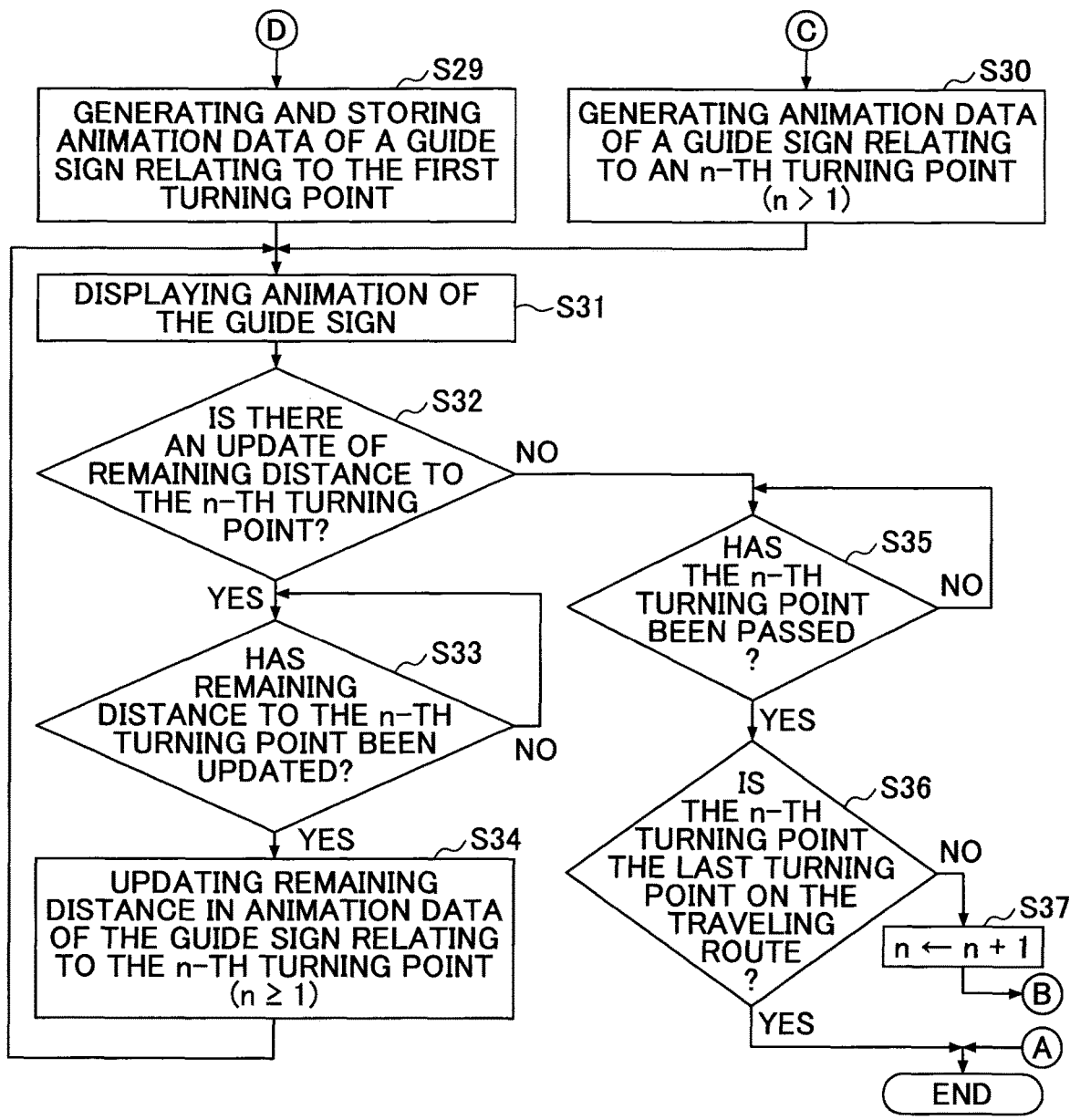

[Fig. 17]
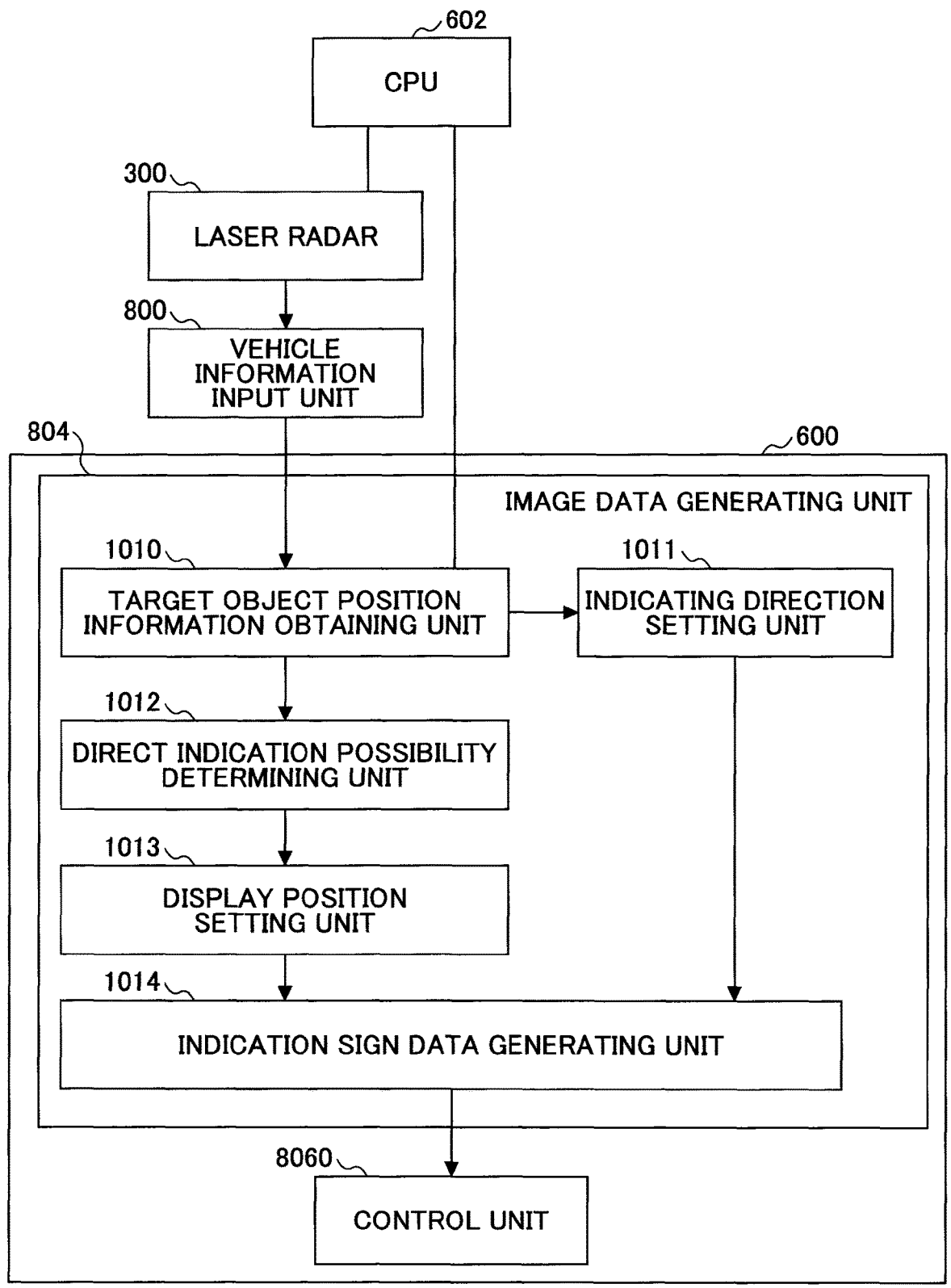

[Fig. 18A]
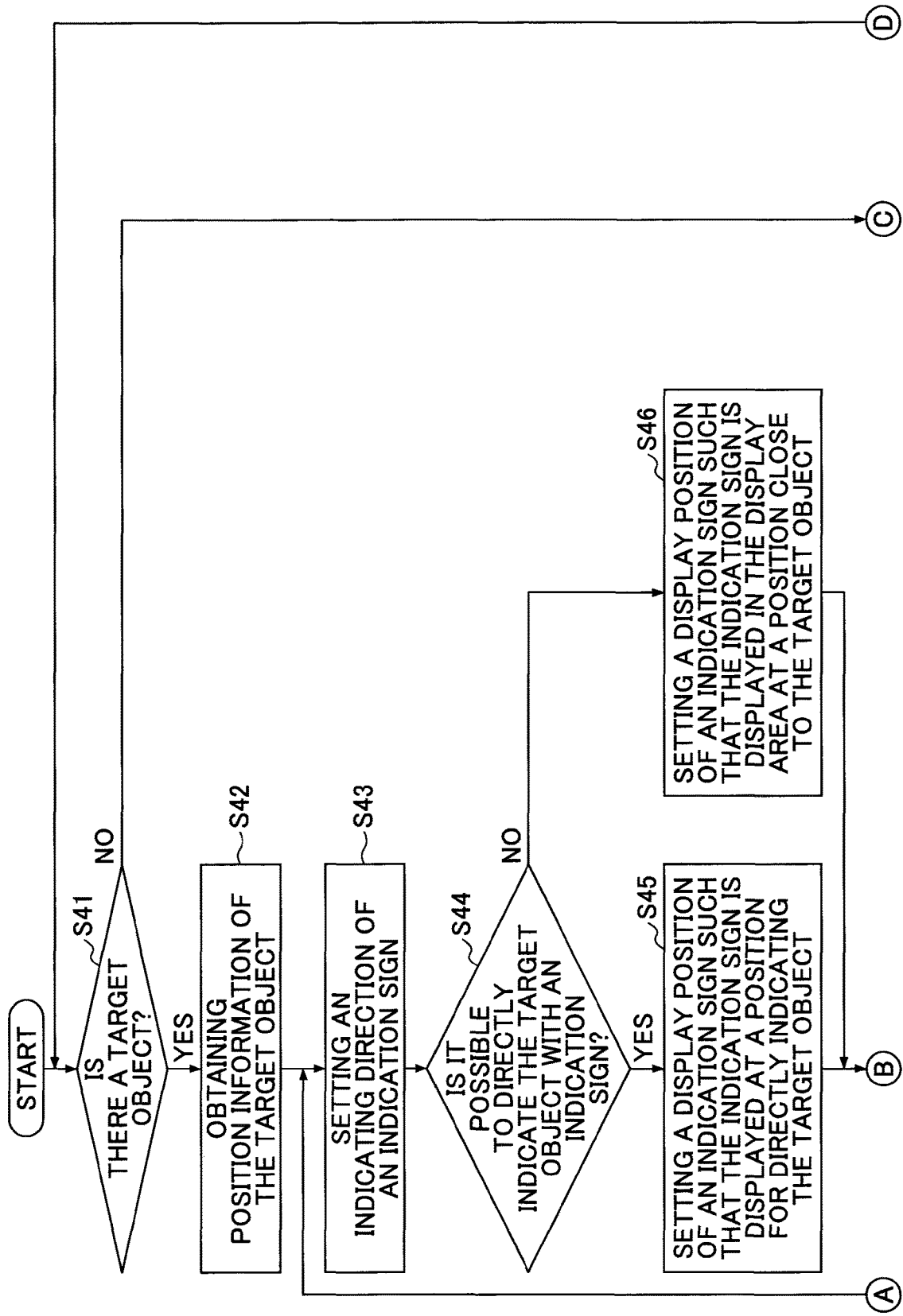

[Fig. 18B]
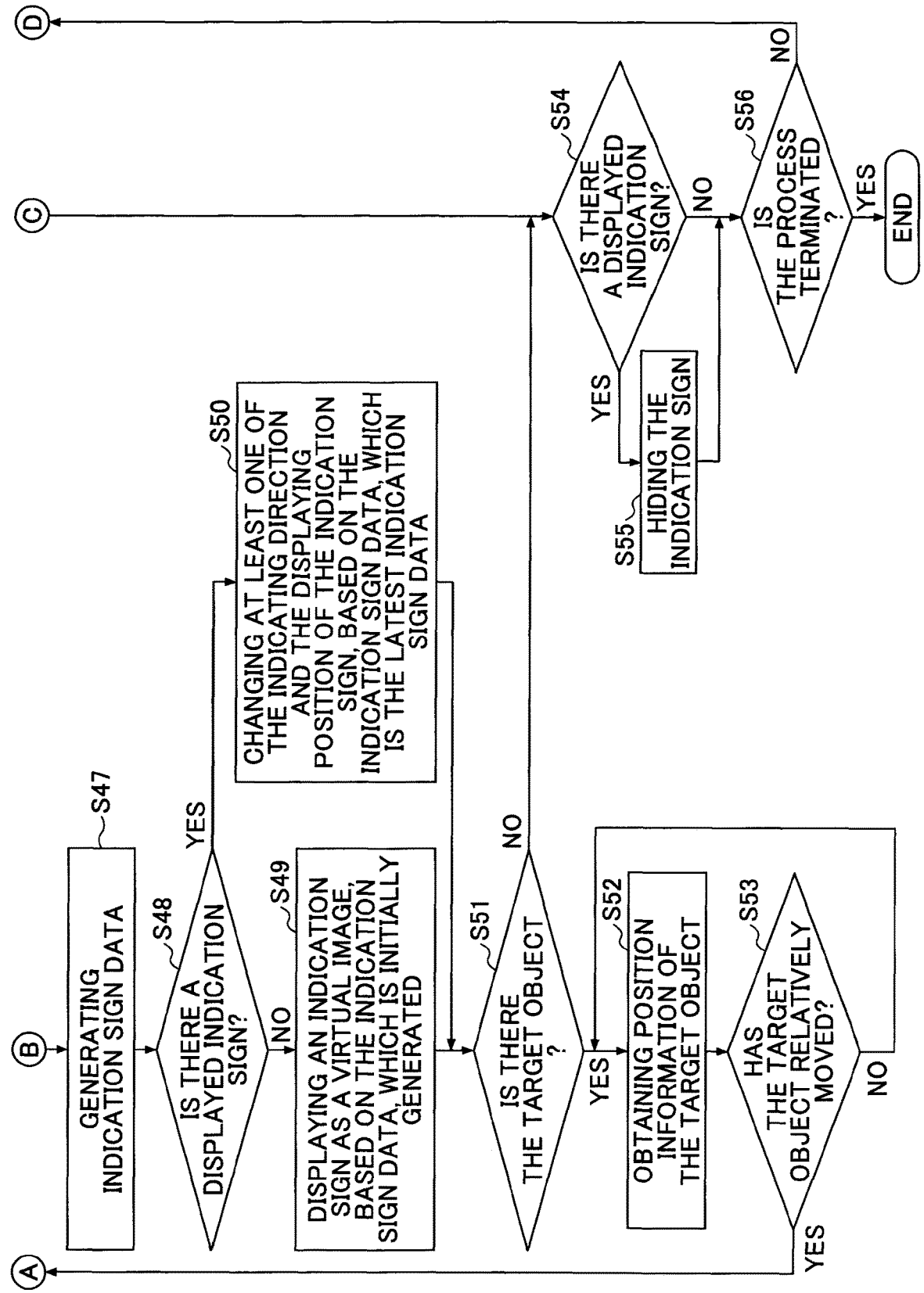

[Fig. 19A]
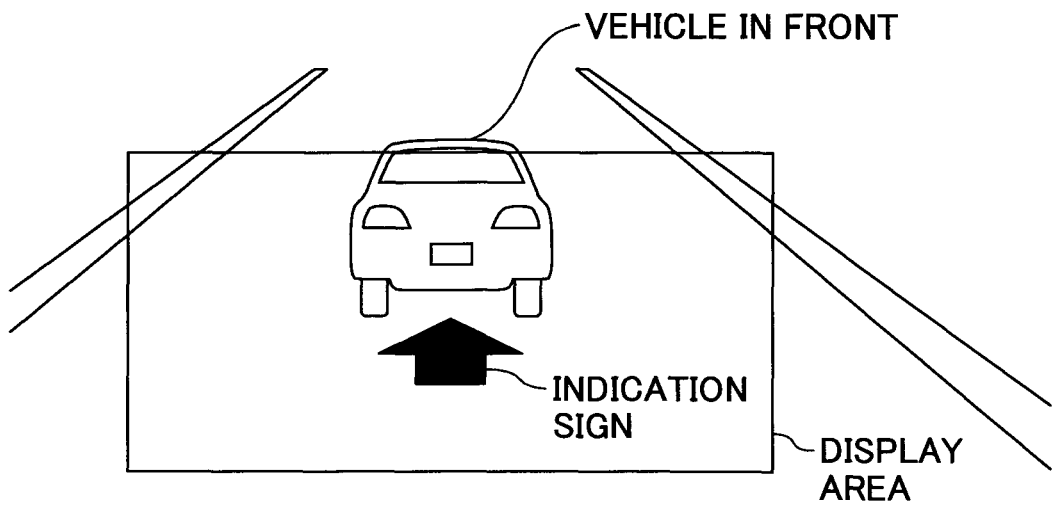
[Fig. 19B]
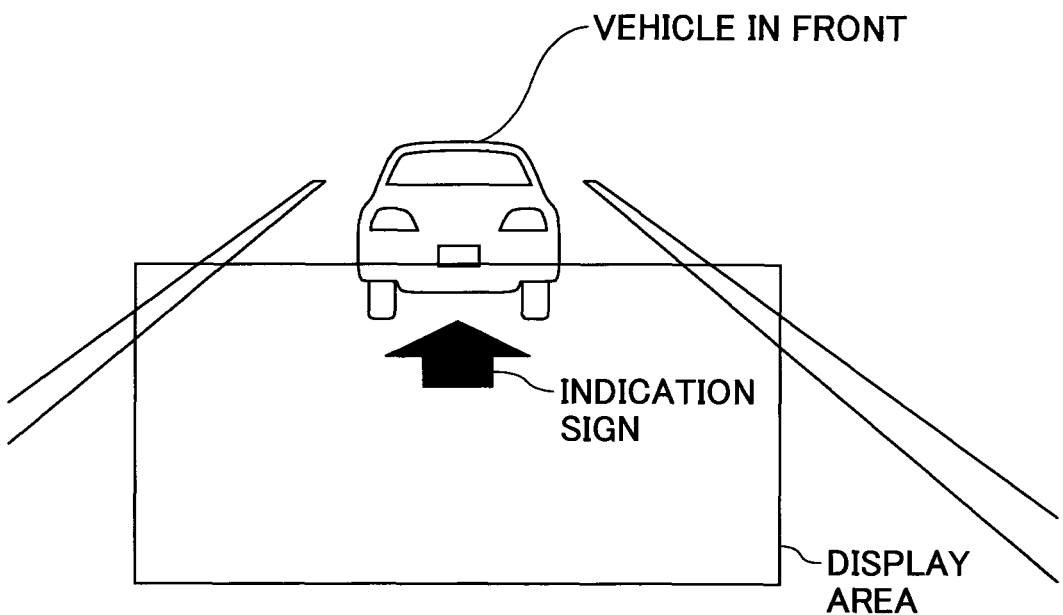

[Fig. 19C]
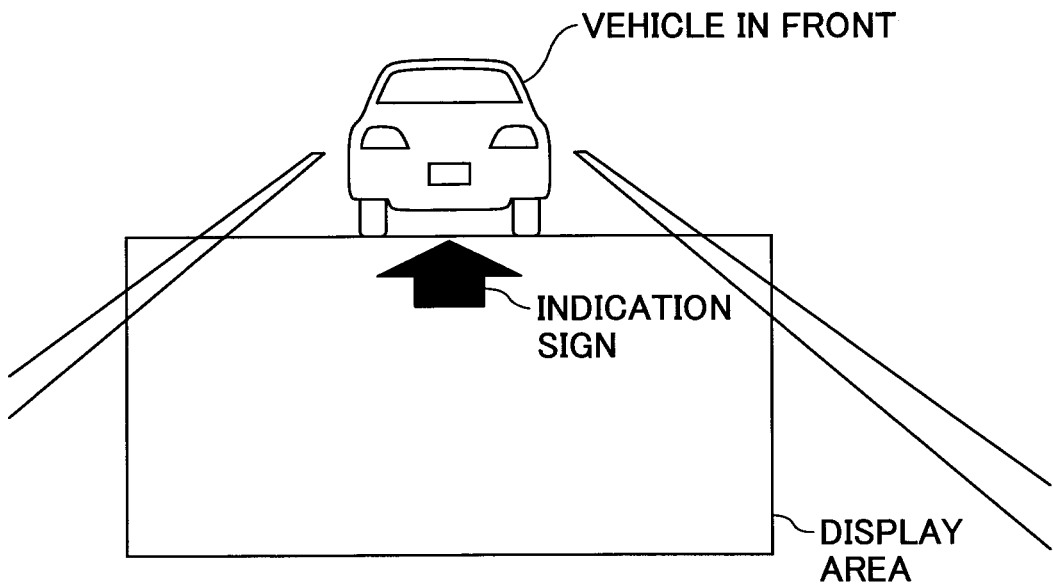
[Fig. 19D]
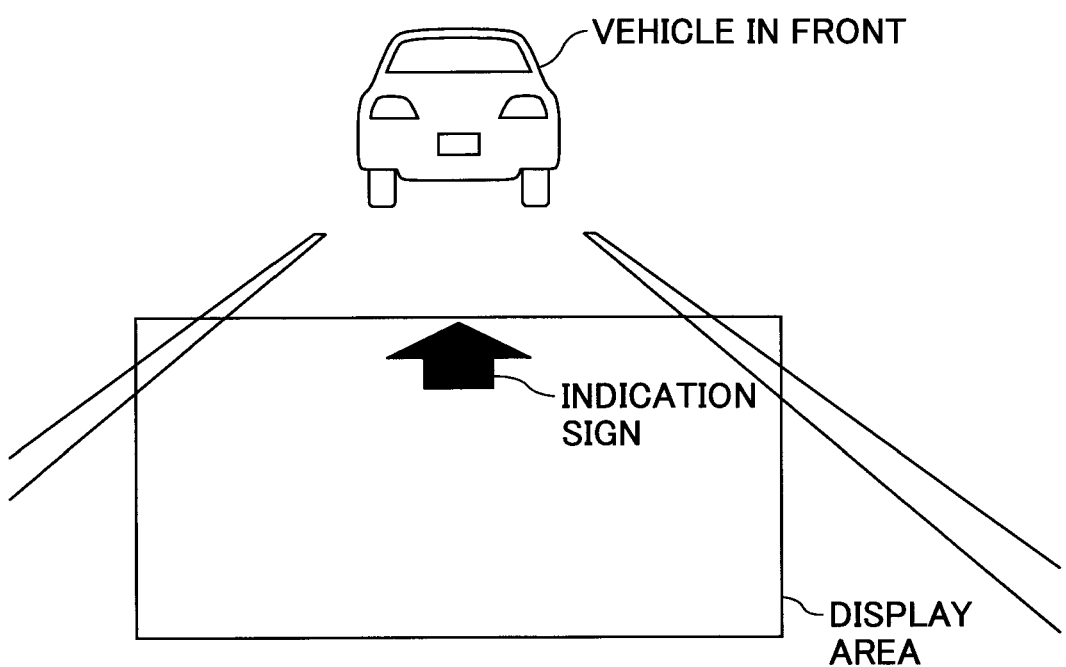

[Fig. 20A]
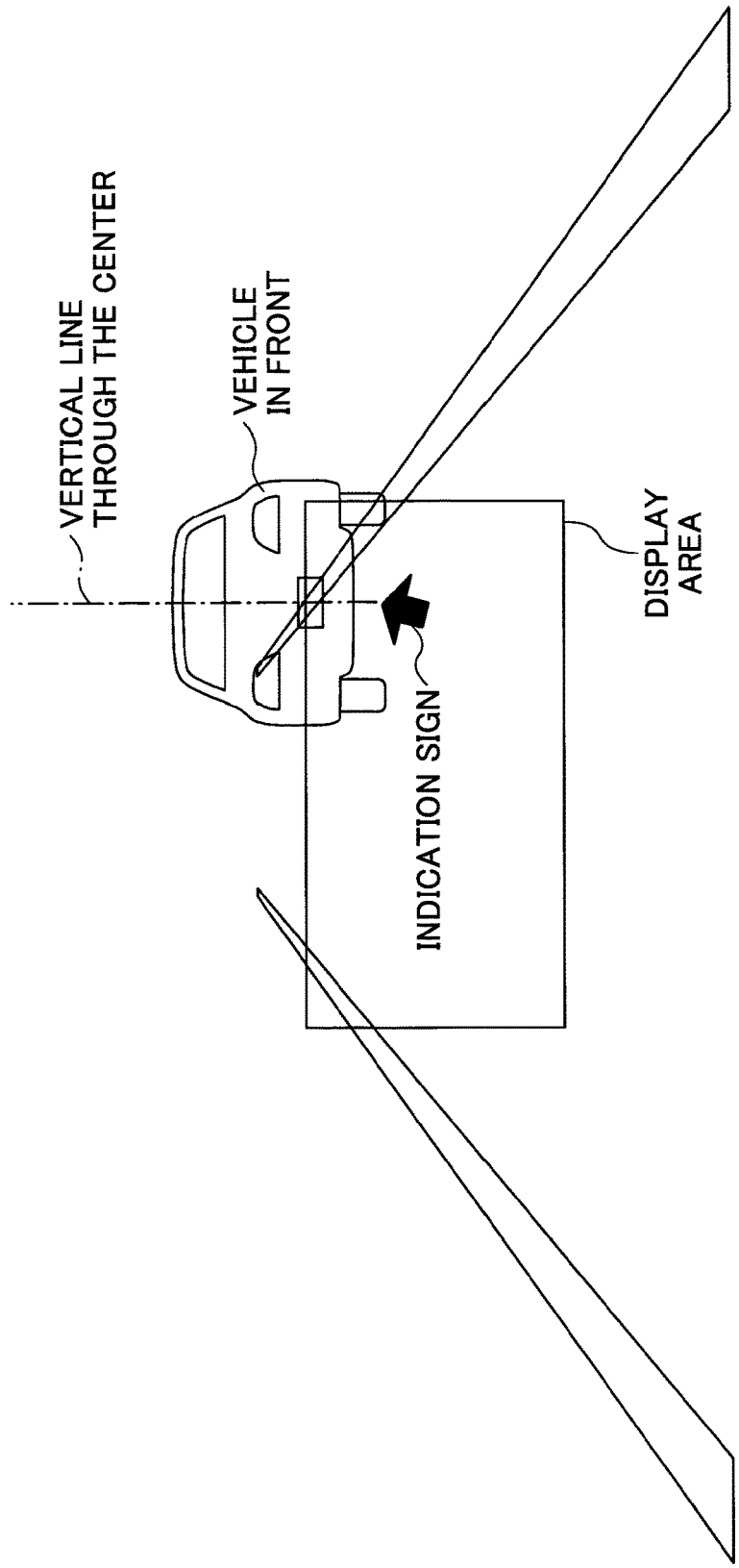

[Fig. 20B]
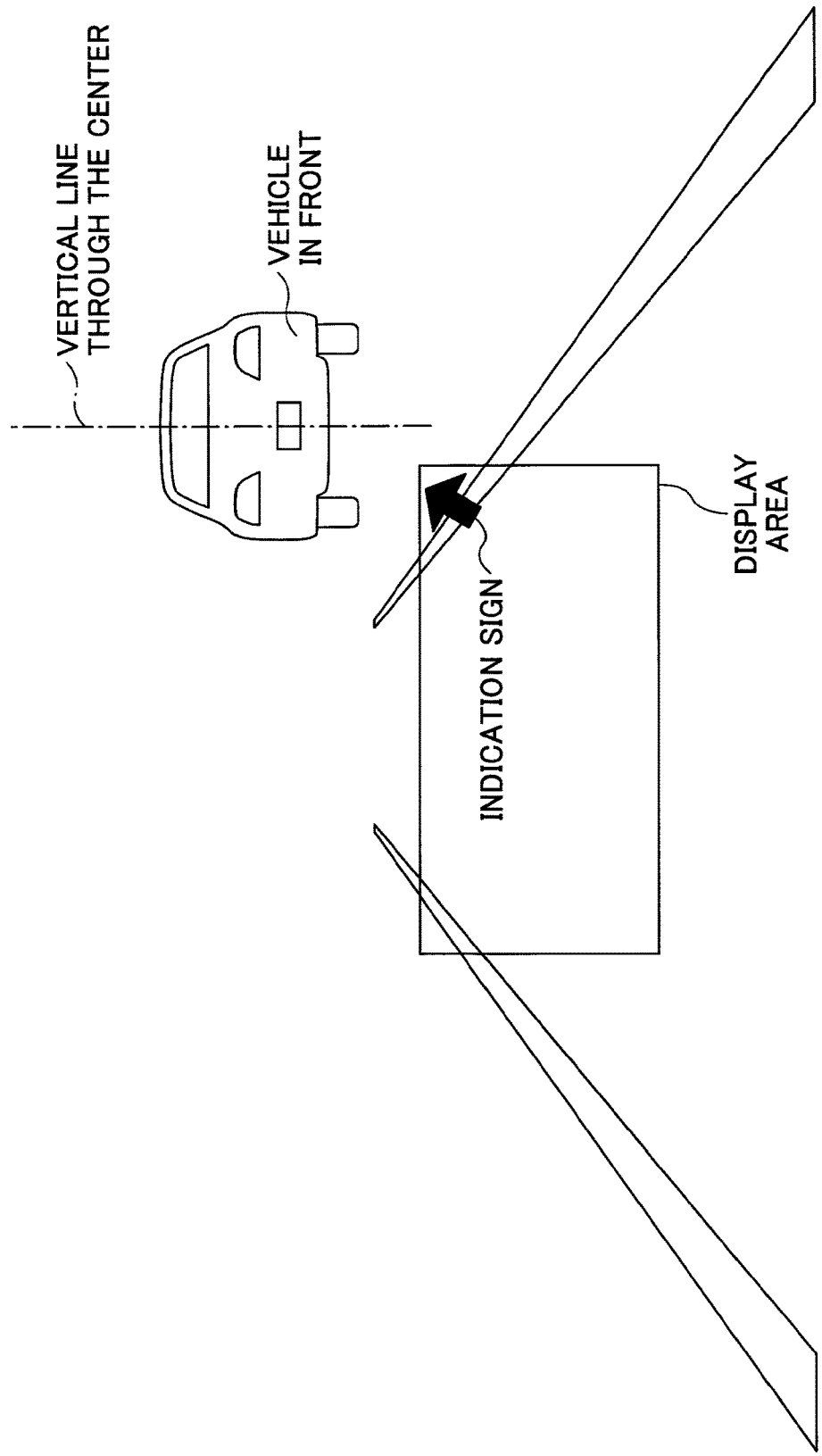

[Fig. 21]
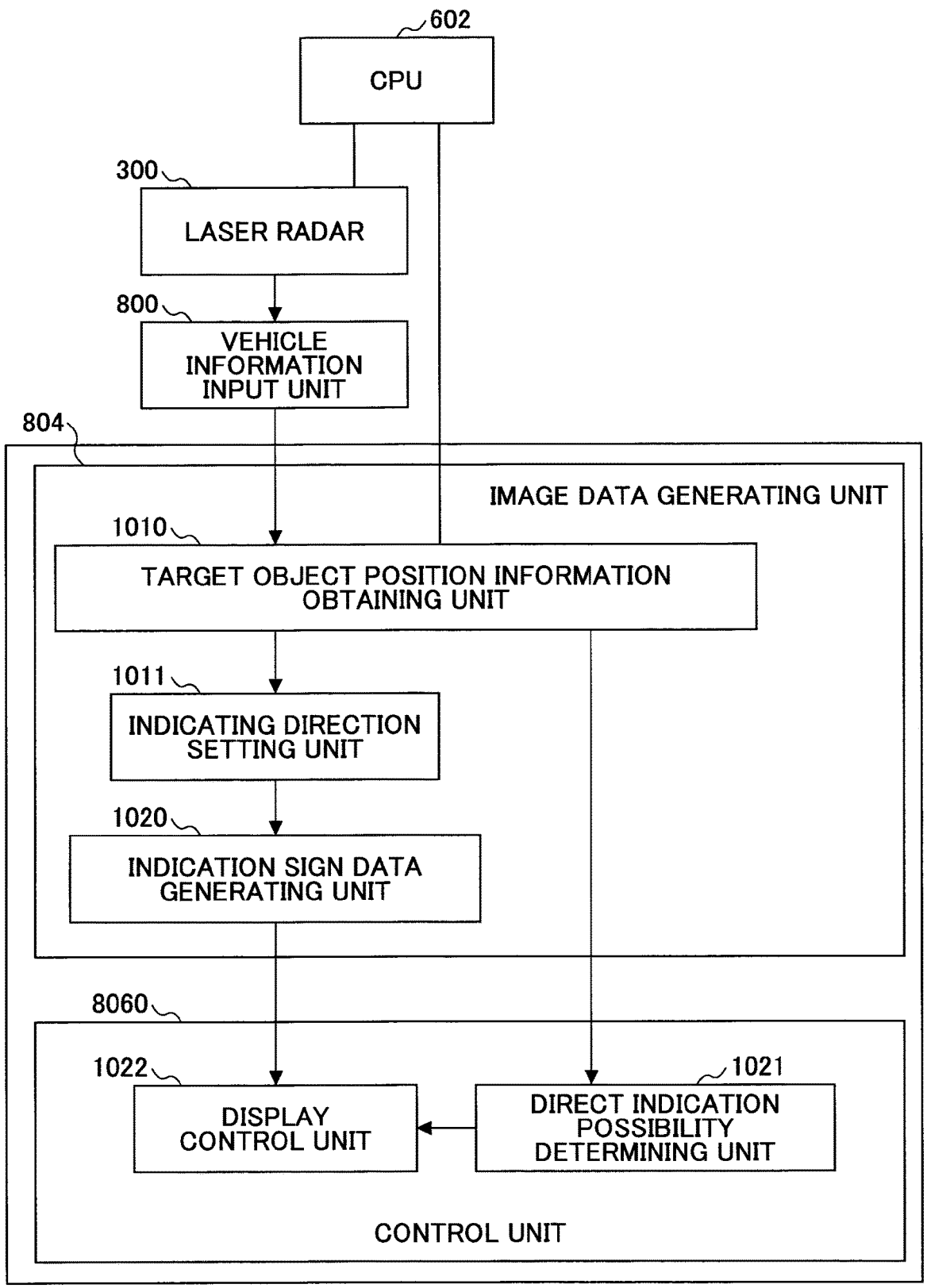

[Fig. 22A]
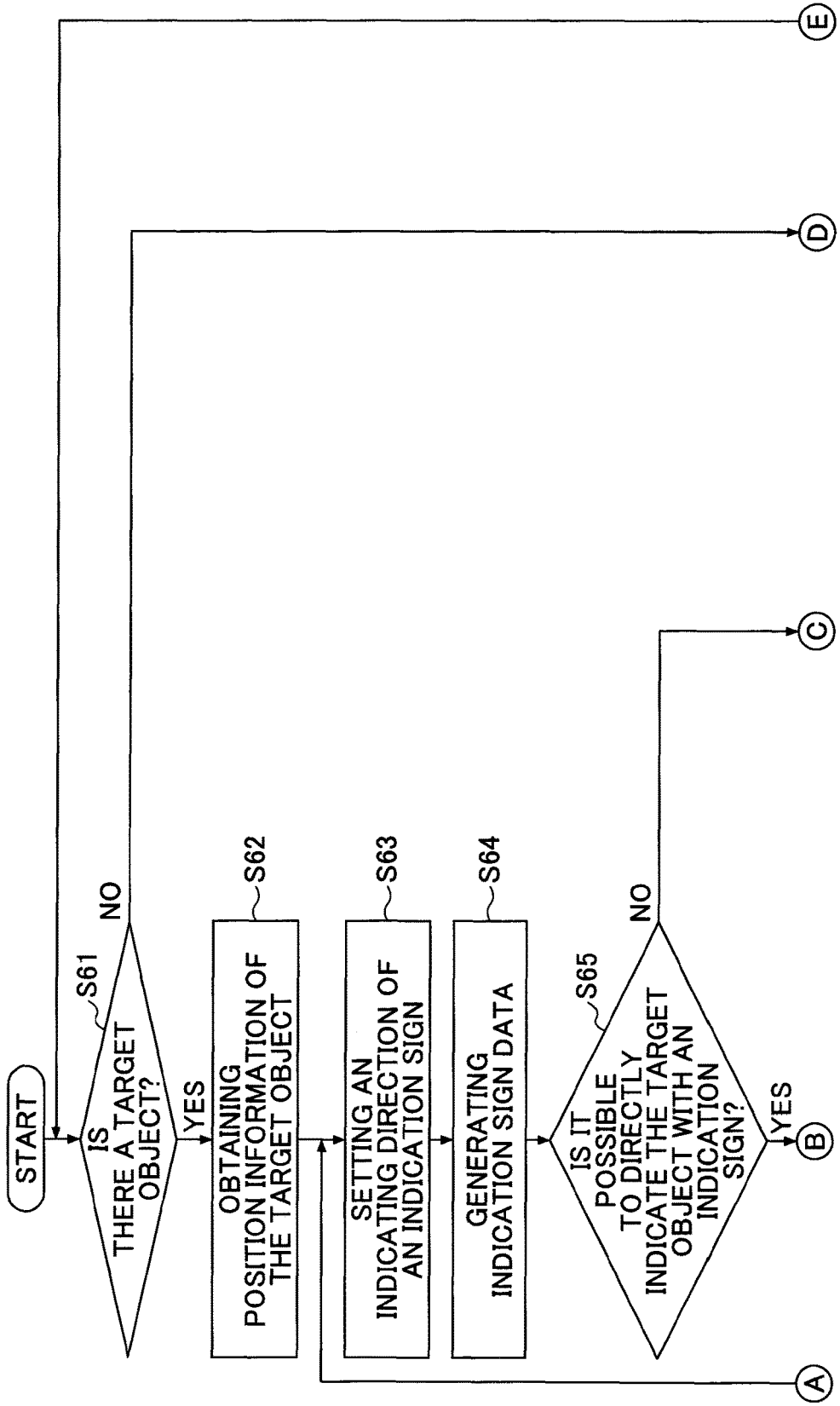

[Fig. 22B]
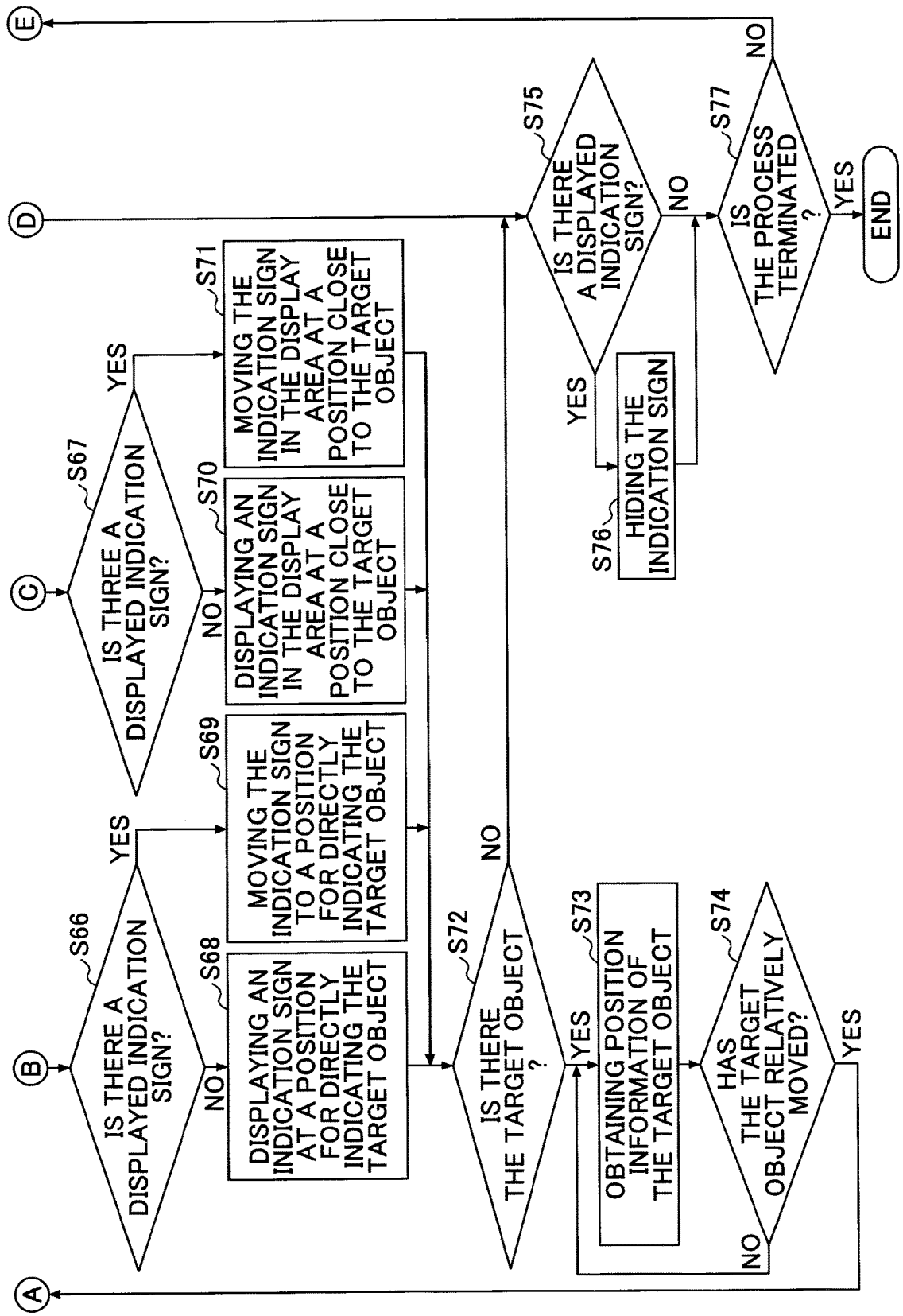

[Fig. 23A]
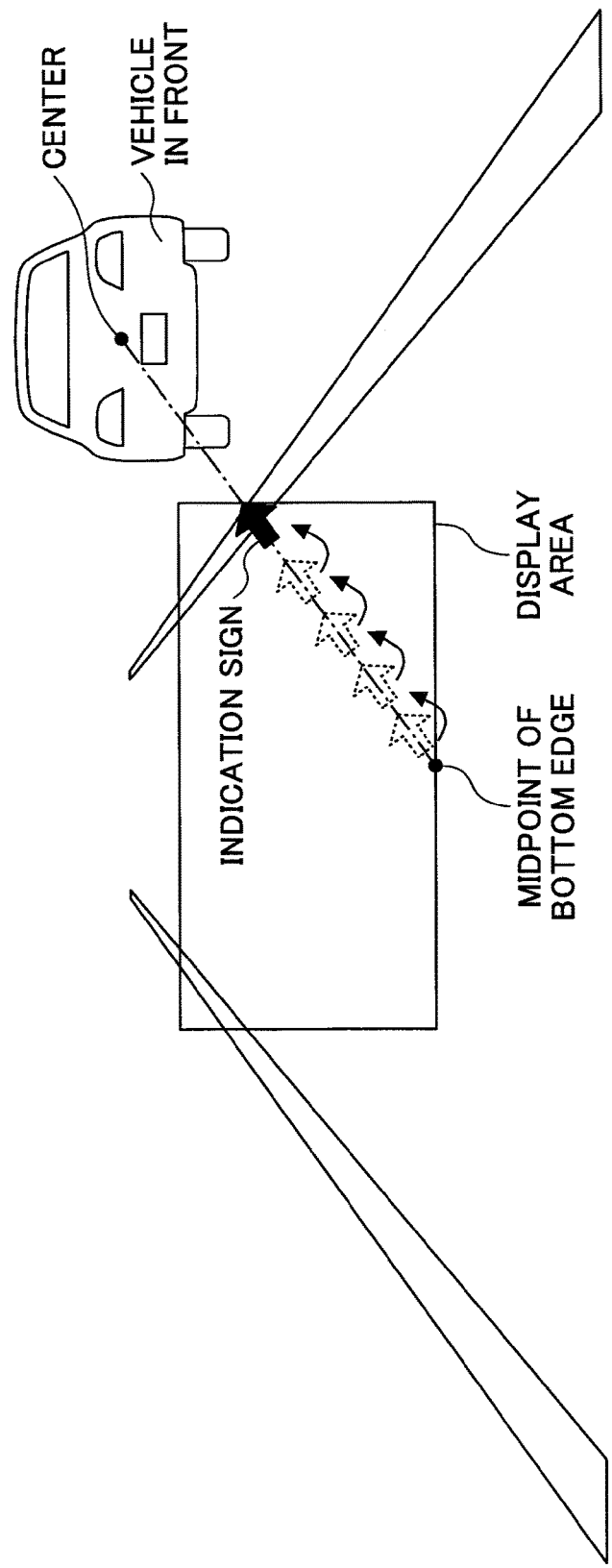

[Fig. 23B]
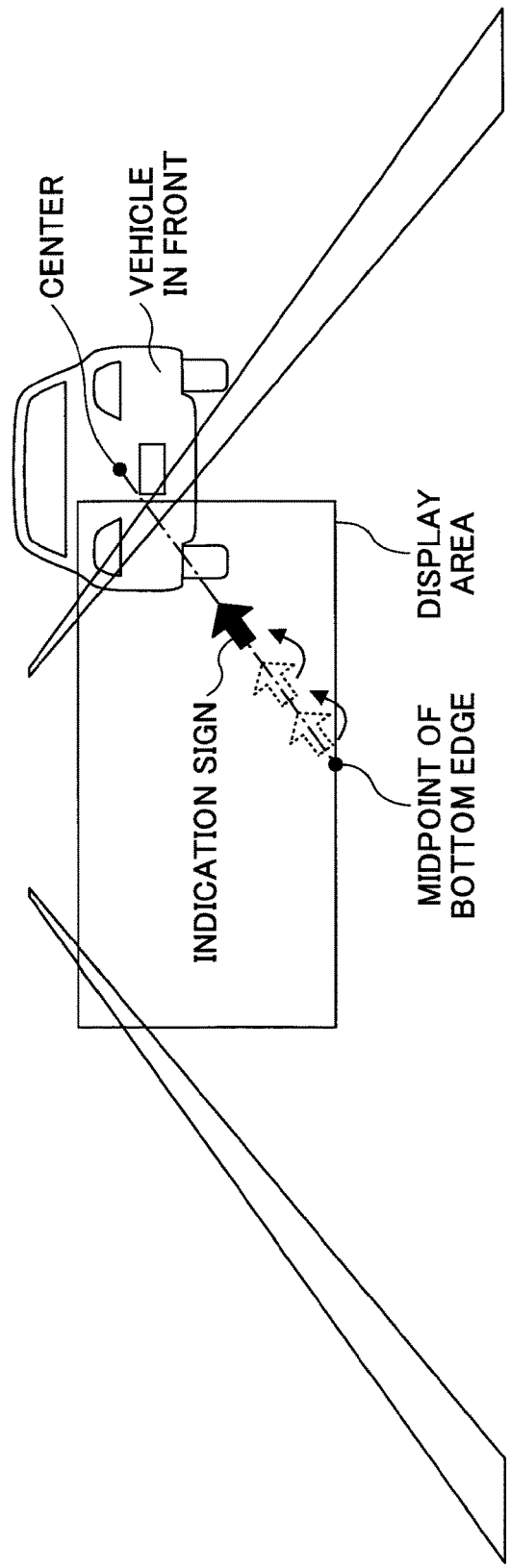

DISPLAY DEVICE, OBJECT APPARATUS AND DISPLAY METHOD

TECHNICAL FIELD

The present invention relates to a display device, an object apparatus and a display method.

BACKGROUND ART

Conventionally, a display device for displaying in a display area at least a part of a virtual image that moves in the display area has been known in the art (see PLT 1, for example).

CITATION LIST

Patent Literature

[PTL 1] Japanese Unexamined Patent Application Publication No. 2006-17626

SUMMARY OF INVENTION

Technical Problem

However, the display device as disclosed in PLT 1 suggests improvement opportunities in terms of making a display area less perceivable to a user.

Solution to Problem

One aspect of the present invention provides a display device for displaying in a display area at least a part of a virtual image that moves in the display area. The display device includes a control device that is capable of controlling a characteristic of the virtual image in accordance with position of the virtual image relative to the display area.

Advantageous Effects of Invention

According to the present invention, it is possible to make a display area less perceivable to a user.

BRIEF DESCRIPTION OF DRAWINGS

FIG. 1 is a drawing illustrating an overall configuration of a head-up display (HUD) device according to an embodiment of the present invention;

FIG. 2 is a block diagram illustrating a hardware configuration of a control system of the HUD device according to the embodiment of the present invention;

FIG. 3 is a functional block diagram of the HUD device according to the embodiment of the present invention;

FIG. 4 is a drawing for explaining a light source device of the HUD device according to the embodiment of the present invention;

FIG. 5 is a drawing for explaining a light deflector of the HUD device according to the embodiment of the present invention;

FIG. 6 is a drawing illustrating a correspondence relation between a mirror of the light deflector and a scanning region, according to the embodiment of the present invention;

FIG. 7 is a drawing illustrating an example of a trajectory of a scanning line at a time of two-dimensional scanning, according to the embodiment of the present invention;

FIG. 8A is a drawing for explaining difference in effects, which is caused by difference in sizes of a luminous flux diameter of incident light and a lens diameter of a micro-lens array, according to the embodiment of the present invention;

FIG. 8B is a drawing for explaining difference in effects, which is caused by difference in sizes of a luminous flux diameter of incident light and a lens diameter of a micro-lens array, according to the embodiment of the present invention;

FIG. 9 is a drawing illustrating a display area that is superimposed on scenery in front of a driver's vehicle, according to the embodiment of the present invention;

FIG. 10A is a drawing for explaining an example (or a comparative example) of displaying in the display area at least a part of a guide sign, which horizontally traverses the display area, according to the embodiment of the present invention;

FIG. 10B is a drawing for explaining an example (or a comparative example) of displaying in the display area at least a part of a guide sign, which horizontally traverses the display area, according to the embodiment of the present invention;

FIG. 11A is a drawing for explaining an example (or a comparative example) of displaying in the display area at least a part of an indication sign for indicating a target object, according to the embodiment of the present invention;

FIG. 11B is a drawing for explaining an example (or a comparative example) of displaying in the display area at least a part of an indication sign for indicating a target object, according to the embodiment of the present invention;

FIG. 12 is a block diagram illustrating a configuration of a field-programmable gate array (FPGA) according to the practical example 1 in the embodiment of the present invention;

FIG. 13A is a part of a flowchart for explaining a displaying process according to the practical example 1 in the embodiment of the present invention;

FIG. 13B is the other part of the flowchart for explaining a displaying process according to the practical example 1 in the embodiment of the present invention;

FIG. 14A is a drawing for explaining the displaying process according to the practical example 1 and a practical example 2 in the embodiment of the present invention;

FIG. 14B is a drawing for explaining the displaying process according to the practical example 1 and the practical example 2 in the embodiment of the present invention;

FIG. 14C is a drawing for explaining the displaying process according to the practical example 1 and the practical example 2 in the embodiment of the present invention;

FIG. 14D is a drawing for explaining the displaying process according to the practical example 1 and the practical example 2 in the embodiment of the present invention;

FIG. 14E is a drawing for explaining the displaying process according to the practical example 1 and the practical example 2 in the embodiment of the present invention;

FIG. 14F is a drawing for explaining the displaying process according to the practical example 1 and the practical example 2 in the embodiment of the present invention;

FIG. 14G is a drawing for explaining the displaying process according to the practical example 1 and the practical example 2 in the embodiment of the present invention;

FIG. 14H is a drawing for explaining the displaying process according to the practical example 1 and the practical example 2 in the embodiment of the present invention;

FIG. 14I is a drawing for explaining the displaying process according to the practical example 1 and the practical example 2 in the embodiment of the present invention;

FIG. 14J is a drawing for explaining the displaying process according to the practical example 1 and the practical example 2 in the embodiment of the present invention;

FIG. 15 is a block diagram illustrating a configuration of an FPGA according to the practical example 2 in the embodiment of the present invention;

FIG. 16A is a part of a flowchart for explaining a displaying process according to the practical example 2 in the embodiment of the present invention;

FIG. 16B is the other part of the flowchart for explaining a displaying process according to the practical example 2 in the embodiment of the present invention;

FIG. 17 is a block diagram illustrating a configuration of an FPGA according to the practical example 3 in the embodiment of the present invention;

FIG. 18A is a part of a flowchart for explaining a displaying process according to the practical example 3 in the embodiment of the present invention;

FIG. 18B is the other part of the flowchart for explaining a displaying process according to the practical example 3 in the embodiment of the present invention;

FIG. 19A is a drawing for explaining the displaying process according to the practical example 3 in the embodiment of the present invention and a displaying process according to a practical example 4 in the embodiment of the present invention;

FIG. 19B is a drawing for explaining the displaying process according to the practical example 3 in the embodiment of the present invention and the displaying process according to the practical example 4 in the embodiment of the present invention;

FIG. 19C is a drawing for explaining the displaying process according to the practical example 3 in the embodiment of the present invention and the displaying process according to the practical example 4 in the embodiment of the present invention;

FIG. 19D is a drawing for explaining the displaying process according to the practical example 3 in the embodiment of the present invention and the displaying process according to the practical example 4 in the embodiment of the present invention;

FIG. 20A is a drawing for explaining the displaying process according to the practical example 3 in the embodiment of the present invention and the displaying process according to the practical example 4 in the embodiment of the present invention;

FIG. 20B is a drawing for explaining the displaying process according to the practical example 3 in the embodiment of the present invention and the displaying process according to the practical example 4 in the embodiment of the present invention;

FIG. 21 is a block diagram illustrating a configuration of an FPGA according to the practical example 4 in the embodiment of the present invention;

FIG. 22A is a part of a flowchart for explaining the displaying process according to the practical example 4 in the embodiment of the present invention;

FIG. 22B is the other part of the flowchart for explaining the displaying process according to the practical example 4 in the embodiment of the present invention;

FIG. 23A is a drawing illustrating an example of displaying an indication sign such that the indication sign pops up, according to the embodiment of the present invention; and FIG. 23B is a drawing illustrating an example of displaying an indication sign such that the indication sign pops up, according to the embodiment of the present invention.

DESCRIPTION OF EMBODIMENTS

<Overview>

The following description explains an HUD device 100 according to an embodiment, with reference to drawings. Note that "HUD" is an abbreviation of "head-up display".

In FIG. 1, an overall configuration of an HUD device 100 according to the present embodiment is schematically illustrated.

<<Overall Configuration of an HUD Device>>

Note that projection methods for a head-up display include: a "panel method", in which an intermediate image is formed by means of an imaging device such as a liquid crystal panel, a digital mirror device (DMD) panel or a vacuum fluorescent display (VFD); and a "laser scanning method", in which an intermediate image is formed by means of a two-dimensional scanning device that performs scanning with a laser beam emitted by a laser light source. Particularly, in the latter method, i.e., the laser scanning method, emission or non-emission of light can be assigned for each pixel. Hence, generally, it is possible to form high-contrast images, unlike a panel method, in which images are formed by partially shielding light emission of an entire screen.

Therefore, the "laser scanning method" is employed for the HUD device 100. Needless to say, the "panel method" as described above may be employed as a projection method as well.

For example, the HUD device 100 may be mounted on a vehicle, etc., so that navigation information (e.g., speed of the vehicle, a traveling direction, distance to a destination, a name of a current place, existence and a position of an object (i.e. a target object) in front of the vehicle, a sign such as a speed limit sign, information such as traffic backup information, etc.), which is needed for controlling the vehicle, becomes visible via a front windshield 50 (cf. FIG. 1) of the vehicle. Here, the front windshield 50 functions as a transparent/reflective member, which passes a part of incident light through and reflects at least a part of the remainder. The following description mainly explains examples of an HUD device 100 mounted on a vehicle, or a car, which is provided with a front windshield 50.

As illustrated in FIG. 1, the HUD device 100 is provided with: a light-scanning device 10, which includes a light source device 11, a light deflector 15 and a scanning mirror 20; a screen 30; and a concave mirror 40. The HUD device 100 irradiates the front windshield 50 with light (i.e. imaging light) to form an image, such that a virtual image I becomes visible from a viewing point of a viewer A (i.e., in this example, a driver, who is a passenger of the car). That is to say, the viewer A can see an image (i.e., an intermediate image), which is formed (i.e., depicted) by the light-scanning device 10 on a screen, as a virtual image I via the front windshield 50.

For example, the HUD device 100 may be arranged beneath a dashboard of the car. Further, a distance from the viewing point of the viewer A and the front windshield 50 is from about several tens of centimeters to about a meter at most.

In this example, the concave mirror 40 is designed by means of existing optical-design simulation software, such that the concave mirror 40 has a predetermined amount of light condensing power, so as to form the virtual image I at a desired imaging position.

For the HUD device 100, a setting is provided with respect to light condensing power of the concave mirror 40, such that the virtual image I is displayed at a position (i.e., a perspective position) of, for example, a meter or more to 30 meters or less (preferably 10 meters or less) away from the viewing point of the viewer A.

Note that a front windshield is usually not flat but slightly curved. Therefore, the imaging position of the virtual image I is determined, based on the curved surfaces of the concave mirror 40 and the front windshield 50.

The light source device 11 synthesizes laser light in three colors, i.e., red (R), green (G) and blue (B), which are modulated in accordance with image data. The synthesized light of the laser light in three colors is guided to the reflection surface of the light deflector 15. The light deflector 15, which is provided as a deflection unit, is a two-axis microelectromechanical system (MEMS) scanner, which is manufactured in a semiconductor process, etc., and includes individual micro mirrors that are independently swingable with respect to orthogonal two axes. The light source device 11 and the light deflector 15 are explained in detail in the following description.

Light (i.e., synthesized light) in accordance with image data, which is output from the light source device 11, is deflected by the light deflector 15 and reflected by the scanning mirror 20, such that the screen 30 is irradiated. Here, the screen 30 is light-scanned, such that an intermediate image is formed on the screen 30. That is to say, an optical scanning system is configured with the light deflector 15 and the scanning mirror 20. Note that it is preferred that the concave mirror 40 is designed/arranged so as to correct elements of optical distortion caused by the front windshield 50, due to which a horizontal line of an intermediate image would become convex or concave.

Light that has passed through the screen 30 is reflected by the concave mirror 40 towards the front windshield 50. A part of luminous flux incident to the front windshield 50 passes through the front windshield 50 and at least a part of the remainder is reflected towards the viewing point of the viewer A. Consequently, a virtual image I, which is an intermediate image that is magnified, is visible to the viewer A via the front windshield 50. In other words, a magnified virtual image I is displayed on the front windshield 50 from the perspective of a viewer.

Note that, as a transparent/reflective member, there may be a combiner between the front windshield 50 and the viewing point of the viewer A, such that the combiner is irradiated with light from the concave mirror 40. In this case, a virtual image can be displayed as well, similarly to the case with only the front windshield 50.

<<Hardware Configuration of a Control System of the HUD Device>>

FIG. 2 is a block diagram illustrating a hardware configuration of a control system of the HUD device 100. As illustrated in FIG. 2, the control system of the HUD device 100 includes an FPGA 600, a central processing unit (CPU) 602, a read-only memory (ROM) 604, a random access memory (RAM) 606, an interface (I/F) 608, a bus line 610, a laser diode (LD) driver 6111 and a MEMS controller 615.

The FPGA 600 operates an LD, which is explained in the following description, by means of the LD driver 6111 in accordance with image data. Further, the FPGA 600 operates the light deflector 15 by means of the MEMS controller 615. The CPU 602 controls each function of the HUD device 100.

The ROM 604 stores a program for image processing, which is executed by the CPU 602 for controlling each function of the HUD device 100. The RAM 606 is utilized as a work area of the CPU 602. The I/F 608 is an interface for communication with an external controller, etc. For example, the I/F 608 may be connected to a controller area network (CAN) of a car, etc.

<<Functional Block Diagram of the HUD Device>>

FIG. 3 is a block diagram illustrating functions of the HUD device 100. As illustrated in FIG. 3, the HUD device 100 is provided with a vehicle information input unit 800, an external information input unit 802, an image data generating unit 804 and an image depicting unit 806. To the vehicle information input unit 800, information regarding a vehicle such as speed, traveling distance, a position of a target object or brightness of the surrounding environment is input via a CAN, etc. To the external information input unit 802, information regarding outside of a vehicle such as navigation information from a car navigation system that is mounted on a car is input via an external network. The image data generating unit 804 generates image data representing an image to be depicted, based on information that is input from the vehicle information input unit 800, the external information input unit 802, etc., and transmits the image data to the image depicting unit 806. The image depicting unit 806, which is provided with a control unit 8060, depicts an image in accordance with received image data. The image data generating unit 804 and the control unit 8060 are actualized by the FPGA 600. The image depicting unit 806 is actualized by the LD driver 6111, the MEMS controller 615, the light-scanning device 10, the screen 30, the concave mirror 40, etc., in addition to the FPGA 600.

<<Configuration of the Light Source Device>>

FIG. 4 is a drawing illustrating a configuration of the light source device 11. As illustrated in FIG. 4, the light source device 11 includes multiple (e.g., three) light emitting elements 111R, 111B and 111G, each of which is provided with a single or multiple luminous points. Each of the light emitting elements is an LD, which emits luminous flux with mutually different wavelength $\lambda R$, $\lambda G$, or $\lambda B$. For example, $\lambda R$ equals to 640 nm, $\lambda G$ equals to 530 nm, and $\lambda B$ equals to 445 nm. In the following description, the light emitting element 111R may be also represented as an LD 111R, the light emitting element 111G may be also represented as an LD 111G, and the light emitting element 111B may be also represented as an LD 111B. Each of the luminous flux with wavelength $\lambda R$, $\lambda G$ or $\lambda B$, which is emitted by the LD 111R, the LD 111G or the LD 111B, is coupled by a corresponding coupling lens 112R, 112G or 112B before entering into subsequent parts of the optical system. The coupled luminous flux is reshaped by a corresponding aperture member 113R, 113G or 113B. The opening of each aperture member may be in various shapes such as a round shape, an oval shape, a rectangular shape and a square shape, depending on divergence angle of luminous flux, etc. Then, light that is reshaped by a corresponding aperture is synthesized into a light path by a synthesizing element 115. The synthesizing element 115 is a dichroic mirror in a shape of a plate or a prism, which reflects or transmits luminous flux, depending on wavelengths, and synthesizes the luminous flux into a light path. The synthesized luminous flux is guided by a lens 119 towards the reflection surface of the light deflector 15. The lens 119 is a meniscus lens with a concave surface facing the light deflector 15.

<<Configuration of the Light Deflector>>

FIG. 5 is a drawing illustrating a configuration of the light deflector 15. The light deflector 15 is a two-axis MEMS scanner, which is manufactured in a semiconductor process. As illustrated in FIG. 5, the light deflector 15 includes: a mirror 150, which has a reflection surface; multiple beams, which are arranged in a direction of the a-axis; and a pair of meandrous parts 152, in which each pair of adjacent beams is connected via a turn-around part so as to be meandrous. Each pair of adjacent beams in each meandrous part 152 is either beam A (152a) or beam B (152b), and is supported by a frame member 154. Each of the multiple beams is individually provided with a piezoelectric member 156 (e.g., a piezoelectric transducer (PZT)). When different voltages are applied to a pair of adjacent beams in each meandrous part, the pair of adjacent beams in each meandrous part are deflected in different directions. Then, due to accumulation of the deflection, the mirror 150 rotates at a large angle around the α-axis (i.e., in the vertical direction). With the above-described configuration, it is possible to perform light-scanning in a vertical direction with the α-axis as the central axis by use of low voltage. Contrarily, in a horizontal direction with the β-axis as the central axis, light-scanning is performed by use of resonance with a torsion bar, etc., that is connected to the mirror 150.

Although the HUD device 100 momentarily projects only a point image that is comparable to a diameter of a laser beam, an afterimage sufficiently remains to human eyes within a frame of an image because scanning is performed extremely fast. Taking advantage of such an afterimage phenomenon, a viewer perceives as if an image were projected on a "display area". In reality, an image appearing on a screen is reflected by the concave mirror 40 and the front windshield 50, such that a viewer perceives a virtual image of the image on the "display area". Having the above-described mechanism, it is possible to stop emission of an LD, in a case of not displaying an image. In other words, in the "display area", luminance of a non-displaying area of a virtual image can be substantially 0.

As described, imaging of a virtual image is performed by the HUD device 100 at an imaging position in a predetermined "display area", where imaging of the virtual image is possible. The "display area" is determined as specified when designing the HUD device.

Therefore, as a "laser-scanning method" is employed, it is possible to turn off a light of an LD or to decrease an amount of light at a non-displaying area, where displaying is not needed.

Contrarily, in a "panel method", where expression of an intermediate image is performed by means of an imaging device such as a liquid crystal panel or a DMD panel, lighting of the entire panel is necessary. Hence, even with an image signal indicative of a black-display, which is for not displaying, it is difficult to achieve completely 0, due to characteristics of a liquid crystal panel or a DMD panel. Therefore, there has been a case where a black part appears to be glowing (or floating). However, in a laser-scanning method, it is possible to eliminate glowing of black (or black floating).

Note that each emitting element of the light source device 11 is controlled by the FPGA 600 with respect to luminescence intensity, lighting timing and optical waveforms and is driven by the LD driver 6111 to emit light. As illustrated in FIG. 6, light that is emitted by each of the emitting elements and synthesized into a light path is deflected by the light deflector 15 with respect to two dimensions, based on rotation around the α-axis and rotation around the β-axis, and is intermediated by the scanning mirror 20 (cf. FIG. 1) so as to be emitted as scanning light towards the screen 30. That is to say, the screen 30 is scanned by the scanning light in two dimensions. Note that, in FIG. 6, illustration of the scanning mirror 20 is omitted.

The scanning light performs swing-motion scanning (i.e., two-way scanning) in the main-scanning direction at a high-order frequency of approximately 20000 to 40000 Hz and at the same time performs one-way scanning in the sub-scanning direction at a low-order frequency of approximately several tens of Hz. That is to say, raster scanning is performed. Here, depiction per a pixel and displaying of a virtual image can be performed, by controlling emission of each emitting element in accordance with scanning position (i.e., position of the scanning light).

Time for depicting a screen, or scanning time (i.e., a cycle of two dimensional scanning) per a frame, is several tens of milliseconds because, as described above, a sub-scanning cycle is several tens of Hz. For example, in a case where a main-scanning cycle is 20000 Hz and a sub-scanning cycle is 50 Hz, scanning time per a frame is 20 milliseconds.

As described in FIG. 7, the screen 30 includes: an image region 30a (i.e., a valid scanning region), on which an image is depicted (i.e., which is irradiated with light that is modulated in accordance with image data); and a frame region 30b, which encloses the image region.

In the following description, the entire range on which the light deflector 15 is capable of scanning is referred to as a "scanning range". Note that, in this embodiment, the scanning range is a range in combination of the image region 30a and a part (i.e., a part near the outer edge of the image region 30a) of the frame region 30b of the screen 30. In FIG. 7, a trajectory of a scanning line in the scanning range is illustrated with a zig-zag line. In FIG. 7, for convenience, the number of scanning lines is fewer than in reality.

The image region 30a of the screen 30 is configured with a transparent element having a light diffusion effect such as a micro-lens array. The image region is not required to be in a rectangular or flat shape and may be in a polygonal or round shape. Further, the screen 30 may be a flat or round plate without a light diffusion effect. Further, the image region may be a reflective element having a light diffusion effect such as a micro-mirror array, depending on device layouts.

The following description explains diffusion and occurrence of coherence noise with respect to a micro-lens array employed for an image region of the screen 30, with reference to FIGS. 8A and 8B. In FIG. 8A, the reference sign 852 is indicative of a micro-lens array. The micro-lens array 852 has a micro convex lens configuration, which includes aligning micro convex lenses 851. A luminous flux diameter 857 of a "pixel displaying beam", which is indicated by the reference sign 853, is smaller than the size of a micro convex lens 851. In other words, the size 856 of the micro convex lens 851 is larger than the luminous flux diameter 857. Note that, in the practical examples of this explanation, the pixel displaying beam 853 is a laser luminous flux with light intensity distribution in the form of Gaussian distribution around the center of the luminous flux. Accordingly, the luminous flux diameter 857 is a radial directional distance of luminous flux that causes light intensity in the light intensity distribution to be decreased down to "1/e2". Although, in FIG. 8A, the luminous flux diameter 857 is illustrated to be the same size as the size 856 of the micro convex lens 851, the luminous flux diameter 857 is not required to be the same size as "the size 856 of the micro convex lens 851", but is only required not to be larger than the size 856 of the micro convex lens 851. In FIG. 8A, the entirety of the pixel displaying beam 853 is incident to a micro convex lens 851 and is converted into diffused luminous flux 854 with a divergence angle 855. Note that the "divergence angle" may be referred to as a "diffusion angle" in the following description. In a situation as illustrated in FIG. 8A, coherence noise does not occur because there is single diffused luminous flux 854 without any other luminous flux to interfere with. Note that the size of the divergence angle 855 can be adjusted, as needed, with the shape of the micro convex lens 851. In FIG. 8B, a pixel displaying beam 811 has a luminous flux diameter that is twice as large as the alignment pitch 812 of micro convex lenses. Hence, the pixel displaying beam 811 is incident astride to two micro convex lenses 813 and 814. In this case, the pixel displaying beam 811 is diffused into two diffused luminous fluxes 815 and 816 because of the two micro convex lenses 813 and 814 that the pixel displaying beam 811 is incident to. As the two diffused luminous fluxes 815 and 816 overlap in a region 817, coherence noise occurs because of mutual interference in the region.

Returning back to FIG. 7, there is a synchronization detecting system 60, which includes a light receiving element, in the peripheral region (i.e., a part of the frame region 30b) of the image region 30a, which is within the scanning range. In this example, the synchronization detecting system 60 is placed in the positive Y-direction of the corner, which is in the negative X-/positive Y-direction of the image region. In the following explanation, the main-scanning direction of the screen 30 is considered to be the X-direction and the sub-scanning direction of the screen 30 is considered to be the Y-direction.

The synchronization detecting system 60 detects operation of the light deflector 15, so as to output, to the FPGA 600, a synchronization signal for determining timing to start scanning and timing to finish scanning.

(Detail) Note that the display area of the HUD device 100 is superimposed on scenery (e.g., on a road in front) in front of the driver's vehicle (cf. FIG. 9).

As illustrated in FIGS. 10A and 10B, in a case of displaying in the display area a guide sign that moves from side to side, the guide sign is cut off when entering the display area and when exiting from the display area for traversing the display area. FIG. 10A is a drawing illustrating a situation where the guide sign, which moves from side to side, is entirely in the display area (i.e., being displayed). FIG. 10B is a drawing illustrating a situation where the guide sign, which moves from side to side, is traversing the outer edge (i.e., a vertical side) of the display area. That is to say, a situation where the guide sign is cut off is illustrated.

Furthermore, as illustrated in FIG. 11, etc., in a case where an indication sign for indicating a target object (e.g., a car in front) is displayed such that the indication follows movement of the target object, the indication sign is cut off, depending on position of the target object. In other words, it becomes impossible to display a part of the indication sign in the display area. Note that FIG. 11A is a drawing illustrating an example where an indication sign, which follows movement of a target object, is entirely displayed in the display area. FIG. 11B is a drawing illustrating an example where an indication sign, which follows movement of a target object, is cut off.

As described, in a case where a sign that moves such as a guide sign that moves or an indication sign that follows movement of a target object is cut off, the display area is exposed as a planar shape (i.e., as a two-dimensional shape) in a three-dimensional space in the view of a driver, which makes the driver feel uncomfortable.

Therefore, inventors of the present invention have applied, to the HUD device 100, configurations and functions for making the display area less perceivable to a driver when such a sign that moves is displayed inside the display area as a virtual image. The following description explains several practical examples (i.e., HUD devices 100-1, 100-2, 100-3, and 100-4 in practical examples 1 through 4, respectively) of the HUD device 100 according to the present embodiment. Note that the reference signs 100-1 through 100-4 are used in the present specification only.

Practical Example 1

The following description explains an HUD device 100-1 of the practical example 1. The practical example 1 is provided for a case where a guide sign that moves is displayed in the display area.

FIG. 12 is a block diagram illustrating a configuration example of the FPGA 600 that functions as the image data generating unit 804 and the control unit 8060 in the HUD device 100-1 of the practical example 1. In FIG. 12, each arrow is indicative of flow of data.

In the HUD device 100-1 of the practical example 1, the image data generating unit 804 obtains, via the external information input unit 802, information (e.g., information indicative of a turning direction and a place name of a next turning point, remaining distance to a next turning point, etc.) relating to a next turning point (e.g., an intersection, a fork, etc.), from a car navigation system 200, on which a route (hereinafter also referred to as a "traveling route") to be travelled by a vehicle is set by a driver, etc. Further, based on the information, the image data generating unit 804 generates animation data (hereinafter also referred to as "guide sign animation data") of a guide sign (e.g., a sign indicative of the turning direction and the place name of the next turning point, the remaining distance to the next turning point, etc.) relating to the next turning point. Further, the image data generating unit 804 transmits the animation data to the control unit 8060 of the image depicting unit 806. Based on the received guide sign animation data, the control unit 8060 displays a guide sign in the display area as a virtual image. Here, a "guide sign" is a moving sign that vertically or horizontally traverses the display area. Note that "remaining distance to a next turning point" means distance (i.e., a way to go) to a next turning point from a current location of the vehicle on the traveling route.

Hence, as a guide sign relating to a next turning point is displayed in the display area (cf. FIG. 9) that is superimposed on scenery in front of the vehicle, the driver is able to recognize information relating to the next turning point of the driver's vehicle, without looking away from the scenery in front.

In the HUD device 100-1, the image data generating unit 804 includes a turning point information obtaining unit 901 and a guide sign animation data generating unit 902, as illustrated in FIG. 12.

The turning point information obtaining unit 901 obtains from the car navigation system 200 via the external information input unit 802 information relating to a next turning point on a traveling route of the vehicle. Further, the turning point information obtaining unit 901 forwards the information to the guide sign animation data generating unit 902 and stores the information in a built-in memory.

The guide sign animation data generating unit 902 generates guide sign animation data, based on shape of the frame of a guide sign, received information relating to a next turning point and movement information (i.e., information relating to a movement starting position of a guide sign (in more detail, an original position of a bottom edge of a guide sign) and movement speed of a guide sign). Further, the guide sign animation data generating unit 902 transmits the guide sign animation data to a guide sign displaying unit 905 of the control unit 8060, which is explained in the following description. "Guide sign animation data" is data including display contents and movement information of a guide sign.

In the HUD device 100-1, the control unit 8060 includes a guide sign position detecting unit 903, a guide sign luminance control unit 904, and a guide sign displaying unit 905.

The guide sign position detecting unit 903 is internally provided with a timer for detecting on a real-time basis a guide sign position, which is a position of a guide sign relative to the display area, based on movement information and movement starting timing of the guide sign. Further, the guide sign position detecting unit 903 transmits information of the detection to the guide sign luminance control unit 904.

The guide sign luminance control unit 904 sets luminance of a guide sign on a step-by-step basis, based on received information of the detection (i.e., a guide sign position) and transmits luminance controlling information (i.e., control information) that includes a set value of the setting (i.e., set value of luminance) to the guide sign displaying unit 905.

The guide sign displaying unit 905 controls the LD driver 6111 and the MEMS controller 615, based on received guide sign animation data and luminance controlling information, so as to display animation of a guide sign as a virtual image in the display area.

Here, the image region 30a and the frame region 30b of the screen 30 are formed out of a translucent member and a light-shielding member, respectively. Therefore, imaging light that is formed on the image region 30a irradiates the front windshield 50 via the concave mirror 40, such that a virtual image of the imaging light is displayed on the display area. Contrarily, imaging light that is formed on the frame region 30b is shielded by the frame region 30b, such that a virtual image of the imaging light is not displayed on the display area. In other words, the image region 30a and the display area correspond with each other. The vertical direction of the display area corresponds to the Y-direction (cf. FIG. 7) of the image region 30a. Further, the horizontal direction of the display area corresponds to the X-direction (cf. FIG. 7) of the image region 30a.

Next, the following description explains a displaying process conducted in the HUD device 100-1 of the practical example 1, with reference to FIGS. 13A and 13B. The flowchart of FIGS. 13A and 13B corresponds to a processing algorithm executed by the CPU 602. The displaying process is initiated when a driver, etc., sets a traveling route of the driver's vehicle on the car navigation system 200.

At the first step, or Step S1, it is determined whether there is a turning point (i.e., an intersection, a fork, etc.) on a traveling route. Specifically, the CPU 602 refers to a traveling route that is set on the car navigation system 200 and determines whether there is a point that should be turned by the driver's vehicle on the traveling route. In a case of YES in this determination, the process proceeds to Step S2. In a case of NO in this determination, the flow is terminated.

At the next step, or Step S2, n is set to 1.

At the next step, or Step S3, information (hereinafter also referred to as "turning point information") relating to an n-th turning point (i.e., a next turning point) is obtained. An "n-th turning point" means an n-th turning point, counting from the first turning point, among turning points on the traveling route. Specifically, the turning point information obtaining unit 901 obtains from the car navigation system 200 turning point information, i.e., a turning direction at an n-th turning point and remaining distance to the n-th turning point, so as to transmit the turning point information to the guide sign animation data generating unit 902 and to store the turning point information in a built-in memory.

At the next step, or Step S4, movement of a guide sign relating to the n-th turning point is initiated from the top to the bottom of the display area. Specifically, the guide sign animation data generating unit 902 generates guide sign animation data, based on shape of the frame of a guide sign, the received turning point information and movement information of the guide sign. Further, the guide sign animation data generating unit 902 transmits the guide sign animation data to the guide sign displaying unit 905. The guide sign displaying unit 905 controls the LD driver 6111 and the MEMS controller 615, based on the received guide sign animation data and an original set value (i.e., a predetermined value including 0) of luminance of the guide sign, so as to start forming an image in the frame region 30b, which is above (i.e., in the positive Y-direction) the image region 30a, per a frame of animation of the guide sign (e.g., "2 km AWAY: TURN LEFT"), and to cause the guide sign to start moving (cf. FIG. 14A) from a movement starting position (i.e., a position corresponding to the frame region 30b), which is above the display area, towards the display area. Further, the guide sign displaying unit 905 informs the guide sign position detecting unit 903 of movement starting timing of the guide sign. In other words, at Step S4, the guide sign with predetermined luminance, which may be 0, starts moving from above the display area towards the display area. Note that, in FIG. 14A, the guide sign is illustrated above the display area with a dashed-two dotted line, although practically not displayed.

At the next step, or Step S5, it is determined whether the guide sign has reached the top edge of the display area. In other words, it is determined whether the guide sign has started entering the display area. Specifically, the guide sign position detecting unit 903 performs the determination by means of time measurement using a timer, based on the movement information and the movement starting timing of the guide sign. In a case of YES in this determination, the process proceeds to Step S6. In a case of NO in this determination, the same determination is repeated (i.e., the process goes into a "waiting status").

At the next step, or Step S6, luminance of the guide sign is increased on a step-by-step basis. Specifically, the guide sign luminance control unit 904 transmits to the guide sign displaying unit 905 luminance controlling information of the guide sign, i.e., levels of luminance value such as Level L1, Level L2 and Level L3 (a greater number is indicative of a higher value), an order of switching levels (e.g., from Level L1 to Level L2 and then from Level L2 to Level L3), and timings of switching levels. The guide sign displaying unit 905 controls the LD driver 6111 by use of a built-in timer, based on the received luminance controlling information. In this way, luminance of the guide sign that is entering the display area is increased on a step-by-step basis from Level L1 to Level L3 (cf. FIGS. 14B through 14E). Here, visibility of the guide sign is increased as a larger part of the guide sign gets in the display area. Conversely, visibility of the guide sign is decreased as a larger part of the guide sign is cut off. In the above way, it is possible to make the display area less perceivable. Note that, in each of FIGS. 14B through 14D, a part of the guide sign, which is out of the display area, is illustrated as well for ease of comprehension, although practically such a part is not displayed.

At the next step, or Step S7, it is determined whether the guide sign has passed the top edge of the display area. In other words, it is determined whether the guide sign has finished entering the display area. Specifically, the guide sign position detecting unit 903 performs the determination by means of time measurement using a timer, based on vertical width of the guide sign, movement speed of the guide sign and an entrance starting timing of the guide sign at Step S5. In a case of YES in this determination, the process proceeds to Step S8. In a case of NO in this determination, the same determination is repeated (i.e., the process goes into a "waiting status").

At Step S8, the guide sign displaying unit 905 sets luminance of the guide sign at a value (e.g., Level L4) that is higher than the highest luminance value (e.g., Level L3) of the time when the guide sign was entering the display area. In this way, when the guide sign finishes entering the display area, i.e., when the guide sign entirely gets in the display area, luminance of the guide sign is switched from Level L3 to Level L4. Here, visibility of the guide sign becomes the highest. In this way, it is possible to gradually make the display area less perceivable, while still precisely informing of contents of the guide sign.

At the next step, or Step S9, it is determined whether the guide sign has reached the bottom edge of the display area. In other words, it is determined whether the guide sign has started exiting the display area. Specifically, the guide sign position detecting unit 903 performs the determination by means of time measurement using a timer, based on the movement speed of the guide sign, the vertical width of the display area and the entrance starting timing at Step S5. In a case of YES in this determination, the process proceeds to Step S10. In a case of NO in this determination, the same determination is repeated (i.e., the process goes into a "waiting status").

At Step S10, luminance of the guide sign is decreased on a step-by-step basis. Specifically, the guide sign luminance control unit 904 transmits to the guide sign displaying unit 905 luminance controlling information of the guide sign, i.e., levels of luminance value such as Level L1, Level L2 and Level L3 (a greater number is indicative of a higher value), an order of switching levels (e.g., from Level L3 to Level L2 and then from Level L2 to Level L1), and timings of switching levels. The guide sign displaying unit 905 controls the LD driver 6111 by use of a built-in timer, based on the received luminance controlling information. In this way, luminance of the guide sign is switched from Level L4 to Level L3 at the time when the guide sign starts exiting the display area. Further, luminance of the guide sign that is exiting the display area is decreased on a step-by-step basis from Level L3 to Level L1 (cf. FIGS. 14F through 14J). Here, visibility of the guide sign is decreased as a larger part of the guide sign gets out of the display area. In other words, visibility is decreased as a larger part of the guide sign is cut off. In the above way, it is possible to make the display area less perceivable. Note that, in each of FIGS. 14G through 14I, a part of the guide sign, which is out of the display area, is illustrated as well for ease of comprehension, although practically the part is not displayed.

At the next step, or Step S11, it is determined whether the guide sign has passed the bottom edge of the display area. In other words, it is determined whether the guide sign has finished exiting the display area. Specifically, the guide sign position detecting unit 903 performs the determination by means of time measurement using a timer, based on the vertical width of the guide sign, the movement speed of the guide sign and an exit starting timing at Step S9. In a case of YES in this determination, the process proceeds to Step S12. In a case of NO in this determination, the same determination is repeated (i.e., the process goes into a "waiting status").

At Step S12, movement of the guide sign is terminated. Specifically, the guide sign displaying unit 905 stops forming animation of the guide sign when an entire image of the guide sign gets in the frame region 30b, which is below (i.e., in the negative Y-direction) the image region 30a, so as to stop movement of the guide sign and to terminate the display (cf. FIG. 14J).

At the next step, or Step S13, the CPU 602 determines whether there is an update of remaining distance to the n-th turning point on the car navigation system 200. In a case of YES in this determination, the process proceeds to Step S14. In a case of NO in this determination, the process proceeds to Step S16.

At the next step, or Step S14, the CPU 602 determines whether remaining distance to the n-th turning point has been updated on the car navigation system 200. In a case of YES in this determination, the process proceeds to Step S15. In a case of NO in this determination, the same determination is repeated (i.e., the process goes into a "waiting status"). Upon an update of remaining distance to the n-th turning point, the CPU 602 causes the turning point information obtaining unit 901 to obtain information (i.e., remaining distance after the update) of the update. The turning point information obtaining unit 901 transmits to the guide sign animation data generating unit 902 turning point information after the update of remaining distance. Further, the turning point information obtaining unit 901 updates remaining distance of turning point information in a built-in memory.

At the next step, or Step S15, movement of a guide sign relating to the n-th turning point after the update of remaining distance is initiated from the top to the bottom of the display area. Specifically, the guide sign animation data generating unit 902 generates guide sign animation data, based on the received turning point information after the update of remaining distance and movement information of the guide sign. Further, the guide sign animation data generating unit 902 transmits the guide sign animation data to the guide sign displaying unit 905. The guide sign displaying unit 905 controls the LD driver 6111 and the MEMS controller 615, based on the received guide sign animation data and an original set value (i.e., a predetermined value including 0) of luminance of the guide sign, so as to start forming an image in the frame region 30b, which is above (i.e., in the positive Y-direction) the image region 30a, per a frame of animation of the guide sign (e.g., "1 km AWAY: TURN LEFT"), and to cause the guide sign to start moving from a movement starting position (i.e., a position corresponding to the frame region 30b), which is above the display area, towards the display area. Further, the guide sign displaying unit 905 informs the guide sign position detecting unit 903 of movement starting timing of the guide sign. In other words, at Step S15, the guide sign after the update of remaining distance with predetermined luminance, which may be 0, starts moving from above the display area towards the display area. After Step S15 is performed, the process returns back to Step S5.

At the next step, or Step S16, the CPU 602 refers to the current location of the driver's vehicle, which is provided by the car navigation system 200, so as to determine whether the driver's vehicle has passed the n-th turning point. In a case of YES in this determination, the process proceeds to Step S17. In a case of NO in this determination, the same determination is repeated (i.e., the process goes into a "waiting status").

At Step S17, the CPU 602 refers to the traveling route that is set on the car navigation system 200, so as to determine whether the n-th turning point is the last turning point on the traveling route. In a case of YES in this determination, the flow is terminated. In a case of NO in this determination, the process proceeds to Step S18.

At Step S18, n is incremented. After Step S18 is performed, the process returns back to Step S3.

Practical Example 2

The following description explains an HUD device 100-2 of the practical example 2. The practical example 2 is provided for a case where a guide sign that moves, as illustrated in FIGS. 10A and 10B, is displayed in the display area, similarly to the practical example 1. In the practical example 2, difference from the practical example 1 is mainly explained and explanation of parts in common with the practical example 1 is partially omitted.

FIG. 15 is a block diagram illustrating a configuration example of the FPGA 600 that functions as the image data generating unit 804 and the control unit 8060 in the practical example 2. In FIG. 15, each arrow is indicative of flow of data.

As illustrated in FIG. 15, in the HUD device 100-2, the image data generating unit 804 includes a turning point information obtaining unit 901, a guide sign animation data generating unit 1001, an entrance/exit timing calculating unit 1002 and a guide sign luminance control unit 1003.

The turning point information obtaining unit 901 obtains from the car navigation system 200 via the external information input unit 802 information relating to a next turning point on a traveling route of a vehicle. Further, the turning point information obtaining unit 901 forwards the information to the guide sign animation data generating unit 1001 and stores the information in a built-in memory.

The guide sign animation data generating unit 1001 generates guide sign animation data, which is animation data of a guide sign, based on shape of the guide sign, received information relating to a next turning point, preset movement information (e.g., information relating to a movement starting position and a movement speed of a guide sign) of guide signs, and luminance controlling information of guide signs, which is explained in the following description. Further, the guide sign animation data generating unit 1001 transmits the guide sign animation data to the control unit 8060. "Guide sign animation data" is data including display contents and movement information of a guide sign.

The entrance/exit timing calculating unit 1002 calculates an entrance starting timing and an entrance ending timing (i.e., a timing where a guide sign entirely gets in the display area) of a guide sign entering the display area, based on movement information of the guide sign, the vertical width of the guide sign, etc. Further, the entrance/exit timing calculating unit 1002 calculates an exit starting timing and an exit ending timing (i.e., a timing where the guide sign entirely gets out of the display area) of the guide sign exiting from the display area, based on the movement information of the guide sign, the vertical width of the guide sign, the vertical width of the display area, etc. Then, the entrance/exit timing calculating unit 1002 transmits to the guide sign luminance control unit 1003 the calculated entrance starting timing, entrance ending timing and exit starting timing, and exit ending timing.

The guide sign luminance control unit 1003 sets luminance of a guide sign that is entering the display area, based on a received entrance starting timing and entrance ending timing and movement speed of guide signs, such that luminance is increased on a step-by-step basis from an entrance starting timing through an entrance ending timing. Further, the guide sign luminance control unit 1003 sets luminance of a guide sign that is exiting from the display area, based on a received exit starting timing and exit ending timing and movement speed of guide signs, such that luminance is decreased on a step-by-step basis from an exit starting timing through an exit ending timing. Further, the guide sign luminance control unit 1003 sets luminance of a guide sign that has finished entering the display area and has not started exiting from the display area, based on a received entrance ending timing and exit starting timing and movement information of guide signs, such that luminance is a constant value that is higher than luminance for the time of entering and exiting. Then, the guide sign luminance control unit 1003 transmits to the guide sign animation data generating unit 1001 information of the setting, i.e., a set value of luminance in each level and timings of setting luminance, as luminance controlling information.

In the HUD device 100-2, the control unit 8060 controls the LD driver 6111 and the MEMS controller 615, based on guide sign animation data that is received from the guide sign animation data generating unit 1001, so as to display animation of a guide sign as a virtual image in the display area.

Next, the following description explains a displaying process conducted in the HUD device 100-2 of the practical example 2, with reference to FIGS. 16A and 16B. The flowchart of FIGS. 16A and 16B corresponds to a processing algorithm executed by the CPU 602. The displaying process is initiated when a driver, etc., sets a traveling route of the driver's vehicle on the car navigation system 200.

At the first step, or Step S21, it is determined whether there is a turning point (i.e., an intersection, a fork, etc.) on a traveling route. Specifically, the CPU 602 refers to the traveling route that is set on the car navigation system 200 and determines whether there is a point that should be turned by the driver's vehicle on the traveling route. In a case of YES in this determination, the process proceeds to Step S22. In a case of NO in this determination, the flow is terminated.

At the next step, or Step S22, n is set to 1.

At the next step, or Step S23, information (hereinafter also referred to as "turning point information") relating to an n-th turning point (i.e., a next turning point) is obtained. An "n-th turning point" means an n-th turning point, counting from the first turning point, among turning points on the traveling route. Specifically, the turning point information obtaining unit 901 obtains from the car navigation system 200 turning point information, i.e., a turning direction at the n-th turning point and remaining distance to the n-th turning point, so as to transmit the turning point information to the guide sign animation data generating unit 1001 and to store the turning point information in a built-in memory.

At the next step, or Step S24, it is determined whether n is greater than 1. In a case of YES in this determination, the process proceeds to Step S30. In a case of NO in this determination, the process proceeds to Step S25.

At Step S25, with respect to the display area of guide signs, an entrance starting timing, an entrance ending timing, an exit starting timing and an exit ending timing are obtained. Specifically, the entrance/exit timing calculating unit 1002 calculates an entrance starting timing and an entrance ending timing of guide signs entering the display area and calculates an exit starting timing and an exit ending timing of guide signs exiting from the display area. Further, the entrance/exit timing calculating unit 1002 transmits the entrance starting timing, the entrance ending timing, the exit starting timing and the exit ending timing to the guide sign luminance control unit 1003.

At the next step, or Step S27, luminance of guide signs entering the display area is set such that luminance is increased on a step-by-step basis. Further, luminance of guide signs exiting from the display area is set such that luminance is decreased on a step-by-step basis.

Specifically, the guide sign luminance control unit 1003 sets luminance of guide signs entering the display area, based on the received entrance starting timing and entrance ending timing and movement information of guide signs, such that luminance is increased on a step-by-step basis as time passes. Further, as luminance controlling information for the time of entering, the guide sign luminance control unit 1003 transmits to the guide sign animation data generating unit 1001 information of the setting, i.e., levels of luminance value such as Level L1, Level L2 and Level L3 (a greater number is indicative of a higher value and Level L1 is the lowest value), an order of switching levels (e.g., from Level L1 to Level L2 and then from Level L2 to Level L3), and timings of switching levels. Further, the guide sign luminance control unit 1003 sets luminance of guide signs exiting from the display area, based on the received exit starting timing and exit ending timing and movement information of guide signs, such that luminance is decreased on a step-by-step basis as time passes. Further, as luminance controlling information for the time of exiting, the guide sign luminance control unit 1003 transmits to the guide sign animation data generating unit 1001 information of the setting, i.e., levels of luminance value such as Level L1, Level L2 and Level L3 (a greater number is indicative of a higher value and Level L1 is the lowest value), an order of switching levels (e.g., from Level L3 to Level L2 and then from Level L2 to Level L1), and timings of switching levels.

At the next step, or Step S28, luminance of guide signs for the time of being entirely in the display area is set to a predetermined value that is higher than luminance of guide signs entering and exiting from the display area. Specifically, the guide sign luminance control unit 1003 sets luminance of guide signs for the time of being entirely in the display area to Level 4, which is higher than Level L3, based on the received entrance ending timing and exit starting timing and movement information of guide signs. Further, as luminance controlling information for the time after ending entrance and before starting exit, the guide sign luminance control unit 1003 transmits to the guide sign animation data generating unit 1001 information of the setting, an entrance ending timing, which is a timing for switching from Level L3 to Level L4, and an exit starting timing, which is a timing for switching from Level L4 to Level L3.

At the next step, or Step S29, animation data of a guide sign relating to the first turning point is generated and stored. Specifically, the guide sign animation data generating unit 1001 generates guide sign animation data, based on a shape of the guide sign and the received turning point information relating to the first turning point, information of luminance for the time of entering, information of luminance for the time of exiting, and luminance controlling information for the time after ending entrance and before starting exit. Further, the guide sign animation data generating unit 1001 stores the guide sign animation data in a built-in memory.

That is to say, the guide sign animation data is data including display contents of the guide sign and luminance information for a movement process.

At the next step, or Step S31, animation of the guide sign is displayed. Specifically, the guide sign animation data generating unit 1001 transmits to the control unit 8060 the guide sign animation data that has been generated. The control unit 8060 controls the LD driver 6111 and the MEMS controller 615, based on the received guide sign animation data and an original set value (i.e., a predetermined value, including 0) of luminance of guide signs, so as to form an image per a frame of the animation of the guide sign and to cause the guide sign (e.g., "2 km AWAY: TURN LEFT") to move such that the guide sign vertically traverses the display area from a movement starting position (i.e., a position that corresponds to the frame region 30b above the display area), which is above the display area, to a movement ending position (i.e., a position that corresponds to the frame region 30b below the display area), which is below the display area (cf. FIGS. 14A through 14J).

At the next step, or Step S32, the CPU 602 determines whether there is an update of remaining distance to the n-th turning point on the car navigation system 200. In a case of YES in this determination, the process proceeds to Step S33. In a case of NO in this determination, the process proceeds to Step S35.

At Step S33, the CPU 602 determines whether remaining distance to the n-th turning point has been updated on the car navigation system 200. In a case of YES in this determination, the process proceeds to Step S34. In a case of NO in this determination, the same determination is repeated (i.e., the process goes into a "waiting status"). Upon an update of remaining distance to the n-th turning point, the CPU 602 causes the turning point information obtaining unit 901 to obtain information (i.e., remaining distance after the update) of the update. The turning point information obtaining unit 901 transmits to the guide sign animation data generating unit 1001 turning point information after the update of remaining distance. Further, the turning point information obtaining unit 901 updates remaining distance of turning point information in a built-in memory.

At Step S34, remaining distance in animation data of the guide sign relating to the n-th turning point (n ? 1) is updated. Specifically, the guide sign animation data generating unit 1001 updates remaining distance to the n-th turning point (n ? 1) in the guide sign animation data stored in the built-in memory. After Step S34 is performed, the process returns back to Step S31. That is to say, animation of the guide sign after the update of remaining distance is displayed in the display area.

At Step S35, the CPU 602 refers to the current location of the driver's vehicle, which is provided by the car navigation system 200, so as to determine whether the driver's vehicle has passed the n-th turning point. In a case of YES in this determination, the process proceeds to Step S36. In a case of NO in this determination, the same determination is repeated (i.e., the process goes into a "waiting status").

At Step S36, the CPU 602 refers to the traveling route that has been set on the car navigation system 200, so as to determine whether the n-th turning point is the last turning point on the traveling route. In a case of YES in this determination, the flow is terminated. In a case of NO in this determination, the process proceeds to Step S37.

At Step S37, n is incremented. After Step S37 is performed, the process returns back to Step S23.

At Step S30, animation data of a guide sign relating to an n-th turning point (n>1) is generated and stored. Specifically, the guide sign animation data generating unit 1001 updates information relating to the first turning point, which is included in the animation data of the guide sign relating to the first turning point that is stored in the built-in memory, with information relating to the n-th turning point (n>1), so as to generate the animation data of the guide sign relating to the n-th turning point (n>1).

Note that a process that is similar to the process of a series of Steps S25 through S29 in the flowchart of FIGS. 16A and 16B may be performed as a preprocess of the displaying process conducted in the HUD device 100, such that guide sign animation data relating to a predetermined turning point is generated and stored in a memory. In this case, the guide sign animation data is retrieved from the memory at the time of performing the displaying process, such that information relating to the predetermined turning point is updated with information relating to an n-th turning point, so as to generate guide sign animation data relating to the n-th turning point.

Note that, in FIGS. 14A through 14J, luminance of the guide sign is controlled in four levels. The number of levels is not limited to four, as long as not being one. For example, in a case of controlling in two levels, entering operation and exiting operation of guide signs to and from the display area may be performed with luminance of the lower level, and movement of guide signs while entirely being in the display area may be performed with luminance of the higher level.

Furthermore, although luminance of a guide sign is controlled in accordance with position of the guide sign relative to the display area in the flowcharts of FIGS. 13A and 13B and FIGS. 16A and 16B, there is no limitation as such. That is to say, the point is to control a characteristic of the guide sign in accordance with position of the guide sign relative to the display area. A "characteristic of a guide sign" means a quality of a guide sign that has an effect on visual stimulation, such as at least one of brightness (i.e., lightness, luminance, illumination intensity, etc.), shape, color, size and position in the display area, with respect to a guide sign.

In either case, visual stimulation of a guide sign is preferred to be increased on a step-by-step basis while the guide sign is entering the display area and to be decreased on a step-by-step basis while the guide sign is exiting from the display area. Further, visual stimulation of the guide sign is preferred to be the strongest when the guide sign is entirely in the display area.

Regarding shape of a guide sign, complicated shapes have stronger visual stimulation, comparing to simple shapes.

Regarding color of a guide sign, in a case of controlling by tone difference (i.e., difference in a mixing rate of black to white) of achromatic colors, visual stimulation is stronger as a mixing rate of black is higher. Further, in a case of controlling with chromatic colors and achromatic colors, visual stimulation of chromatic colors is stronger than achromatic colors.

Regarding size of a guide sign, visual stimulation is stronger as a guide sign is larger. Regarding position of a guide sign in the display area, visual stimulation is stronger when the guide sign is in the middle of the display area than when the guide sign is near the edge. Further, visual stimulation is stronger as a larger part of the guide sign is in the display area.

Practical Example 3

The following description explains an HUD device 100-3 of the practical example 3.

As a driver of a vehicle drives the vehicle, relying mainly on information in the view area through the front windshield 50, helping the driver to precisely recognize positions of objects, especially other vehicles, pedestrians, obstacles, etc., is required for facilitating safe driving.

Therefore, in the HUD device 100-3 of the practical example 3, an indication sign for indicating a target object is displayed in the display area as a virtual image (cf. FIGS. 11A and 11B).

As illustrated in FIG. 17, in addition to the basic configuration of the HUD device 100 described above, the HUD device 100-3 of the practical example 3 has a configuration for displaying an "indication sign", which includes a laser radar 300, as a detecting system for detecting a position of a target object, and the FPGA 600 provided with required configurations and functions.

Note that the "detecting system" need not be dedicated for displaying an "indication sign". For example, it is possible to utilize a detecting device that is used for automatic control (e.g., automatic brake, automatic steering, etc.) of a vehicle. In a case of utilizing such a detecting device, the HUD device 100-3 need not include a detecting system.

Furthermore, a "detecting system" or a "detecting device" is sufficient as long as able to detect existence and a position of a target object in front (including the front in a diagonal direction) of the vehicle. Further, instead of a laser radar (e.g., a radar utilizing a semiconductor laser as a light source), it is possible to employ a radar utilizing a light-emitting diode (LED) as a light source, a millimeter-wave radar, an infrared radar, a monocular camera, a stereo camera or combination of the above.

The laser radar 300, which is mounted near a front bumper, a back mirror of a car, etc., transmits to the image data generating unit 804 via the vehicle information input unit 800 a detection result, i.e., three-dimensional position information (also referred to as a distance image) of a target object.

The laser radar 300 is provided with a light-emitting system that includes at least one laser light source (e.g., a semiconductor laser), a light-receiving system that includes at least one light-receiving element (e.g. a photodiode) for receiving light that is emitted by the light-emitting system and then reflected by a target object, and a processing system for calculating distance to the target object. A light-emitting range of the laser radar 300 is a predetermined range in front or in a diagonal direction of the front of the driver's vehicle. A measurement method of the laser radar 300 may be a direct time-of-flight (TOF) method, in which distance to a target object is obtained, based on calculated time difference between a light-emitting timing of a laser light source and a light-receiving timing of a light-receiving element, and may be an indirect TOF method, in which distance to a target object is calculated, based on time difference, which is calculated by dividing a light-receiving signal of a light-receiving element into signals of multiple phases and then performing calculation by use of the signals of multiple phases. Further, the light-emitting system may be a scanning type or a non-scanning type.

FIG. 17 is a block diagram illustrating a configuration example of the FPGA 600 that functions as the image data generating unit 804 and the control unit 8060 in the practical example 3. In FIG. 17, each arrow is indicative of flow of data.

In the HUD device 100-3, the image data generating unit 804 includes a target object position information obtaining unit 1010, an indicating direction setting unit 1011, a direct indication possibility determining unit 1012, and a display position setting unit 1013 and an indication sign data generating unit 1014.

The target object position information obtaining unit 1010 obtains three-dimensional position information of a target object from the laser radar 300 via the vehicle information input unit 800. Further, the target object position information obtaining unit 1010 transmits the three-dimensional position information to the indicating direction setting unit 1011 and the direct indication possibility determining unit 1012.

The indicating direction setting unit 1011 sets an indicating direction of an indication sign, based on received three-dimensional position information of a target object and transmits information of the setting to the indication sign data generating unit 1014.

The direct indication possibility determining unit 1012 determines whether it is possible to directly indicate a target object with an indication sign in the display area, and transmits a determination result, i.e., possibility for direct indication, to the display position setting unit 1013. Specifically, the direct indication possibility determining unit 1012 compares three-dimensional position information of a target object with preset three-dimensional position information of the display area, and determines that "direct indication is possible" in a case where at least a part of the target object is in the display area or in a case where the target object is in contact with an outer edge of the display area, and otherwise determines that "direct indication is not possible". Note that "direct indication is possible" means that it is possible to display an indication sign in the display area such that an edge of the indication sign appears to make contact with the target object.

The display position setting unit 1013 sets a display position (hereinafter also referred to as an "indication sign position") of an indication sign, based on received possibility of direct indication, and transmits information of the setting to the indication sign data generating unit 1014.

The indication sign data generating unit 1014 generates data of an indication sign, i.e., indication sign data, based on data indicative of displaying manners such as shape, brightness and color of an indication sign and received information of the setting of an indicating direction and a display position. Further, the indication sign data generating unit 1014 transmits the indication sign data to the control unit 8060. "Indication sign data" is data including information relating to a display manner, an indicating direction and a display position of an indication sign.

The control unit 8060 controls the LD driver 6111 and the MEMS controller 615, based on received indication sign data, so as to display an indication sign as a virtual image in the display area.

In the above way, when an indication sign for indicating a position of a target object (e.g., a vehicle in front) is displayed in the display area (cf. FIG. 9), which is superimposed on scenery in front of the driver's vehicle, the driver can precisely recognize (or comprehends) the position of the target object.

Here, an indication sign is only required to be a sign that is capable of indicating a predetermined direction, such as an arrow or a V-shape, as illustrated in FIGS. 11A and 11B, etc. In the specification of the present application, a direction that is indicated by an indication sign is referred to as an "indicating direction". The size of an indication sign is only required to be a size that can be displayed in the display area. Note that although, in each of FIGS. 11A and 11B, etc., an indication sign is illustrated as if being in a two-dimensional shape for indicating a two-dimensional position of a target object on a plane orthogonal to a traveling direction of the driver's vehicle, the indication sign is practically in a three-dimensional shape for indicating a two-dimensional position of a target object on the plane orthogonal to the traveling direction of the vehicle and a one-dimensional position corresponding to the traveling direction of the vehicle. Therefore, from the viewing point of the driver, the indication sign appears to be indicating a three-dimensional position of the target object.

Next, the following description explains a displaying process conducted in the HUD device 100-3 of the practical example 3, with reference to FIGS. 18A and 18B. The flowchart of FIGS. 18A and 18B corresponds to a processing algorithm executed by the CPU 602. The displaying process is initiated when an electrical system of the car (i.e., the driver's vehicle) mounted with the HUD device 100-3 is turned on.

At the first step, or Step S41, it is determined whether there is a target object. Specifically, the CPU 602 determines that "there is a target object" upon receiving from the laser radar 300 a detection result indicating that "there is a target object". In a case of YES in the determination at Step S41, the process proceeds to Step S42. In a case of NO in the determination at Step S41, the process proceeds to Step S54.

At Step S42, position information of the target object is obtained. Specifically, the laser radar 300 detects three-dimensional position information of the target object, and transmits the three-dimensional position information to the target object position information obtaining unit 1010 and the CPU 602. The target object position information obtaining unit 1010 transmits the received three-dimensional position information of the target object to the indicating direction setting unit 1011 and the direct indication possibility determining unit 1012. The CPU 602 stores the received three-dimensional position information of the target object in the RAM 606.

At the next step, or Step S43, an indicating direction of an indication sign is set. Specifically, the indicating direction setting unit 1011 sets an indicating direction of an indication sign, based on the received three-dimensional position information, such that the indicating sign is directed at the target object. Further, the indicating direction setting unit 1011 transmits information of the setting to the indication sign data generating unit 1014.

At the next step, or Step S44, the direct indication possibility determining unit 1012 determines whether it is possible to directly indicate the target object with an indication sign in the display area. In a case of YES in the determination at Step S44, the process proceeds to Step S45. In a case of NO in the determination at Step S44, the process proceeds to Step S46.

At Step S45, the display position setting unit 1013 sets a display position of an indication sign such that the indication sign is displayed at a position for directly indicating the target object (cf. FIGS. 19A through 19C, FIG. 20A, etc.). Further, the display position setting unit 1013 transmits information of the setting to the indication sign data generating unit 1014. Note that the "position for directly indicating the target object" includes not only a position where the tip of the indication sign makes contact with the target object but also a position where the tip of the indication sign is displayed nearby the target object, from the viewing point of the driver. After Step S45 is performed, the process proceeds to Step S47.

At Step S46, the display position of an indication sign is set such that the indication sign is displayed in the display area at a position close to the target object (cf. FIG. 19D and FIG. 20B). Further, information of the setting is transmitted to the indication sign data generating unit 1014. After Step S46 is performed, the process proceeds to Step S47.

Note that, in a case of Step S45, an indication sign is displayed such that the indicating direction (e.g., a direction of an arrow) is on and along (i.e., parallel to) a line segment connecting, for example, the viewing point of a viewer A and a predetermined position (e.g., the center of a target object, a bottom position of a target object, which is on a vertical line through the center of the target object, etc.) of the target object. Furthermore, in a case of Step S46, an indication sign is displayed such that the indicating direction (e.g., a direction of an arrow) is on a line segment connecting, for example, the viewing point of the viewer A and a predetermined position (e.g., the center of a target object, a bottom position of a target object, which is on a vertical line through the center of the target object, etc.) of the target object and such that the indicating direction (e.g., a direction of an arrow) is at an angle to the line segment so as to be directed at the target object. As illustrated in FIGS. 19A through 19D and FIGS. 20A and 20B, in each case of Steps S45 and S46, it is preferred that an indication sign is displayed on the line segment and at the closest position to the target object in the display area.

At Step S47, indication sign data is generated. Specifically, the indication sign data generating unit 1014 generates indication sign data, based on a display format of an indication sign, the received indicating direction and information of the setting of the display position. Further, the indication sign data generating unit 1014 transmits the indication sign data to the control unit 8060.

At Step S48, the CPU 602 determines whether there is a displayed indication sign. In a case of YES in this determination, the process proceeds to Step S50. In a case of NO in this determination, the process proceeds to Step S49.

At Step S49, an indication sign is displayed as a virtual image, based on the indication sign data, which is initially generated. Specifically, the control unit 8060 controls the LD driver 6111 and the MEMS controller 615, based on the received indication sign data, which is initially generated, such that an indication sign displayed in the display area indicates the target object.

At Step S50, at least one of the indicating direction and the displaying position of the indication sign is changed, based on the indication sign data, which is the latest indication sign data. Specifically, the control unit 8060 controls the LD driver 6111 and the MEMS controller 615, based on the received indication sign data, which is the latest indication sign data, and changes at least one of the indicating direction and the displaying position of the indication sign in the display area, so as to cause the at least one of the indicating direction and the displaying position of the indication sign in the display area to follow movement of the target object.

At the next step, or Step S51, it is determined whether there is a target object. Specifically, the CPU 602 determines that "there is a target object" upon receiving from the laser radar 300 a detection result indicating that "there is a target object". In a case of YES in the determination at Step S51, the process proceeds to Step S52. In a case of NO in the determination at Step S52, the process proceeds to Step S54.

At Step S52, position information of the target object is obtained. Specifically, the laser radar 300 detects three-dimensional position information of the target object and transmits the three-dimensional position information to the CPU 602. The CPU 602 stores the received three-dimensional position information of the target object in the RAM 606.

At the next step, or Step S53, it is determined whether the target object has moved relative to the driver's vehicle. Specifically, the CPU 602 compares the previously-obtained three-dimensional position information and the newly-obtained three-dimensional position information, so as to determine whether the target object has moved. Note that, in a case where the driver's vehicle stops and a target object is a movable object that has stopped or is a motionless object or in a case where the driver's vehicle and a target object are moving in the same direction at the same speed, the target object is not moving relative to the driver's vehicle. In a case of YES in the determination at Step S53, the process proceeds to Step S43. In a case of NO in the determination at Step S53, the process proceeds to Step S52.

At Step S54, the CPU 602 determines whether there is a displayed indication sign. In a case of YES in this determination, the process proceeds to Step S55. In a case of NO in this determination, the process proceeds to Step S56.

At Step S55, the CPU 602 removes (or hides) the indication sign. This is because there is no need for displaying an indication sign in a case where a target object that should be indicated by an indication sign does not exist and because an indication sign would incorrectly suggest that a target object exists. Specifically, the CPU 602 transmits a request for removal to the FPGA 600. After Step S55 is performed, the process proceeds to Step S56.

At Step S56, it is determined whether to terminate the process. In a case of YES in this determination, the flow is terminated. In a case of NO in this determination, the process returns back to Step S41. Here, in a case where the electrical system of the car (i.e., the driver's vehicle) that is provided with the HUD device 100 stays on, the process is continued. In a case where the electrical system is turned off, the process is terminated.

Practical Example 4

The following description explains an HUD device 100-4 of the practical example 4. The practical example 4 is provided for a case where an indication sign for indicating a target object is displayed in the display area, as illustrated in FIGS. 11A and 11B, similarly to the practical example 3. In the practical example 4, difference from the practical example 3 is mainly explained and explanation of parts in common with the practical example 3 is partially omitted.

In the practical example 4, a part of the configuration of the FPGA 600 differs from the practical example 3 and the other parts of the configuration are the same.

FIG. 21 is a block diagram illustrating a configuration example of the FPGA 600 that functions as the image data generating unit 804 and the control unit 8060 in the practical example 4. In FIG. 21, each arrow is indicative of flow of data.

In the practical example 4, the image data generating unit 804 includes a target object position information obtaining unit 1010, an indicating direction setting unit 1011 and an indication sign data generating unit 1020.

The target object position information obtaining unit 1010 obtains three-dimensional position information of a target object from the laser radar 300 via the vehicle information input unit 800. Further, the target object position information obtaining unit 1010 transmits the three-dimensional position information to the indicating direction setting unit 1011 and a direct indication possibility determining unit 1021 of the control unit 8060, which is explained in the following description.

The indicating direction setting unit 1011 sets an indicating direction of an indication sign, based on received three-dimensional position information of a target object. Further, the indicating direction setting unit 1011 transmits information of the setting to the indication sign data generating unit 1020.

The indication sign data generating unit 1020 generates data of an indication sign, i.e., indication sign data, based on data of a displaying format (i.e., a shape, brightness, a color, etc.) of an indication sign and received information of setting of an indicating direction. Further, the indication sign data generating unit 1020 transmits the indication sign data to a display control unit 1022 of the control unit 8060, which is explained in the following description. That is to say, "indication sign data" is data including information relating to a displaying format and an indicating direction of an indication sign.

In the practical example 4, the control unit 8060 includes a direct indication possibility determining unit 1021 and a display control unit 1022.

The direct indication possibility determining unit 1021 determines whether it is possible that an indication sign directly indicates a target object in the display area, based on received three-dimensional position information of the target object. Further, the direct indication possibility determining unit 1021 transmits a result of the determination, i.e., possibility of direct indication, and the received three-dimensional position information of the target object to the display control unit 1022. Specifically, the direct indication possibility determining unit 1021 compares three-dimensional position information of a target object and preset three-dimensional position information of the display area. Further, the direct indication possibility determining unit 1021 determines that "direct indication is possible" in a case where at least a part of the target object is in the display area or in a case where a target object makes contact with an outer edge of the display area, and otherwise determines that "direction indication is not possible". Note that "direct indication is possible" means that an indication sign can be displayed such that a tip of the indication sign makes contact with or is nearby a target object in the display area.

The display control unit 1022 sets a displaying position (hereinafter also referred to as an "indication sign position") of an indication sign, based on received possibility of direct indication and three-dimensional position information of a target object. Further, the display control unit 1022 controls the LD driver 6111 and the MEMS controller 615, based on information of the setting and received indication sign data, such that the indication sign is displayed as a virtual image in the display area.

Next, the following description explains a displaying process conducted in the HUD device 100-4 of the practical example 4, with reference to FIGS. 22A and 22B. The flowchart of FIGS. 22A and 22B corresponds to a processing algorithm executed by the CPU 602. The displaying process is initiated when an electrical system of the car (i.e., the driver's vehicle) mounted with the HUD device 100-4 is turned on.

At the first step, or Step S61, it is determined whether there is a target object. Specifically, the CPU 602 determines that "there is a target object" upon receiving from the laser radar 300 a detection result indicating that "there is a target object". In a case of YES in the determination at Step S61, the process proceeds to Step S62. In a case of NO in the determination at Step S61, the process proceeds to Step S75.

At Step S62, position information of the target object is obtained. Specifically, the laser radar 300 detects three-dimensional position information of the target object. Further, the laser radar 300 transmits the three-dimensional position information to the target object position information obtaining unit 1010 and the CPU 602. The target object position information obtaining unit 1010 transmits the received three-dimensional position information of the target object to the indicating direction setting unit 1011 and the direct indication possibility determining unit 1021. The CPU 602 stores the received three-dimensional position information in the RAM 606.

At the next step, or Step S63, an indicating direction of an indication sign is set. Specifically, the indicating direction setting unit 1011 sets an indicating direction of an indication sign, based on the received three-dimensional position information of the target object, such that the indication sign is directed at the target object. Further, the indicating direction setting unit 1011 transmits information of the setting to the indication sign data generating unit 1020.

At the next step, or Step S64, indication sign data is generated. Specifically, the indication sign data generating unit 1020 generates indication sign data, based on a display format of the indication sign and the received information of the setting of the indicating direction. Further, the indication sign data generating unit 1020 transmits the indication sign data to the display control unit 1022.

At the next step, or Step S65, the direct indication possibility determining unit 1021 determines whether it is possible to directly indicate the target object with an indication sign. In a case of YES in the determination at Step S65, the process proceeds to Step S66. In a case of NO in the determination at Step S65, the process proceeds to Step S67.

At Step S66, the display control unit 1022 determines whether there is a displayed indication sign. In a case of NO in this determination, the process proceeds to Step S68. In a case of YES in this determination, the process proceeds to Step S69.

At Step S68, an indication sign is displayed at a position (cf. FIGS. 19A through 19C, FIG. 20A, etc.) for directly indicating the target object. Specifically, the display control unit 1022 controls the LD driver 6111 and the MEMS controller 615, based on the received indication sign data and three-dimensional position information of the target object, so as to display an indication sign in the display area at a position for directly indicating the target object. After Step S68 is performed, the process proceeds to Step S72.

At Step S69, the indication sign is moved to a position (cf. FIGS. 19A through 19C, FIG. 20A, etc.) for directly indicating the target object. Specifically, the display control unit 1022 controls the LD driver 6111 and the MEMS controller 615, based on the received indication sign data and three-dimensional position information of the target object, so as to move the indication sign to a position for directly indicating the target object in the display area. After Step S69 is performed, the process proceeds to Step S72.

At Step S67, the display control unit 1022 determines whether there is a displayed indication sign. In a case of NO in this determination, the process proceeds to Step S70. In a case of YES in this determination, the process proceeds to Step S71.

At Step S70, an indication sign is displayed in the display area at a position (cf. FIG. 19D and FIG. 20B) close to the target position. Specifically, the display control unit 1022 controls the LD driver 6111 and the MEMS controller 615, based on the received indication sign data and three-dimensional position information of the target object, so as to display an indication sign in the display area at a position close to the target object. After Step S70 is performed, the process proceeds to Step S72.

At Step S71, the indication sign is moved to a position (cf. FIG. 19D and FIG. 20B) close to the target object in the display area. Specifically, the display control unit 1022 controls the LD driver 6111 and the MEMS controller 615, based on the received indication sign data and three-dimensional position information of the target object, so as to move the indication sign to a position close to the target object in the display area. After Step S71 is performed, the process proceeds to Step S72.

Note that, at Step S68 and S69, the indication sign is displayed such that the indicating direction (e.g., a direction of an arrow) is on and along (i.e., parallel to) a line segment connecting, for example, the viewing point of a viewer A and a predetermined position (e.g., the center of a target object, a bottom position of a target object, which is on a vertical line through the center of the target object, etc.) of the target object. Furthermore, at Steps S70 and S71, the indication sign is displayed such that the indicating direction (e.g., a direction of an arrow) is on a line segment connecting, for example, the viewing point of the viewer A and a predetermined position (e.g., the center of a target object, a bottom position of a target object, which is on a vertical line through the center of the target object, etc.) of the target object and such that the indicating direction (e.g., a direction of an arrow) is at an angle to the line segment so as to be directed at the target object. As illustrated in FIGS. 19A through 19D and FIGS. 20A and 20B, in each case of Steps S68, S69, S70 and S71, it is preferred that the indication sign is displayed on the line segment and at the closest position to the target object in the display area.

At Step S72, it is determined whether there is the target object. Specifically, the CPU 602 determines that "there is the target object" upon receiving from the laser radar 300 a detection result indicating that "there is the target object". In a case of YES in the determination at Step S72, the process proceeds to Step S73. In a case of NO in the determination at Step S72, the process proceeds to Step S75.

At Step S73, position information of the target object is obtained. Specifically, the laser radar 300 detects three-dimensional position information of the target object and transmits the three-dimensional position information to the CPU 602. The CPU 602 stores the received three-dimensional position information of the target object in the RAM 606.

At the next step, or Step S74, it is determined whether the target object has moved relative to the driver's vehicle. Specifically, the CPU 602 compares the previously-obtained three-dimensional position information and the newly-obtained three-dimensional position information, so as to determine whether the target object has moved. Note that, for example, in a case where the driver's vehicle stops and a target object is a movable object that has stopped or is a motionless object or in a case where the driver's vehicle and a target object are moving in the same direction at the same speed, the target object is not moving relative to the driver's vehicle. In a case of YES in the determination at Step S74, the process returns back to Step S63. In a case of NO in the determination at Step S74, the process returns back to Step S73.

At Step S75, the CPU 602 determines whether there is a displayed indication sign. In a case of YES in this determination, the process proceeds to Step S76. In a case of NO in this determination, the process proceeds to Step S77.

At Step S76, the indication sign is removed (or hidden). This is because there is no need for displaying an indication sign in a case where a target object that should be indicated by an indication sign does not exist and because an indication sign would incorrectly suggest that a target object exists. Specifically, the CPU 602 transmits a request for removal to the FPGA 600. After Step S76 is performed, the process proceeds to Step S77.

At Step S77, it is determined whether to terminate the process. In a case of YES in this determination, the flow is terminated. In a case of NO in this determination, the process returns back to Step S61. Here, in a case where the electrical system of the car (i.e., the driver's vehicle) that is provided with the HUD device 100 stays on, the process is continued. In a case where the electrical system is turned off, the process is terminated.

Note that, at the time of displaying an indication sign in the display area in each of the practical examples 3 and 4, it is possible that an indication sign is displayed at an initial position (e.g., near the midpoint of the bottom edge of the display area) of the display area as an initial state, such that subsequently the indication sign moves in the display area on the above-described line segment from the initial position by the amount of distance corresponding to position of a target object and then stops (cf. FIGS. 23A and 23B).

In the practical examples 1 through 4 as explained above, control of a characteristic of a sign (i.e., a virtual image) that moves, at least a part of which is displayed in the display area, in accordance with position of the movable display relative to the display area is actualized by controlling a characteristic of an image of the sign that moves, which is formed in a region including the image region 30a that corresponds to the display area, in accordance with position of the image relative to the image region 30a.

Each of the HUD devices 100 (i.e., HUD devices 100-1 through 100-4 of the practical examples 1 through 4) according to the present embodiment as explained above is a display device for displaying in a display area at least a part of a virtual image that moves in the display area. The display device is provided with an FPGA 600 (i.e., control device) that is capable of controlling a characteristic of the virtual image in accordance with position of the virtual image relative to the display area.

In the cases above, a characteristic (especially visual stimulation) of a virtual image can be controlled such that a display area does not stand out even in a case where a part of a virtual image is in the display area and the other part of the virtual image is out of the display area or in a case where a virtual image, which is in the display area, is about to get out of the display area. Consequently, it is possible to make the display area less perceivable to users (e.g., drivers).

More specifically, the HUD device 100 according to the present embodiment is a display device for displaying in a display area a virtual image of at least a part of a sign that moves. The display device includes a displaying system that functions as the image data generating unit 804 and the image depicting unit 806 and is configured to form an image of the sign that moves with light in a region including the image region 30a (i.e., a predetermined region), and to irradiate the front windshield 50 (i.e., transparent/reflective member) with light that forms at least a part of the image, the part of which is in the image region, such that the virtual image of the at least a part of the image is displayed in the display area. The displaying system includes an FPGA 600 (i.e., control device) that is capable of controlling a characteristic of the image in accordance with position of the image of the sign that moves relative to the image region 30a. Here, a "sign that moves" means a sign with a moving property. An "image of a sign that moves" means an image of animation of a sign that moves on a per frame basis or an image of a sign that moves on a per position on a traveling route basis.

Here, by controlling a characteristic (especially visual stimulation) of an image, it is possible to make the display area that corresponds to the image region 30a less outstanding, even in a case where a part of an image is in the image region 30a and the other part of the image is out of the image region 30a or in a case where an image, which is in the image region 30a, is about to get out of the image region 30a. Consequently, it is possible to make the display area less perceivable to users (e.g., drivers).

Furthermore, it is preferable that the characteristic includes at least one of brightness (i.e., lightness, luminance, illumination intensity, etc.), color, shape, size and position of the image.

Furthermore, for example, in a case where a sign that moves is an indication sign for indicating a target object that moves relatively with respect to the HUD device 100, it is preferable that the FPGA 600 controls position of the image such that the image of the sign that moves and that is in the image region 30a does not extend outside of the image region 30a. In other words, it is preferable that position of a virtual image is controlled such that the virtual image of the sign that moves and that is in the display area does not extend outside of the display area.

Note that, aside from the above-described indication sing, even with respect to a sign (e.g., a sign for guiding with respect to a traveling direction that is superimposed on a road) that moves and that is preferred to be entirely displayed in the display area, it is preferable that position of the image is controlled such that the image of the sign that moves does not extend outside of the image region 30a.

It is preferable that the FPGA 600 includes: the direct indication possibility determining unit 1012 (i.e., determining unit) configured to determine whether indicating a target object with an indication sign in the display area is possible, based on a detection result of the laser radar 300 (i.e., detecting unit) configured to detect a relative position of the target object with respect to the HUD device 100; the display position setting unit 1013 (i.e., first setting unit) configured to set a display position of the indication sign, based on a determination result of the direct indication possibility determining unit 1012 and the detection result; the indication sign data generating unit 1014 (i.e., image data generating unit) configured to generate image data of the indication sign, based on the display position that has been set; and a display unit that is provided with the control unit 8060 and is configured to display the virtual image in the display area, based on the image data.

Furthermore, it is preferable that the display position setting unit 1013 sets the display position to a position for directly indicating the target object, in a case where the determination result is positive, and sets the display position to a position, in the display area, that is close to the target object, in a case where the determination result is negative.

Furthermore, it is preferable that the FPGA 600 includes: the indication sign data generating unit 1020 (i.e., image data generating unit) configured to generate image data of the indication sign; the direct indication possibility determining unit 1021 (i.e., determining unit) configured to determine whether directly indicating the target object with the indication sign in the display area is possible, based on a detection result of the laser radar 300 (i.e., detecting unit) configured to detect a relative position of the target object with respect to the HUD device 100; and a display unit provided with the display control unit 1022 and configured to display the virtual image in the display area, based on a determination result of the direct indication possibility determining unit 1021, the detection result, and the image data.

Furthermore, it is preferable that the display control unit 1022 displays the indication sign at a position for directly indicating the target object, in a case where the determination result is positive, and displays the indication sign in the display area at a position close to the target object, in a case where the determination result is negative.

Furthermore, it is preferable that the FPGA 600 includes the indicating direction setting unit 1011 (i.e., second setting unit) configured to set an indicating direction of the indication sign, based on the detection result of the laser radar 300. Further, it is preferable that the indication sign data generating unit 1020 generates the image data of the indication sign, based on the indicating direction that has been set.

Furthermore, for example, in a case where the sign that moves is a moving sign (e.g., a guide sign that moves, etc.) that vertically or horizontally traverses the display area, it is preferable that the FPGA 600 controls a characteristic (especially visual stimulation) of the image while the image of the sign that moves is passing through an outer edge of the image region 30a. In other words, it is preferable that a characteristic (especially visual stimulation) of the virtual image is controlled while the virtual image of the sign that moves is passing through an outer edge of the display area.

Here, it is possible that visual stimulation of the image or the virtual image of the sign that moves is controlled such that the outer edge of the display area becomes less outstanding when a part of the sign that moves is not displayed in the display area (i.e., when the sign that moves is cut off).

Note that the moving sign may be one that passes through an outer edge of the display area in a different way from the moving sign that vertically or horizontally traverses the display area (e.g., a guide sign that passes a predetermined edge of the display area and moves back and forth between the inside and the outside of the display area, etc.).

Furthermore, it is preferable that the FPGA 600 increases visual stimulation (e.g., luminance) of an image of a sign (e.g., a guide sign that moves, etc.) that moves on a step-by-step basis while the image is entering the image region 30a. In other words, it is preferable that visual stimulation (e.g., luminance) of a virtual image of a sign (e.g., a guide sign that moves, etc.) that moves is increased on a step-by-step basis while the virtual image is entering the display area.

Furthermore, it is preferred that the FPGA 600 decreases visual stimulation (e.g., luminance) of an image of a sign (e.g., a guide sign that moves, etc.) that moves on a step-by-step basis while the image is exiting from the image region 30a. In other words, it is preferable that visual stimulation (e.g., luminance) of a virtual image of a sign (e.g., a guide sign that moves, etc.) that moves is decreased on a step-by-step basis while the virtual image is exiting from the display area.

Furthermore, it is preferable that the FPGA 600 increases visual stimulation of an image of a sign (e.g., a guide sign that moves, etc.) that moves, while the image is entirely in the image region 30a, to be greater than while the image is passing through an outer edge of the image region 30a. In other words, it is preferable that visual stimulation of a virtual image of a sign (e.g., a guide sign that moves, etc.) that moves is increased while the virtual image is entirely in the display area to be greater than while the virtual image is passing through an outer edge of the display area.

Here, it is possible to make the display area less perceivable to users, while precisely informing of contents of a sign (e.g., a guide sign that moves, etc.) that moves.

Furthermore, it is preferable that the FPGA 600 includes: the guide sign position detecting unit 903 (i.e., detecting unit) configured to detect a position of an image of a sign (e.g., a guide sign that moves) that moves and that is in a region including the image region 30a; and the guide sign luminance control unit 904 configured to control visual stimulation (e.g., luminance, etc.) of the image, based on a detection result of the guide sign position detecting unit 903.

In other words, it is preferable that the FPGA 600 includes: a detecting unit configured to detect a position of a virtual image of a sign (e.g., a guide sign that moves) that moves and that is in a region including the display area; and a control information generating unit configured to control visual stimulation (e.g., luminance, etc.) of the virtual image, based on a detection result of the detecting unit.

Furthermore, by use of a moving object apparatus (i.e., object apparatus) that is provided with the HUD device 100 and a vehicle (i.e., moving object) on which the HUD device 100 is mounted, it is possible to provide information, which is indicated by a sign that moves, without making a driver feel uncomfortable due to existence of a display area as much as possible.

In a display method according to the present invention (i.e., the practical examples 3 and 4), at least a part of a virtual image that moves in the display area is displayed in a display area. In a case where the virtual image is an indication sign for indicating a target object, the display method includes: a step of detecting a position of the target object; a step of determining whether directly indicating the target object with the indication sign in the display area is possible, based on a detection result of the step of detecting; and a step of displaying the indication sign in the display area, based on a determination result of the step of determining and the detection result.

More specifically, in a display method according to the present invention (i.e., the practical examples 3 and 4), at least a part of a sign that moves is displayed in a display area as a virtual image. In a case where the sign that moves is an indication sign for indicating a target object, the display method includes: a step of detecting a position of the target object; a step of determining whether directly indicating the target object with the indication sign in the display area is possible, based on a detection result of the step of detecting; and a step of displaying the indication sign in the display area as the virtual image, based on a determination result of the step of determining and the detection result.

In the display method according to the present embodiment (i.e., the practical examples 3 and 4), it is possible to prevent the indication sign from extending outside of the display area, because display position of the indication sign for indicating the target object is controlled, based on possibility of direct indication in the display area. Consequently, it is possible to make the display area less perceivable to users (e.g., drivers). Furthermore, it is possible to avoid such a case as at least a part of the indication sign is not displayed in the display area.

Furthermore, in the step of displaying, it is preferable that the indication sign is displayed in the display area at a position for directly indicating the target object, in a case where the determination result is positive, and the indication sign is displayed in the display area at a position close to the target object, in a case where the determination result is negative.

In a display method according to the present embodiment (i.e., the practical examples 1 and 2), at least a part of a virtual image that moves in the display area is displayed in the display area. In a case where the virtual image is a moving sign that passes through an outer edge of the display area, the display method includes: a first detection step for detecting a timing for the virtual image to start passing through the outer edge; a second detection step for detecting a timing for the virtual image to finish passing through the outer edge; and a step of controlling the characteristic of the virtual image, based on a detection result of the first detection step and a detection result of the second detection step.

More specifically, in the display method according to the present embodiment (i.e., the practical examples 1 and 2), an image of a sign that moves is formed with light in a region including an image region 30a (i.e., a predetermined region), and a front windshield (i.e., transparent/reflective member) is irradiated with light that forms at least a part of the image, the part of which is in the image region 30a, such that the virtual image of the at least a part of the image is displayed in the display area. In a case where the virtual image is a moving sign that passes through an outer edge of the display area, the display method includes: a first detection step for detecting a timing for an image to start passing through an outer edge of the image region 30a, which corresponds to an outer edge of the display area, a second detection step for detecting a timing for the image to finish passing through the outer edge of the image region 30a, and a step of controlling the characteristic of the image, based on a detection result of the first detection step and a detection result of the second detection step.

In the display method according to the present embodiment (i.e., the practical examples 1 and 2), it is possible to make the existence of the display area less outstanding because a characteristic (i.e., visual stimulation) of the moving sign can be controlled while the moving sign is passing through the outer edge of the display area. Consequently, it is possible to make the display area less perceivable to users (i.e., drivers).

Furthermore, in a case where the virtual image is a moving sign that vertically or horizontally traverses the display area, in the step of controlling, it is preferable that visual stimulation of the virtual image is increased on a step-by-step basis while the virtual image is entering the display area and is decreased on a step-by-step basis while the virtual image is exiting from the display area.

More specifically, in the case where the sign that moves is a moving sign that vertically or horizontally traverses the display area, in the step of controlling, it is preferable that visual stimulation of an image of the sign that moves is increased on a step-by-step basis while the image is entering the image region 30a and is decreased on a step-by-step basis while the image is exiting from the image region 30a.

Furthermore, in the step of controlling, it is preferable that visual stimulation of the virtual image is increased, while the virtual image is entirely in the display area, to be greater than while the virtual image is passing through the outer edge of the display area.

More specifically, in the step of controlling, it is preferable that visual stimulation of an image of the sign that moves is increased, while the image is entirely in the image region 30a, to be greater than while the image is passing through the outer edge of the image region 30a.

Note that although, in each of the practical examples 1 and 2 described above, a guide sign is displayed, based on navigation information (i.e., information relating to a next turning point) obtained from the car navigation system 200 mounted on a vehicle, it is possible that a guide sign is displayed, based on navigation information obtained from a device (i.e., a device for obtaining position information of a vehicle) that is brought into a vehicle, such as a smartphone or tablet terminal, which has a global positioning system (GPS) function.

Furthermore, although, in each of the practical examples 1 and 2, a guide sign displayed in the display area is a guide sign relating to a next turning point of a vehicle, there is no such limitation. That is to say, a guide sign may be any type of guide sign as long as relating to a traveling route of the vehicle. For example, a guide sign relating to a shop, facility, house, etc., on or near the traveling route is possible.

Furthermore, in each of the practical examples 3 and 4, when an indication sign is displayed in the display area for the first time or when an indication sign is switched from not being displayed to being displayed, an indication sign may be displayed at a base position (e.g., near the midpoint of the bottom edge of the display area) in the display area, such that subsequently the indication sign moves (or pops up) to a position corresponding to position of a target object in the display area (cf. FIGS. 23A and 23B).

Furthermore although explanation in each of the practical examples 3 and 4 is provided on an assumption that there is only one target object, in reality, there are often multiple target objects. In a case of multiple target objects, it is preferable to switch target objects (i.e., indication target) to be indicated by an indication sign, in accordance with change in position of the multiple target objects relative to a driver's vehicle. For example, from among multiple target objects detected by the laser radar 300, etc., a target object that is closest to the driver's vehicle may be selected as an indication target, such that an indication sign follows the indication target in the display area for indicating the indication target. Further, upon change of indication targets, it is possible that an indication sign follows a changed indication target in the display area for indicating the changed indication target. Furthermore, it is possible that multiple indication signs follow multiple target objects in the display area, respectively, for indicating the multiple target objects. In this case, it is possible that an indication sign for indicating a target object that should be indicated with a higher degree of priority is displayed with stronger visual stimulation.

Furthermore, in each of the practical examples 3 and 4, an indicating direction of an indication sign is preset, based on three-dimensional position information, separately from display position. However, an indicating direction may be set in accordance with display position at the time of controlling or setting display position of an indication sign.

Furthermore, a configuration of the FPGA 600 according to the above-described embodiment is not limited to the configuration explained in each of the practical examples and the configuration can be changed as needed.

Furthermore, in each of the practical examples 1 and 2, it is possible that a guide sign is a guide sign relating to a next turning point for a self-driving vehicle.

Furthermore, although the optical system in the HUD device according to the above-described embodiment is configured with the concave mirror 40 (i.e., a concave mirror), there is no such limitation. For example, the optical system may be configured with a convex mirror and may be configured with a curved mirror (i.e., a concave or convex mirror) and a turning mirror, which is arranged between the curved mirror and the screen 30.

Furthermore, although the image region and the frame region of the screen in the above-described embodiment are configured with a translucent member and a light-shielding member, respectively, the image region may be alternatively configured with a light-reflecting member and the frame region may be alternatively configured with a light-absorbing member or a translucent member. In this case, it is required that an optical system is designed to guide light reflected by the image region of the screen to a translucent/reflective member.

Furthermore, although the light-scanning device includes the scanning mirror 20 in the above-described embodiment, the light scanning device need not include the scanning mirror 20.

Furthermore, although an LD (i.e., an edge emitting laser) is employed as a light source in the above embodiment, another type of laser such as a surface emitting laser may be employed.

Furthermore, although the HUD device in the above-described embodiment is configured to accommodate color images, the HUD device may be configured to accommodate monochrome images.

Furthermore, the translucent/reflective member is not limited to a front windshield of a vehicle, and may be a side windshield or rear windshield, for example. That is to say, it is preferable that the translucent/reflective member is provided on a vehicle, where a viewer who views a virtual image is aboard, and the translucent/reflective member is a window member (such as a windshield) for the viewer to view the outside of the vehicle.

Furthermore, although, in the above-described embodiment, an HUD device that is mounted on a car is explained as an example of a display device of the present invention, there is no such limitation. That is to say, the display device of the present invention may be one that is provided on an object, which includes a motionless object and a movable object such as a vehicle, a vessel or an aircraft, and may be one that is used independently. A vehicle is not limited to a four-wheeled car, and may be a motorcycle, a motor tricycle, etc. In the above cases, it is required to be equipped with a windshield or a combiner as a translucent/reflective member. Note that a power source of a vehicle may be an engine, a motor or combination of an engine and a motor, etc.

Furthermore, the present invention is generally applicable to a device for displaying a virtual image in a display area such as a head-mounted display (HMD), a prompter, etc.

Furthermore, the specific numerical values, shapes, etc., used in the above-described embodiment are examples and therefore changeable, as needed, without departing from the scope of the present invention.

The following description explains the thought process of the inventors to achieve the invention of the above-described embodiment.

Recently, development of a device for displaying a virtual image in front of a viewer has been actively pushed forward as an information display device for a viewer to perceive information and caution with little eye movement. For example, as an information display device, there is disclosure (see PLT 1, for example) of a navigation system that displays a virtual image (including a figure, a letter and a symbol) such that the virtual image is superimposed on scenery in front and changes the virtual image in accordance with passage of time along with movement of a moving object. According to PLT 1, a displayed image can be perceived as if the displayed image existed at a position of an intersection, by changing size of the displayed image in accordance with distance to the intersection.

However, even though rendered information is three-dimensionally expressed such that the expression is adjusted towards confirming with reality space, the displayed three-dimensional appearance is deteriorated in a case where a user sees the display region of the information display device and perceives that the display is flat.

It is possible to make a viewed display region (i.e., angle of view) unperceivable with a choice of a display method and corresponding hardware (e.g., employment of a laser-scanning method). However, in the field of augmented reality (AR) expression, there are such cases of desiring to indicate a target that is out of a display region for displaying a virtual image and of desiring to display a moving sign that vertically or horizontally traverses the display area.

In such a case, a user would perceive the display area when a sign is cut off at an edge of the display region. Here, three-dimensional appearance, which is important for AR expression, is deteriorated.

Therefore, the inventors proceeded to invent the above-described embodiment to make it difficult for a user to be aware of (i.e., to perceive) the display region (i.e., display area).

Further, the present invention is not limited to these embodiments, but various variations and modifications may be made without departing from the scope of the present invention.

The present application is based on Japanese priority application No. 2016-256015 filed on Dec. 28, 2016, with the Japanese Patent Office, the entire content of which is hereby incorporated by reference.

REFERENCE SIGNS LIST

100 HUD device
200 car navigation system (i.e., a device with a GPS function)
300 laser radar (i.e., a detecting unit)
600 FPGA (i.e., a control device; a part of a displaying system)
10 light-scanning device (i.e., a part of a displaying system; a part of a formation unit)
30 screen (i.e., a part of a displaying system)
40 concave mirror (i.e., a part of a displaying system)

The invention claimed is:

1. A display device for displaying in a display area at least a part of a virtual image that moves in the display area, the display device comprising:
control circuitry configured to control a characteristic of the virtual image in accordance with position of the virtual image relative to the display area,
wherein the virtual image is an indication sign for indicating a target object that moves relatively with respect to the display device,
wherein the control circuitry includes:
determining circuitry configured to determine whether directly indicating the target object with the indication sign in the display area is possible, based on a detection result of detecting circuitry configured to detect a relative position of the target object with respect to the display device,
first setting circuitry configured to set a display position of the indication sign, based on a determination result of the determining circuitry and the detection result,
image data generating circuitry configured to generate image data of the indication sign, based on the display position that has been set, and
a display to display the virtual image in the display area, based on the image data,
wherein the control circuitry further includes second setting circuitry configured to set an indicating direction of the indication sign, based on the detection result of the detecting circuitry, and
wherein the image data generating circuitry generates the image data, based on the indicating direction that has been set.

2. The display device according to claim 1, wherein the characteristic includes at least one of brightness, color, shape, size and position of the virtual image.

3. The display device according to claim 1, wherein the control circuitry controls position of the virtual image, such that the virtual image that is in the display area does not extend outside of the display area.

4. The display device according to claim 1, wherein the control circuitry controls the characteristic of the virtual image while the virtual image is passing through an outer edge of the display area.

5. The display device according to claim 4, wherein the control circuitry increases visual stimulation of the virtual image on a step-by-step basis while the virtual image is entering the display area.

6. The display device according to claim 4, wherein the control circuitry decreases visual stimulation of the virtual image on a step-by-step basis while the virtual image is exiting from the display area.

7. The display device according to claim 4, wherein the control circuitry increases visual stimulation of the virtual image while the virtual image is entirely in the display area, the visual stimulation being greater than while the virtual image is passing through the outer edge of the display area.

8. The display device according to claim 4, wherein the control circuitry includes:
calculating circuitry configured to calculate a timing for the virtual image to start passing through the outer edge and a timing for the virtual image to finish passing through the outer edge,
control information generating circuitry configured to generate control information for controlling visual stimulation of the virtual image, based on a calculation result of the calculating circuitry, and
image data generating circuitry configured to generate image data of the virtual image, based on the control information.

9. The display device according to claim 4, wherein the virtual image is a moving sign that vertically or horizontally traverses the display area.

10. An object apparatus comprising:
the display device according to claim 1; and
an object, on which the display device is mounted.

11. A display device for displaying in a display area at least a part of a virtual image that moves in the display area, the display device comprising:
control circuitry configured to control a characteristic of the virtual image in accordance with position of the virtual image relative to the display area,
wherein the control circuitry controls the characteristic of the virtual image while the virtual image is passing through an outer edge of the display area,
wherein the control circuitry includes image data generating circuitry configured to generate image data of the virtual image, detecting circuitry configured to detect a position of the virtual image, control information generating circuitry configured to generate control information for controlling visual stimulation of the virtual image, based on a detection result of the detecting circuitry, and a display configured to display the virtual image in the display area, based on the image data and the control information.

12. A display method for displaying in a display area at least a part of a virtual image that moves in the display area, the virtual image being a moving sign that passes through an outer edge of the display area, the display method comprising:

first detection for detecting a timing for the virtual image to start passing through the outer edge, second detection for detecting a timing for the virtual image to finish passing through the outer edge, and controlling the characteristic of the virtual image, based on a detection result of the first detection and a detection result of the second detection.

13. The display method according to claim 12, wherein the virtual image is a moving sign that vertically or horizontally traverses the display area, and wherein, in the controlling, visual stimulation of the virtual image is increased on a step-by-step basis while the virtual image is entering the display area and is decreased on a step-by-step basis while the virtual image is exiting from the display area.

14. The display method according to claim 12, wherein, in the controlling, visual stimulation of the virtual image is increased while the virtual image is entirely in the display area, the visual stimulation being greater than while the virtual image is passing through the outer edge.

\* \* \* \* \*